(12) United States Patent
Watanabe et al.

(10) Patent No.: US 8,819,364 B2
(45) Date of Patent: Aug. 26, 2014

(54) INFORMATION PROCESSING APPARATUS, TAPE DEVICE, AND COMPUTER-READABLE MEDIUM STORING PROGRAM

(75) Inventors: Hiroyuki Watanabe, Minato (JP); Hideaki Takahashi, Minato (JP); Takashi Hirose, Minato (JP); Kinya Saito, Kawasaki (JP); Reisuke Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 106 days.

(21) Appl. No.: 13/137,861

(22) Filed: Sep. 19, 2011

(65) Prior Publication Data

US 2012/0084501 A1 Apr. 5, 2012

(30) Foreign Application Priority Data

Oct. 5, 2010 (JP) ................................. 2010-225517

(51) Int. Cl.
*G06F 13/00* (2006.01)
*G06F 13/28* (2006.01)

(52) U.S. Cl.
USPC ..................... 711/162; 711/E12.103; 710/36

(58) Field of Classification Search
USPC ............................. 711/162, E12.103; 710/36
See application file for complete search history.

(56) References Cited

U.S. PATENT DOCUMENTS

| | | | |
|---|---|---|---|
| 7,133,987 B2 | 11/2006 | Watanabe et al. | |
| 7,136,977 B2 | 11/2006 | Obayashi et al. | |
| 7,421,551 B2* | 9/2008 | Desai et al. | 711/162 |
| 7,451,168 B1* | 11/2008 | Patterson | 1/1 |
| 7,657,720 B2* | 2/2010 | Otani | 711/162 |
| 7,953,940 B2 | 5/2011 | Kezuka et al. | |
| 8,037,268 B2* | 10/2011 | Aikawa et al. | 711/162 |
| 8,171,245 B2* | 5/2012 | Maruyama et al. | 711/161 |
| 8,332,601 B2 | 12/2012 | Yasuda et al. | |
| 2005/0172093 A1* | 8/2005 | Jain | 711/162 |
| 2005/0187985 A1* | 8/2005 | Edwards et al. | 707/200 |
| 2006/0010347 A1 | 1/2006 | Sugihara | |
| 2007/0136541 A1* | 6/2007 | Herz et al. | 711/162 |
| 2007/0156982 A1* | 7/2007 | Meiri et al. | 711/162 |
| 2007/0239951 A1 | 10/2007 | Yokota et al. | |
| 2009/0100223 A1* | 4/2009 | Murayama et al. | 711/114 |

FOREIGN PATENT DOCUMENTS

| | | |
|---|---|---|
| JP | 03-269719 | 12/1991 |
| JP | 2004-272854 | 9/2004 |
| JP | 2005-332067 | 12/2005 |
| JP | 2006-018963 | 1/2006 |
| JP | 2007-193839 | 8/2007 |
| JP | 2007-280236 | 10/2007 |

(Continued)

OTHER PUBLICATIONS

Patent Abstracts of Japan, Publication No. 2006-018963, Published Jan. 19, 2006.

(Continued)

*Primary Examiner* — Edward Dudek, Jr.
(74) *Attorney, Agent, or Firm* — Staas & Halsey LLP

(57) ABSTRACT

An acquisition unit of an information processing apparatus acquires access information indicating the state of access to a volume of a disk device at least for data read. A determination unit detects a volume in which a sequential read was performed, on the basis of the acquired access information, and determines the volume as a backup source for a backup.

13 Claims, 58 Drawing Sheets

(56) References Cited

FOREIGN PATENT DOCUMENTS

| JP | 2008-65392 | 3/2008 |
| JP | 2008-251001 | 10/2008 |
| JP | 2008-269015 | 11/2008 |
| JP | 2010-79588 | 4/2010 |

OTHER PUBLICATIONS

Patent Abstracts of Japan, Publication No. 2008-251001, Published Oct. 16, 2008.
Patent Abstracts of Japan, Publication No. 03-269719, Published Dec. 2, 1991.
Japanese Office Action mailed Apr. 1, 2014 in corresponding Japanese Patent Application No. 2010-225517.
Patent Abstracts of Japan, Publication No. 2008-269015, Published Nov. 6, 2008.
Patent Abstracts of Japan, Publication No. 2005-332067, Published Dec. 2, 2005.
Patent Abstracts of Japan, Publication No. 2010-79588, Published Apr. 8, 2010.
Patent Abstracts of Japan, Publication No. 2007-280236, Published Oct. 25, 2007.
Patent Abstracts of Japan, Publication No. 2004-272854, Published Sep. 30, 2004.
Patent Abstracts of Japan, Publication No. 2007-193839, Published Aug. 2, 2007.
Patent Abstracts of Japan, Publication No. 2008-65392, Published Mar. 21, 2008.

\* cited by examiner

41 DATA COLLECTION TABLE

| | DATA COLLECTION TIME FRAME (seconds) | LUN0 I/O COUNT | LUN1 I/O COUNT | LUN2 I/O COUNT |
|---|---|---|---|---|
| 00:00:10 | 0 - 10 | 0 | 10000 | 0 |
| 00:00:20 | 10 - 20 | 0 | 11000 | 0 |
| 00:00:30 | 20 - 30 | 0 | 12000 | 0 |
| ... | ... | ... | ... | ... |
| 08:00:00 | - 28800 | 20000 | 0 | 0 |
| 08:00:10 | - 28810 | 22000 | 0 | 0 |
| 08:00:20 | - 28820 | 23000 | 0 | 0 |
| ... | ... | ... | ... | ... |
| 23:59:50 | - 86390 | 0 | 0 | 8000 |
| 24:00:00 | - 86400 | 0 | 0 | 9000 |

FIG. 14

42 KNOWLEDGE TABLE

| DAY OF KNOWLEDGE PERIOD | KNOWLEDGE TIME FRAME | LUN 0 I/O STATE | LUN 1 I/O STATE | LUN 2 I/O STATE |
|---|---|---|---|---|
| MONDAY | 00 - 01 | idle | busy | idle |
| | 01 - 02 | idle | busy | idle |
| | 02 - 03 | idle | busy | idle |
| | ... | ... | ... | ... |
| | 07 - 08 | busy | idle | idle |
| | 08 - 09 | busy | idle | idle |
| | 09 - 10 | busy | idle | idle |
| | ... | ... | ... | ... |
| | 22 - 23 | idle | idle | busy |
| | 23 - 24 | idle | idle | busy |
| TUESDAY | ↑ | | | |
| ... | ↑ | | | |
| SATURDAY | ↑ | | | |
| SUNDAY | ↑ | | | |

FIG. 16

51 ORGANIZED KNOWLEDGE TABLE

| KNOWLEDGE PERIOD | KNOWLEDGE TIME FRAME | LUN 0 I/O STATE | LUN 1 I/O STATE | LUN 2 I/O STATE |
|---|---|---|---|---|
| MONDAY TO SUNDAY | 00 – 01 | idle | | |
| | 01 – 02 | idle | | |
| | ... | ... | | |
| | 06 – 07 | idle | | |
| | 07 – 08 | busy | | |
| | 08 – 09 | busy | | |
| | 09 – 10 | busy | | |
| | ... | ... | | |
| | 23 – 24 | idle | | |

FIG. 18

52 ORGANIZED KNOWLEDGE TABLE

| DAY | LUN 0 I/O STATE | LUN 1 I/O STATE | LUN 2 I/O STATE |
|---|---|---|---|
| MONDAY | busy | busy | idle |
| TUESDAY | busy | busy | idle |
| WEDNESDAY | busy | busy | busy |
| THURSDAY | busy | busy | idle |
| FRIDAY | busy | busy | idle |
| SATURDAY | busy | idle | idle |
| SUNDAY | busy | idle | idle |

FIG. 19

61 DATA COLLECTION TABLE

| | DATA COLLECTION TIME FRAME (seconds) | LUN 0 | | LUN 1 | | LUN 2 | |
|---|---|---|---|---|---|---|---|
| | | Read (times/sec) | Write (times/sec) | Read (times/sec) | Write (times/sec) | Read (times/sec) | write (times/sec) |
| 00:00:10 | 0 - 10 | 0 | 0 | | | | |
| 00:00:20 | 10 - 20 | 0 | 0 | | | | |
| ... | ... | ... | ... | | | | |
| 04:00:00 | - 14400 | 0 | 0 | ← START OF D2T BACKUP | | | |
| 04:00:10 | - 14410 | 8000 | 0 | | | | |
| 04:00:20 | - 14420 | 10000 | 0 | | | | |
| ... | ... | ... | ... | | | | |
| 05:59:50 | - 21590 | 10000 | 0 | ← END OF D2T BACKUP | | | |
| 06:00:00 | - 21600 | 9000 | 0 | | | | |
| 06:00:10 | - 21610 | 0 | 0 | | | | |
| ... | ... | ... | ... | | | | |
| 07:00:00 | - 25200 | 0 | 0 | ← START OF D2D BACKUP | | | |
| 07:00:10 | - 25210 | 0 | 5000 | | | | |
| 07:00:20 | - 25220 | 0 | 4000 | | | | |
| ... | ... | ... | ... | | | | |
| 08:59:50 | - 21590 | 0 | 5000 | ← END OF D2D BACKUP | | | |
| 09:00:00 | - 32400 | 0 | 4000 | | | | |
| 09:00:10 | - 32410 | 0 | 0 | | | | |
| ... | ... | ... | ... | | | | |
| 24:00:00 | - 86400 | 0 | 0 | | | | |

FIG. 22

62 KNOWLEDGE TABLE

| DAY OF KNOWLEDGE PERIOD | KNOWLEDGE TIME FRAME | LUN 0 I/O STATE | LUN 1 I/O STATE | LUN 2 I/O STATE |
|---|---|---|---|---|
| MONDAY | 00 – 01 | idle | } AVAILABLE TIME | |
| | 01 – 02 | idle | | |
| | ... | ... | | |
| | 06 – 07 | idle | | |
| | 07 – 08 | busy | ←D2D BACKUP | |
| | 08 – 09 | busy | ←D2D BACKUP | |
| | 09 – 10 | idle | } AVAILABLE TIME | |
| | ... | ... | | |
| | 23 – 24 | idle | | |
| TUESDAY | ↑ | | | |
| WEDNESDAY | ↑ | | | |
| ... | ↑ | | | |
| SUNDAY | ↑ | | | |

FIG. 24

ORGANIZED KNOWLEDGE TABLE

71

| KNOWLEDGE PERIOD | KNOWLEDGE TIME FRAME | LUN 0 I/O STATE | LUN 1 I/O STATE | LUN 2 I/O STATE |
|---|---|---|---|---|
| MONDAY TO SUNDAY | 00 – 01 | idle | | |
| | 01 – 02 | idle | | |
| | ... | ... | | |
| | 06 – 07 | idle | | |
| | 07 – 08 | busy | ←D2D BACKUP | |
| | 08 – 09 | busy | ←D2D BACKUP | |
| | 09 – 10 | busy | ←D2D BACKUP | |
| | ... | ... | | |
| | 23 – 24 | idle | | |

FIG. 25

ORGANIZED KNOWLEDGE TABLE 72

| DAY | LUN 0 I/O STATE | LUN 1 I/O STATE | LUN 2 I/O STATE |
|---|---|---|---|
| MONDAY | busy | idle | idle |
| TUESDAY | busy | busy | idle |
| WEDNESDAY | busy | busy | idle |
| THURSDAY | busy | busy | busy |
| FRIDAY | busy | busy | idle |
| SATURDAY | busy | busy | idle |
| SUNDAY | busy | idle | idle |

81 DATA COLLECTION TABLE

| | | | DRIVE G4_02 | | | | DRIVE G4_03 | DRIVE G3_01 |
|---|---|---|---|---|---|---|---|---|
| | DATA COLLECTION TIME FRAME (seconds) | STATE | WRITE COUNT | CANDIDATE COPY VOLUME | SLOT (MEDIUM) | D2D BACKUP DESTINATION COPY VOLUME | | |
| 00:00:10 | 0 – 10 | idle | 0 | | | | | |
| 00:00:20 | 10 – 20 | idle | 0 | | | | | |
| ... | ... | ... | ... | ... | ... | | | |
| 04:00:00 | – 14400 | idle | 0 | | | | | |
| 04:00:10 | – 14410 | mount | 0 | LUN0,LUN1,LUN2 | 001 | | ← Media mounting notification | |
| 04:00:20 | – 14420 | ready | 0 | LUN0,LUN1,LUN2 | 001 | | ← Allocation notification | |
| 04:00:30 | – 14430 | backup | 100 | LUN0,LUN2 | 001 | | ← Write notification | |
| 04:00:40 | – 14440 | backup | 0 | LUN0,LUN2 | 001 | | ← No write notification | |
| 04:00:50 | – 14450 | backup | 100 | LUN0,LUN2 | 001 | | ← Write notification | |
| 04:01:00 | – 14460 | Backup delay | 90 | LUN0,LUN2 | 001 | LUN0 | ← D2D session establishment notification | |
| ... | ... | ... | ... | ... | ... | ... | | |
| 05:59:20 | – 21560 | Backup delay | ... | LUN0,LUN2 | 001 | LUN0 | | |
| 05:59:30 | – 21570 | Backup delay | ... | LUN0,LUN2 | 001 | LUN0 | ← D2D session disconnection notification | |
| 05:59:40 | – 21580 | backup | 110 | LUN0,LUN2 | 001 | | ← Write notification | |
| 05:59:50 | – 21590 | backup | 100 | LUN0,LUN2 | 001 | | | |
| 06:00:00 | – 21600 | idle | 0 | LUN0 | 001 | | ← Media unmounting notification | |
| 06:00:10 | – 21610 | idle | 0 | | | | | |
| ... | ... | ... | ... | ... | | | | |
| 24:00:00 | – 86390 | | 0 | | | | | |

82 COPY VOLUME-BASED DATA TABLE

| DATA COLLECTION TIME FRAME (seconds) | LUN 0 | | |
|---|---|---|---|
| | STATE | WRITE COUNT | SLOT (MEDIUM) |
| 00:00:10    0 - 10 | idle | 0 | |
| 00:00:20    10 - 20 | idle | 0 | |
| ...    ... | ... | ... | |
| 04:00:00    - 14400 | idle | 0 | |
| 04:00:10    - 14410 | busy | 0 | 001 |
| 04:00:20    - 14420 | busy | 0 | 001 |
| 04:00:30    - 14430 | busy | 100 | 001 |
| 04:00:40    - 14440 | busy | 0 | 001 |
| 04:00:50    - 14450 | busy | 100 | 001 |
| ...    ... | busy | ... | 001 |
| 05:59:40    - 21580 | busy | 110 | 001 |
| 05:59:50    - 21590 | busy | 100 | 001 |
| 06:00:00    - 21600 | busy | 0 | 001 |
| 06:00:10    - 21610 | idle | 0 | |
| ...    ... | ... | ... | |
| 24:00:00    - 86390 | idle | 0 | |

Rows 04:00:10 through 06:00:00 marked as BACKUP TIME.

FIG. 30

83 VOLUME-BASED KNOWLEDGE TABLE

| DAY OF KNOWLEDGE PERIOD | KNOWLEDGE TIME FRAME | LUN 0 | | | | LUN 1 | LUN 2 |
|---|---|---|---|---|---|---|---|
| | | JOB STATE | WRITE COUNT | BACKUP TIME | SLOT (MEDIUM) | | |
| MONDAY | 00 – 01 | idle | 0 | 0 | | | |
| | 01 – 02 | idle | 0 | 0 | | | |
| | 02 – 03 | idle | 0 | 0 | | | |
| | 03 – 04 | idle | 0 | 0 | | | |
| | 04 – 05 | busy | 38000 | 3500 | 001 | | |
| | 05 – 06 | busy | 3500 | 3400 | 001 | | |
| | 06 – 07 | idle | 0 | 0 | | | |
| | 08 – 09 | idle | 0 | 0 | | | |
| | ... | ... | ... | ... | | | |
| | 23 – 24 | idle | 0 | 0 | | | |
| TUESDAY | | | | ↑ | | | |
| WEDNESDAY | | | | ↑ | | | |
| ... | | | | ↑ | | | |
| SUNDAY | | | | ↑ | | | |

FIG. 32

84   DRIVE-BASED KNOWLEDGE TABLE

| PRIORITY | | 1 | 2 | 3 |
|---|---|---|---|---|
| DAY OF KNOWLEDGE PERIOD | KNOWLEDGE TIME FRAME | G4-02 JOB STATE | G4-03 JOB STATE | G3-01 JOB STATE |
| MONDAY | 00 - 01 | idle | | |
| | 01 - 02 | idle | | |
| | 02 - 03 | idle | | |
| | 03 - 04 | idle | | |
| | 04 - 05 | busy | | |
| | 05 - 06 | busy | | |
| | 06 - 07 | idle | | |
| | 08 - 09 | idle | | |
| | ... | ... | | |
| | 23 - 24 | idle | | |
| TUESDAY | | ↑ | | |
| WEDNESDAY | | ↑ | | |
| ... | | ↑ | | |
| SUNDAY | | ↑ | | |

FIG. 33

83a MERGED KNOWLEDGE TABLE

| KNOWLEDGE PERIOD | KNOWLEDGE TIME FRAME | LUN 0 | | | | LUN 1 | LUN 2 |
|---|---|---|---|---|---|---|---|
| | | JOB STATE | AVERAGE WRITE COUNT | AVERAGE BACKUP TIME | SLOT (MEDIUM) | | |
| MONDAY TO SUNDAY | 00 - 01 | idle | 0 | 0 | | | |
| | 01 - 02 | idle | 0 | 0 | | | |
| | 02 - 03 | idle | 0 | 0 | | | |
| | 03 - 04 | idle | 0 | 0 | | | |
| | 04 - 05 | busy | 38000 | 3500 | 001 | | |
| | 05 - 06 | busy | 35000 | 3400 | 001,010 | | |
| | 06 - 07 | busy | 1000 | 100 | 010 | | |
| | 08 - 09 | idle | 0 | 0 | | | |
| | ... | ... | ... | ... | | | |
| | 23 - 24 | idle | 0 | 0 | | | |

FIG. 35

83a MERGED KNOWLEDGE TABLE

| KNOWLEDGE PERIOD | KNOWLEDGE TIME FRAME | LUN 0 | | | | LUN 1 | LUN 2 |
|---|---|---|---|---|---|---|---|
| | | JOB STATE | AVERAGE WRITE COUNT | AVERAGE BACKUP TIME | SLOT (MEDIUM) | | |
| SUNDAY TO MONDAY | 00 - 01 | idle | 0 | 0 | | | |
| | 01 - 02 | idle | 0 | 0 | | | |
| | 02 - 03 | idle | 0 | 0 | | | |
| | 03 - 04 | idle | 0 | 0 | | | |
| | 04 - 05 | busy | 38000 | 3500 | 001 | | |
| | 05 - 06 | busy | 35000 | 3400 | 001,010 | | |
| | 06 - 07 | busy | 1000 | 100 | 010 | | |
| | 08 - 09 | idle | 0 | 0 | | | |
| | ... | ... | ... | ... | | | |
| | 23 - 24 | idle | 0 | 0 | | | |

| 04 - 05 | busy | 38000 | 3500 | 001 |
|---|---|---|---|---|
| 05 - 06 | busy | 35000 | 3400 | 001,010 |
| 06 - 07 | busy | 1000 | 100 | 010 |

FIG. 36

FIG. 37

83b BACKUP JOB INFORMATION

| JOB NO. | AVERAGE WRITE COUNT | AVERAGE BACKUP TIME (seconds) | AVERAGE THROUGHPUT (write count/second) | SOURCE COPY VOLUME | SLOT (MEDIUM) |
|---|---|---|---|---|---|
| 1 | 740000 | 7000 | 105 | LUN 0 | 001,010 |

85 JOB MANAGEMENT TABLE

| PRIORITY | JOB NO. | AVERAGE WRITE COUNT | AVERAGE BACKUP TIME (seconds) | AVERAGE THROUGHPUT (write count/second) | SOURCE COPY VOLUME | SLOT (MEDIUM) |
|---|---|---|---|---|---|---|
| − | 1 | 740000 | 7000 | 105 | LUN 0 | 001,010 |
| − | 2 | 500000 | 4762 | 105 | LUN 2 | 002 |
| − | 3 | 500000 | 6000 | 83 | LUN 1 | 003,012 |
| ... | ... | ... | ... | ... | ... | ... |

SORT

85 JOB MANAGEMENT TABLE

| PRIORITY | JOB NO. | AVERAGE WRITE COUNT | AVERAGE BACKUP TIME (seconds) | AVERAGE THROUGHPUT (write count/second) | SOURCE COPY VOLUME | SLOT (MEDIUM) |
|---|---|---|---|---|---|---|
| 1 | 3 | 500000 | 6000 | 83 | LUN 1 | 003,012 |
| 2 | 2 | 500000 | 4762 | 105 | LUN 2 | 002 |
| 3 | 1 | 740000 | 7000 | 105 | LUN 0 | 001,010 |
| ... | ... | ... | ... | ... | ... | ... |

83a MERGED KNOWLEDGE TABLE

| KNOWLEDGE PERIOD | KNOWLEDGE TIME FRAME | LUN 0 | | | | LUN 1 | LUN 2 |
|---|---|---|---|---|---|---|---|
| | | JOB STATE | AVERAGE WRITE COUNT | AVERAGE BACKUP TIME | SLOT (MEDIUM) | | |
| MONDAY TO SUNDAY | 00 - 01 | idle | 0 | 0 | | | |
| | 01 - 02 | idle | 0 | 0 | | | |
| | 02 - 03 | idle | 0 | 0 | | | |
| | 03 - 04 | idle | 0 | 0 | | | |
| | 04 - 05 | 1 | 38000 | 3500 | 001 | | |
| | 05 - 06 | 1 | 36000 | 3500 | 001,010 | | |
| | 06 - 07 | 1 | 1000 | 100 | 010 | | |
| | 08 - 09 | idle | 0 | 0 | | | |
| | ... | ... | ... | ... | | | |
| | 23 - 24 | idle | 0 | 0 | | | |

FIG. 38

91 ORGANIZED KNOWLEDGE TABLE (FOR EACH COPY VOLUME)

| KNOWLEDGE PERIOD | KNOWLEDGE TIME FRAME | LUN 0 STATE | LUN 1 STATE | LUN 2 STATE |
|---|---|---|---|---|
| MONDAY TO SUNDAY | 00 – 01 | idle | | |
| | 01 – 02 | idle | | |
| | ... | ... | | |
| | 04 – 05 | 1 | | |
| | 05 – 06 | 1 | | |
| | 06 – 07 | 1 | | |
| | 08 – 09 | idle | | |
| | ... | ... | | |
| | 23 – 24 | idle | | |

FIG. 39

92 ORGANIZED KNOWLEDGE TABLE
(FOR EACH TAPE DRIVE)

| PRIORITY | | 1 | 2 | 3 |
|---|---|---|---|---|
| KNOWLEDGE PERIOD | KNOWLEDGE TIME FRAME | G4_02 STATE | G4_03 STATE | G3_01 STATE |
| MONDAY TO SUNDAY | 00 – 01 | idle | | |
| | 01 – 02 | idle | | |
| | ... | ... | | |
| | 04 – 05 | busy | | |
| | 05 – 06 | busy | | |
| | 06 – 07 | busy | | |
| | 08 – 09 | idle | | |
| | ... | ... | | |
| | 23 – 24 | idle | | |

FIG. 40

93 ORGANIZED KNOWLEDGE TABLE
(FOR EACH COPY VOLUME)

| DAY | LUN 0 STATE | LUN 1 STATE | LUN 2 STATE |
|---|---|---|---|
| MONDAY | 1 | 2 | 3 |
| TUESDAY | 1 | 2 | 3 |
| WEDNESDAY | 1 | 2 | 3 |
| THURSDAY | 1 | 2 | 3 |
| FRIDAY | 1 | 2 | 3 |
| SATURDAY | 1 | idle | 4 |
| SUNDAY | 1 | idle | 4 |

FIG. 41

94 ORGANIZED KNOWLEDGE TABLE
(FOR EACH TAPE DRIVE)

| PRIORITY | 1 | 2 | 3 |
|---|---|---|---|
| DAY | G4_02 STATE | G4_03 STATE | G3_01 STATE |
| MONDAY | busy | busy | busy |
| TUESDAY | busy | busy | busy |
| WEDNESDAY | busy | busy | busy |
| THURSDAY | busy | busy | busy |
| FRIDAY | busy | busy | busy |
| SATURDAY | busy | idle | busy |
| SUNDAY | busy | idle | busy |

330 MATRIX

| Operation state / Notification details | Backup job in progress | | | | D2D backup in progress (under established session) | | |
|---|---|---|---|---|---|---|---|
| | idle | mount | ready | backup | | | |
| Media mounting | PROCEDURE#1 | — | — | — | ... | ... | ... |
| Media allocation | — | PROCEDURE#2 | — | — | ... | ... | ... |
| Write | — | — | PROCEDURE #3 | PROCEDURE #4 | ... | ... | ... |
| Media unmounting | — | •Change state to "idle" | •Change state to "idle" | PROCEDURE #5 | ... | ... | ... |
| D2D backup session establishment | •Change state to "mount delay" •Store destination copy LUN | •Change state to "ready delay" •Store destination copy LUN | •Change state to "write delay" •Store destination copy LUN | •Change state to "backup delay" •Store destination copy LUN | ... | ... | ... |
| D2D backup session disconnection | — | — | — | — | ... | ... | ... |

PROCEDURE #1
- Candidate search conditions) copy volume with read=0
- Insert medium into slot
- Change state to "mount"

PROCEDURE #2
- Candidate filtering search conditions) copy volume with read=0
- Change state to "ready"

PROCEDURE #3
- Candidate filtering search conditions) copy volume with read!=0
- Increment write count by one
- Keep "ready" state

PROCEDURE #4
- Increment write count by one
- Keep "backup" state

PROCEDURE #5
- Candidate filtering search conditions) copy volume with read=0
- Aggregate and store backup job information if copy volume is found
- Change state to "idle"

91 ORGANIZED KNOWLEDGE TABLE

| KNOWLEDGE TIME FRAME | LUN 0 STATE | LUN 1 STATE | LUN 2 STATE |
|---|---|---|---|
| 00 – 01 | | | |
| ... | ... | ... | ... |
| 04 – 05 | 1 | | |
| 05 – 06 | 1 | 2 | 3 |
| 06 – 07 | 1 | 2 | 3 |
| 07 – 08 | 1 | | 3 |
| 08 – 09 | | | 3 |
| 09 – 10 | | | |
| ... | ... | ... | ... |
| 23 – 24 | | | |

OVERLAP (rows 05–06, 06–07, 07–08)

71 ORGANIZED KNOWLEDGE TABLE → AVAILABLE TIMES

| KNOWLEDGE TIME FRAME | LUN 2 STATE |
|---|---|
| 00 – 01 | idle |
| ... | ... |
| 03 – 04 | idle |
| 04 – 05 | busy |
| 05 – 06 | busy |
| 06 – 07 | busy |
| 07 – 08 | busy |
| 08 – 09 | idle |
| 09 – 10 | idle |
| 10 – 11 | busy |
| 11 – 12 | busy |
| 12 – 13 | busy |
| 13 – 14 | busy |
| 14 – 15 | busy |
| 15 – 16 | busy |
| 16 – 17 | idle |
| 17 – 18 | idle |
| ... | ... |
| 23 – 24 | idle |

71 ORGANIZED KNOWLEDGE TABLE — EXECUTION STATE OF D2D BACKUP

| KNOWLEDGE TIME FRAME | LUN 2 STATE |
|---|---|
| 00 – 01 | |
| ... | ... |
| 03 – 04 | |
| 04 – 05 | |
| 05 – 06 | |
| 06 – 07 | |
| 07 – 08 | |
| 08 – 09 | |
| 09 – 10 | |
| 10 – 11 | busy |
| 11 – 12 | busy |
| 12 – 13 | busy |
| 13 – 14 | busy |
| 14 – 15 | busy |
| 15 – 16 | busy |
| 16 – 17 | |
| 17 – 18 | |
| ... | ... |
| 23 – 24 | |

91 ORGANIZED KNOWLEDGE TABLE — EXECUTION STATES OF OTHER BACKUP JOBS

| KNOWLEDGE TIME FRAME | LUN 0 STATE | LUN 1 STATE |
|---|---|---|
| 00 – 01 | | |
| ... | ... | ... |
| 03 – 04 | | |
| 04 – 05 | 1 | |
| 05 – 06 | 1 | 2 |
| 06 – 07 | 1 | 2 |
| 07 – 08 | 1 | |
| 08 – 09 | | |
| 09 – 10 | | |
| 10 – 11 | | |
| 11 – 12 | | |
| 12 – 13 | | |
| 13 – 14 | | |
| 14 – 15 | | |
| 15 – 16 | | |
| 16 – 17 | | |
| 17 – 18 | | |
| ... | ... | ... |
| 23 – 24 | | |

310 PROPOSED SCHEDULE TABLE

| KNOWLEDGE TIME FRAME | LUN 0 STATE | LUN 1 STATE | LUN 2 STATE |
|---|---|---|---|
| 00 – 01 | | | |
| ... | ... | ... | ... |
| 03 – 04 | | | |
| 04 – 05 | 1 | | |
| 05 – 06 | 1 | 2 | |
| 06 – 07 | 1 | 2 | |
| 07 – 08 | 1 | | |
| 08 – 09 | | | |
| ... | ... | ... | ... |
| 15 – 16 | | | |
| 16 – 17 | | | 3 |
| 17 – 18 | | | 3 |
| 18 – 19 | | | 3 |
| 19 – 20 | | | 3 |
| 20 – 21 | | | |
| ... | ... | ... | ... |
| 23 – 24 | | | |

320 REPORT SCREEN

| BACKUP JOB | IMPROVED PLAN | PLAN 1 START TIME | PLAN 2 START TIME | FREQUENCY | USE DRIVE |
|---|---|---|---|---|---|
| LUN1 | No | | | | |
| LUN2 | Yes | 08:00 | 20:00 | Every day | Drive1(LTO4) |
| LUN3 | Yes | 11:00 | 08:00 | On Wednesdays | Drive1(LTO4) |

FIG. 57

INFORMATION PROCESSING APPARATUS, TAPE DEVICE, AND COMPUTER-READABLE MEDIUM STORING PROGRAM

CROSS-REFERENCE TO RELATED APPLICATION

This application is based upon and claims the benefits of priority of the prior Japanese Patent Application No. 2010-225517, filed on Oct. 5, 2010, the entire contents of which are incorporated herein by reference.

FIELD

The embodiments discussed herein relate to an information processing apparatus, tape device, and computer-readable recording medium storing a program, for managing a storage device.

BACKGROUND

In computer systems, a large amount of data is stored in a storage device such as a disk device or a tape device. Most of the data in the storage device is periodically backed up to another storage device in case of data loss.

In an existing backup system, data is backed up in accordance with an instruction from a backup server, for example. A system administrator schedules backup jobs with his/her experience, and sets the schedule in the backup server. In accordance with the schedule, the backup server accesses a storage device and performs data backup.

In many cases, backup is performed during night because there are a few accesses to a disk device. During the backup, some backup jobs may be executed simultaneously. To this end, resources may be appropriately allocated to the backup jobs. For example, there is a technique of reserving resources for backup tasks on the basis of estimated utilization of the resources. Please refer to Japanese Laid-open Patent Publication No. 2008-251001.

By the way, a storage device such as a disk device or tape device is capable of acquiring internal access information such as access frequency. By comparing the acquired access information with a backup source volume, efficiency of the entire process of the system may be improved. For example, the processing efficiency of the system as a whole may be improved by performing backup while data in a backup source storage device has low access frequency.

However, a function of collecting access information within a storage device and an application software product for management of a storage device do not acquire the execution state of backup, which prevents effective use of the access information acquired by the storage device for improving processing efficiency.

SUMMARY

According to one embodiment, an information processing apparatus includes: an acquisition unit that acquires access information indicating a state of access to a volume of a disk device at least for data read; and a determination unit that detects a volume in which a sequential read was performed, on the basis of the acquired access information, and determines the detected volume as a backup source volume for a backup.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 illustrates an example data structure of a data collection table for business volumes;
FIG. 16 illustrates an example data structure of a knowledge table for business volumes;
FIG. 18 illustrates an example data structure of an organized knowledge table in which knowledge data is organized on a knowledge time frame basis;
FIG. 19 illustrates an example data structure of an organized knowledge table in which knowledge data is organized on a day basis;
FIG. 22 illustrates an example data structure of a data collection table for copy volumes;
FIG. 24 illustrates an example data structure of a knowledge table for copy volumes;
FIG. 25 illustrates an example data structure of an organized knowledge table in which knowledge data is organized on a knowledge time frame basis;
FIG. 26 illustrates an example data structure of an organized knowledge table in which knowledge data is organized on a day basis;
FIG. 29 illustrates an example data structure of a data collection table for tape devices;
FIG. 30 illustrates an example data structure of a copy volume-based data table;

FIG. 32 illustrates an example data structure of a volume-based knowledge table;

FIG. 33 illustrates an example data structure of a drive-based knowledge table;

FIG. 35 illustrates an example merged knowledge table in which data is merged on a knowledge time frame basis;

FIG. 36 illustrates an example of retrieving records with "busy" state;

FIG. 37 illustrates an example of creating a job management table;

FIG. 38 illustrates an example merged knowledge table in which job numbers are set;

FIG. 39 illustrates an example data structure of an organized knowledge table in which knowledge data is organized on a knowledge time frame basis for each copy volume;

FIG. 40 illustrates an example data structure of an organized knowledge table in which knowledge data is organized on a knowledge time frame basis for each tape drive;

FIG. 41 illustrates an example data structure of an organized knowledge table in which knowledge data is organized on a day basis for each copy volume;

FIG. 42 illustrates an example data structure of an organized knowledge table in which knowledge data is organized on a day basis for each tape drive;

FIG. 43 is a first diagram illustrating an example matrix;

FIG. 51 illustrates an example organized knowledge table in which knowledge data is organized on a knowledge time frame basis for each copy volume;

FIG. 52 illustrates an example of searching for an available time;

FIG. 53 illustrates an example proposed schedule table;

FIG. 54 illustrates an example rescheduling of a backup job with job number of "2";

FIG. 57 illustrates an example report screen for a proposed schedule; and

DESCRIPTION OF EMBODIMENTS

Figure 1:
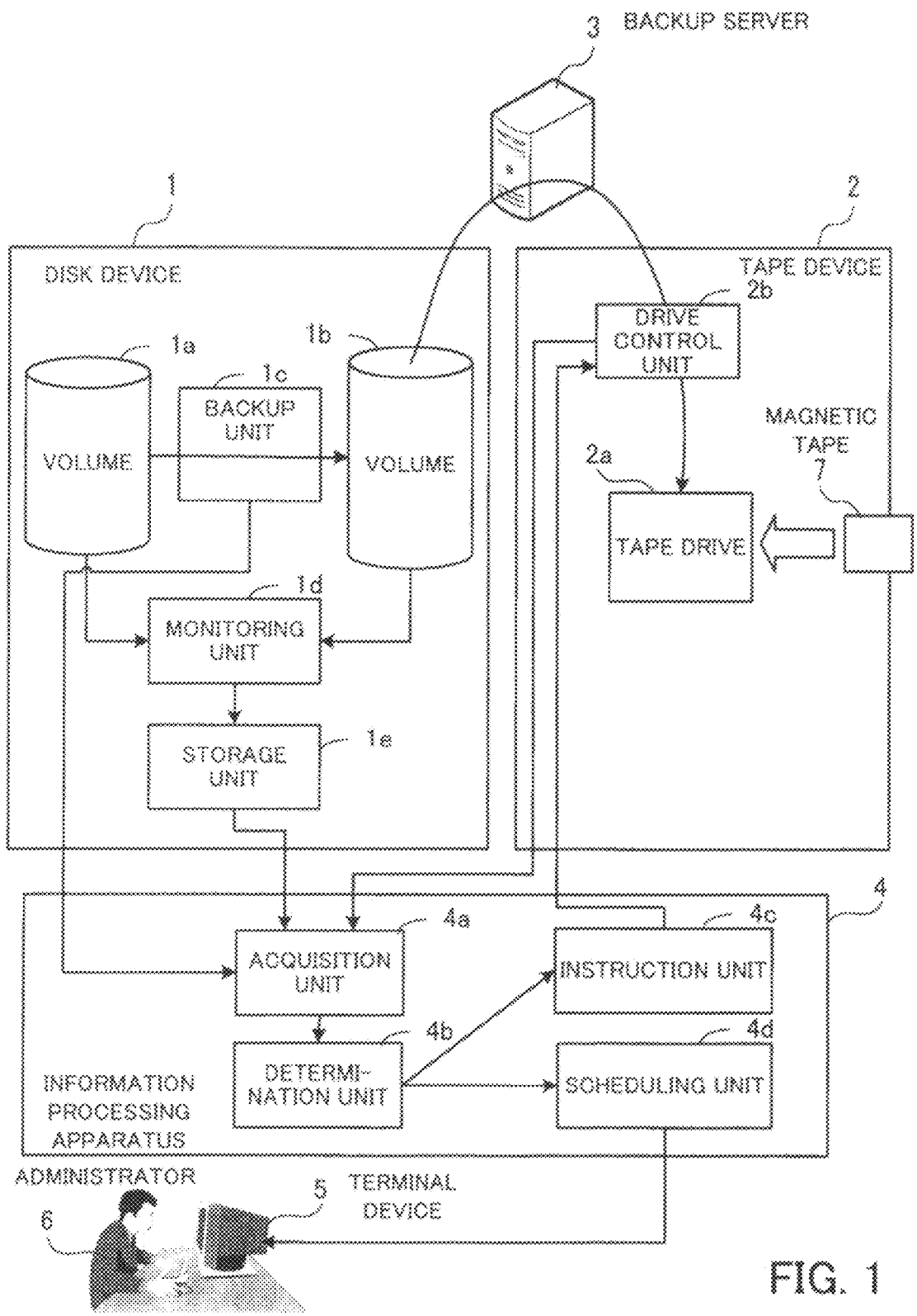
FIG. 1 illustrates a configuration of a first embodiment.

Embodiments of the present invention will now be described with reference to the accompanying drawings, wherein like reference numerals refer to like elements throughout.

(First Embodiment)

FIG. 1 illustrates a configuration of a first embodiment. FIG. 1 illustrates an example system that employs a "Disk to Disk to Tape (D2D2T)" backup system in which data to be backed up (backup source) in a disk device is temporarily copied into another disk device, and then the copy data is stored in a tape drive.

The illustrated system includes a disk device 1, a tape device 2, and a backup server 3, and an information processing apparatus 4. The backup server 3 backs up data from the disk device 1 to the tape device 2. The information processing apparatus 4 collects information of data accesses to the disk device 1 and the tape device 2, and the like, and detects a backup being performed.

The disk device 1 includes a plurality of volumes 1a and 1b, a backup unit 1c, a monitoring unit 1d, and a storage unit 1e. For example, each of the volumes 1a and 1b may be a hard disk drive. Alternatively, a storage system such as a Redundant Arrays of Inexpensive Disks (RAID) system, which is a collection of a plurality of hard disk drives, may be used as one volume 1a, 1b. Yet alternatively, logical volumes produced by dividing the storage area of one hard disk drive or RAID system into a plurality of areas may be used as the volumes 1a and 1b.

The backup unit 1c backs up data from one volume 1a to the other volume 1b. For example, the backup unit 1c backs up the volume images of all data from the volume 1a to the volume 1b. In this connection, a backup is a process of reading data from the volume 1a and writing a copy of the data in the volume 1b.

The monitoring unit 1d monitors the state of access to each volume 1a, 1b, and stores access information indicating the access state in the storage unit 1e. The accesses to be monitored include at least accesses for data read. The storage unit 1e stores the access information.

The tape device 2 includes a tape drive 2a and a drive control unit 2b. The tape drive 2a is capable of reading and writing data to a magnetic tape 7 inserted therein. The magnetic tape 7 is accommodated in a cartridge, for example, and the cartridge accommodating the magnetic tape 7 is inserted in the tape drive. In this connection, an open reel magnetic tape may be used, in which the magnetic tape 7 is not accommodated in a cartridge.

The drive control unit 2b receives an operation instruction for operating the tape drive 2a from an external device such as the backup server 3, and operates the tape drive 2a in accordance with the instruction. For example, upon receipt of an operation instruction for causing the tape drive 2a to write data on the magnetic tape 7, the drive control unit 2b supplies the requested data to the tape drive 2a which then writes the data on the magnetic tape 7. If receiving a response delay instruction from the information processing apparatus 4 after receiving an operation instruction but before responding to the operation instruction, the drive control unit 2b intentionally delays responding to the operation instruction.

The information processing apparatus 4 includes an acquisition unit 4a, a determination unit 4b, an instruction unit 4c, and a scheduling unit 4d.

The acquisition unit 4a acquires information from the disk device 1 and tape device 2. More specifically, information to be acquired from the disk device 1 includes access information stored in the storage unit 1e, and start and end information which indicates the start and end of a backup performed between the volumes 1a and 1b in the disk device 1 and is acquired from the backup unit 1c.

In addition, the acquisition unit 4a monitors inputs of operation instructions to the tape device 2 regarding a backup of data to a magnetic tape in the tape device, and acquires the details of the operation instructions.

The determination unit 4b detects the volume 1b in which a sequential read was performed, on the basis of access information acquired by the acquisition unit 4a, and determines the volume 1b as the backup source for a backup. In addition, the determination unit 4b acquires access information at the time when an operation instruction is input to the tape device 2, and recognizes that a backup source for a backup to the magnetic tape 7 specified in the operation instruction is the volume 1b of the disk device 1.

The determination unit 4b also determines whether the volume 1b that is a backup destination for a backup performed by the backup unit 1c is the volume 1b that is a backup source for a backup performed by the backup server 3.

The instruction unit 4c instructs the tape device 2 to delay responding to an operation instruction, on the basis of start and end information of a backup acquired from the disk device 1. For example, if the operation instruction is input to the tape device 2 after acquisition of the start information and before acquisition of the end information, the instruction unit 4c issues a delay instruction requesting a delay of a response to the operation instruction, to the drive control unit 2b of the tape device 2. For example, the instruction unit 4c issues a delay instruction to the tape device 2 when the backup server 3 performs a backup from the volume 1b that is a backup destination for a backup being performed by the backup unit 1c.

The scheduling unit 4d creates an appropriate schedule of backups recognized by the determination unit 4b. For example, the scheduling unit 4d detects, as a backup execution time, a period between start and end of a sequential read in the volume 1b of the disk device 1. Then, if a plurality of backups overlaps in execution time, the scheduling unit 4d creates a backup schedule by changing the execution time of at least one backup. At this time, the backup execution time is changed to a period during which there is no access to the volume 1b.

In addition, the scheduling unit 4d displays the created backup schedule on a terminal device 5 used by an administrator 6. For example, in the case where the terminal device 5 is directly connected to the information processing apparatus 4, the scheduling unit 4d displays the created backup schedule on a screen of the terminal device 5. In the case where the terminal device 5 is connected to the information processing apparatus 4 over a network, the scheduling unit 4d sends an electronic mail on the mail address of the administrator 6, thereby transferring the backup schedule to the terminal device 5 via a mail server. In this case, the administrator 6 opens the received mail on the terminal device 5 to display the backup schedule on the screen of the terminal device 5.

In such the system, when the backup server 3 backs up data from the volume 1b of the disk device 1 to the magnetic tape 7 of the tape device 2, a sequential read is performed in the volume 1b in the disk device 1. Then, access information indicating the execution of the sequential read in the volume 1b is stored in the storage unit 1e by the monitoring unit 1d.

The access information stored in the storage unit 1e is acquired by the acquisition unit 4a of the information processing apparatus 4. Then, by recognizing the sequential read performed in the volume 1b, the determination unit 4b determines the volume 1b as a backup source. By analyzing the state of access to the volume 1b in the disk device 1 in this way, the execution state of the backup using the volume 1b is recognized. By using a result of comparing the recognized execution states of backups with the states of accesses in the disk device 1 and tape device 2, efficiency of the backups may be improved.

For example, the tape device 2 may be caused to delay responding to an operation instruction when the backup server 3 starts a backup from the volume 1b to the tape device 2 while a backup is performed between the volumes 1a and 1b in the disk device 1.

More specifically, the acquisition unit 4a monitors inputs of operation instructions to the tape device 2 regarding a backup to the magnetic tape 7 in the tape device 2. The determination unit 4b acquires access information at the time when an operation instruction is input to the tape device 2, and determines that a backup source for a backup to the magnetic tape 7 specified in the operation instruction is the volume 1b of the disk device 1. For example, if a sequential read is performed in the volume 1b when an operation instruction for data write is input to the tape device 2, the volume 1b is determined as a backup source.

When the backup unit 1c starts to back up data from the volume 1a to the volume 1b, the acquisition unit 4a acquires start information indicating the start of the backup performed between the volumes 1a and 1b in the disk device 1. The determination unit 4b then checks the volume 1b that is a backup destination for the backup between the volumes 1a and 1b in the disk device 1. That is to say, the determination unit 4b determines whether the volume 1b that is the backup destination for the backup is the volume 1b of the disk device 1 that is a backup source for a backup to the magnetic tape 7 specified in an operation instruction input to the tape device 2. If they are the same volume, the instruction unit 4c outputs a delay instruction to the tape device 2 for delaying a response to the operation instruction. Then, the drive control unit 2b of the tape device 2 operates in accordance with the operation instruction, and after a predetermined delay time elapses, makes a response to the backup server 3.

Delaying a response to an operation instruction in this way reduces the number of data reads per unit time in the volume 1b which is a backup destination for the backup between the volumes of the disk device 1. Reducing the number of data reads results in efficient data write in the backup between the volumes. Improving efficiency of the backup between the volumes suppresses a decrease in processing efficiency of tasks using the volume 1a that is a backup source for the backup between the volumes.

In addition, by using a result of comparing the execution state of a backup with the states of accesses in the disk device 1 and tape device 2, an improved plan for a schedule of backups to be performed by the backup server 3 may be proposed.

More specifically, the scheduling unit 4d determines a period from start to end of a sequential read as a backup execution time. If a plurality of backups overlaps in execution time, the scheduling unit 4d creates a backup schedule by changing an execution time of at least one backup to a period during which there is no access to the backup source volume 1b. The created backup schedule is displayed on the terminal device 5 used by the administrator 6.

With the provided backup schedule specifying appropriate execution times for backups, the administrator 6 is able to set an appropriate backup schedule in the backup server 3. In addition, because the backup schedule is created by using the access information of the disk device 1, a backup time may be changed to a time frame during which there is no access to a backup source volume. That is, the backup server 3 is able to confirm the current backup schedule, but may not be able to confirm the state of access to each volume of the disk device 1. The information processing apparatus 4, on the other hand, is able to confirm the state of existing backups on the basis of the access information of the disk device 1, so as to easily confirm the state of access to each volume as well on the basis of the access information. As a result, in rescheduling, a backup may be scheduled for a period during which there is no access to a backup source volume, thereby making it possible to improve the processing efficiency of backups.

By the way, the functions of the information processing apparatus 4 illustrated in FIG. 1 is realized by a Central Processing Unit (CPU) performing computing processes, for example.

Figure 2:
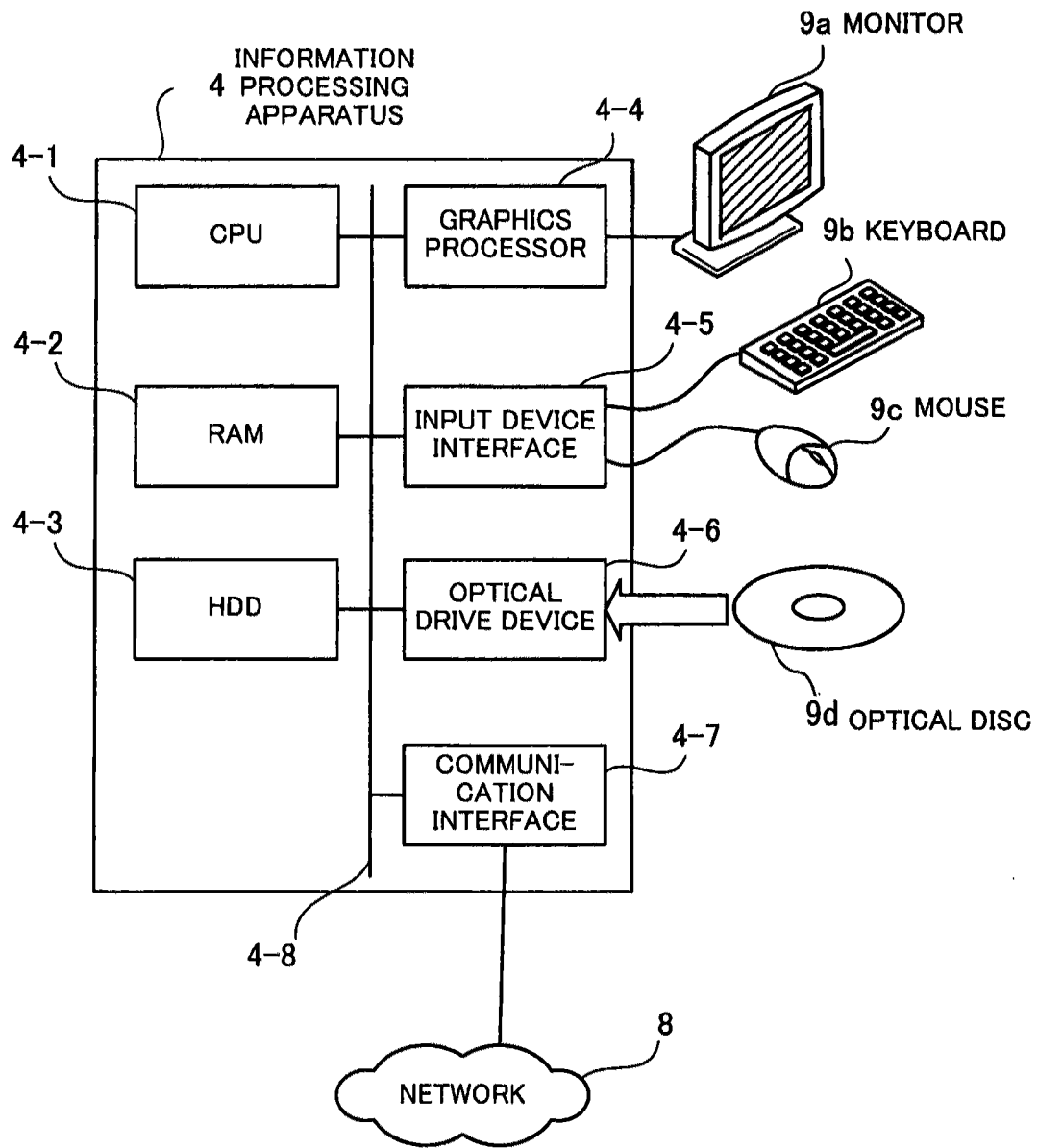
FIG. 2 illustrates an example hardware configuration of an information processing apparatus employed in the first embodiment.

FIG. 2 illustrates an example hardware configuration of an information processing apparatus employed in the first embodiment. The information processing apparatus 4 is entirely controlled by a CPU 4-1. A Random Access Memory (RAM) 4-2 and a plurality of peripheral devices are connected to the CPU 4-1 via a bus 4-8.

The RAM 4-2 functions as a main memory of the information processing apparatus 4. The RAM 4-2 temporarily stores at least part of Operating System (OS) program and application programs to be executed by the CPU 4-1. In addition, the RAM 4-2 stores various data for use in processing of the CPU 4-1.

The peripheral devices connected to the bus 4-8 include a hard disk drive (HDD) 4-3, a graphics processor 4-4, an input device interface 4-5, an optical drive device 4-6, and a communication interface 4-7.

The HDD 4-3 magnetically reads and writes data to an in-built disk, and functions as a secondary memory of the information processing apparatus 4. The HDD 4-3 stores the OS program, application programs, and various data. As a secondary memory, a semiconductor memory device, such as a flash memory, may be used.

The graphics processor 4-4 is connected to a monitor 9a. The graphics processor 4-4 displays an image on the screen of the monitor 9a under the control of the CPU 4-1. As the monitor 9a, a display device using Cathode Ray Tube (CRT), a liquid crystal display device or the like may be used.

The input device interface 4-5 is connected to a keyboard 9b and a mouse 9c, and transfers signals from the keyboard 9b and mouse 9c to the CPU 4-1. The mouse 9c is one type of pointing devices, and a pointing device, touch panel, tablet, touch pad, track ball or the like may be used instead.

The optical drive device 4-6 reads data from an optical disc 9d with a laser beam. The optical disc 9d is a portable recording medium on which data is recorded so as to be read using reflected light. Such optical discs 9d include Digital Versatile Discs (DVD), DVD-RAMS, Compact Disc Read Only Memories (CD-ROM), CD-Recordable (CD-R)/ReWrittable (RW).

The communication interface 4-7 is connected to a network 8, and performs data communications with the disk device 1 and tape device 2 via the network 8.

With such a hardware configuration, the processing functions of the first embodiment are realized.

(Second Embodiment)

The following describes a second embodiment in which efficiency of backups in a data backup system using the D2D2T backup method is improved through cooperation between a disk device and a tape device.

[System Configuration]

Figure 3:
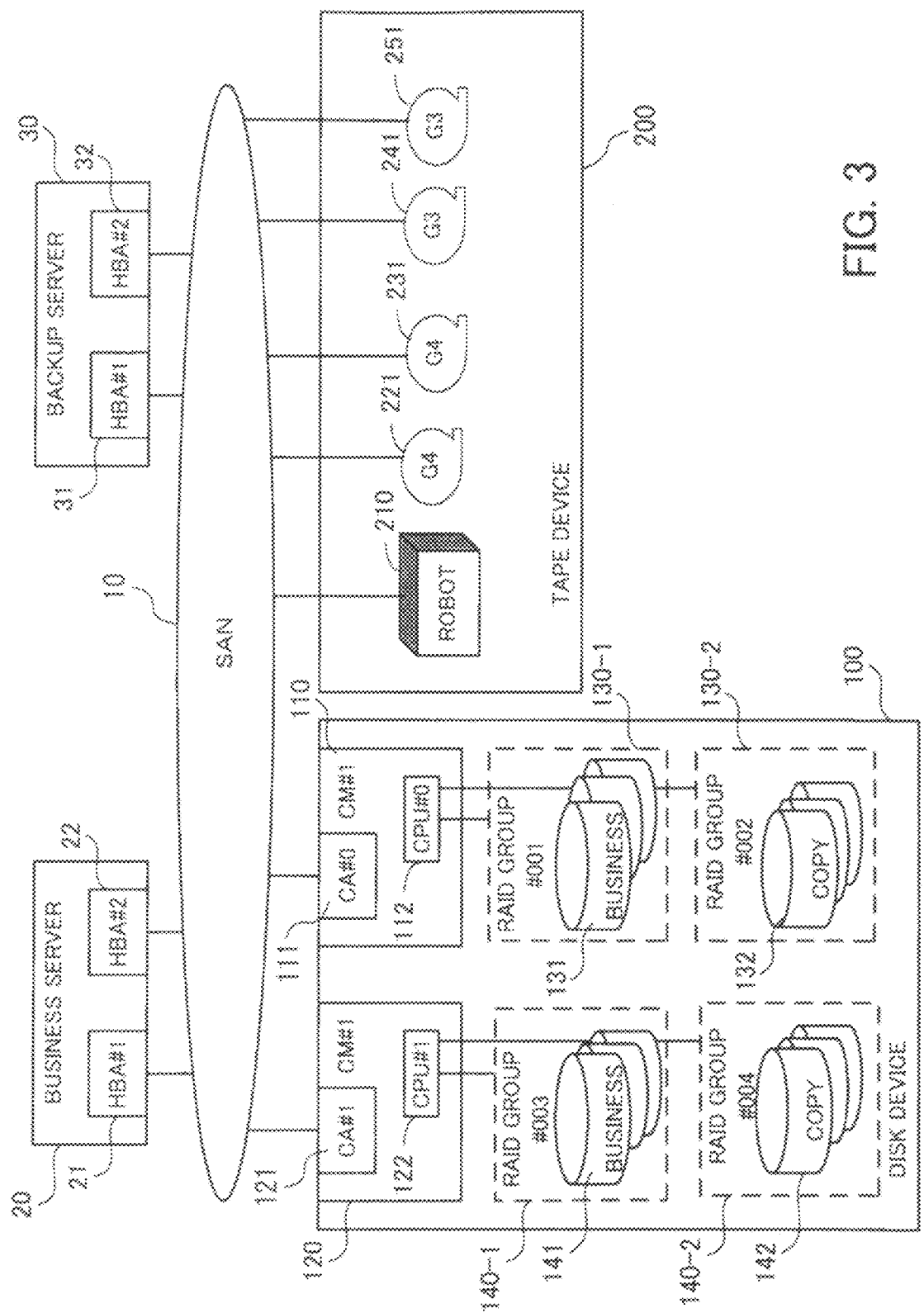
FIG. 3 illustrates an example system configuration according to a second embodiment.

FIG. 3 illustrates an example system configuration according to the second embodiment. In the second embodiment, a business server 20, a backup server 30, a disk device 100, and a tape device 200 are connected to each other over a Storage Area Network (SAN) 10.

The business server 20 is a computer that performs various processes using data stored in the disk device 100. For example, the business server 20 accesses a database stored in the disk device 100 in response to a transaction request from a user, and returns its result to a terminal device used by the user. The business server 20 includes a plurality of Host Bus Adapters (HBA) 21 and 22. The HBAs 21 and 22 are connected to the SAN 10. The business server 20 is capable of accessing the disk device 100 via the HBAs 21 and 22.

The backup server 30 backs up data from the disk device 100 to a medium (magnetic tape) mounted in the tape device 200. For example, the backup server 30 performs backups in accordance with a predetermined schedule. In a backup, the backup server 30 first reads data to be backed up, from the disk device 100, and writes the data on the medium mounted in the tape device 200. The backup server 30 includes a plurality of HBAs 31 and 32 connected to the SAN 10. The backup server 30 is capable of accessing the disk device 100 and tape device 200 via the HBAs 31 and 32.

The disk device 100 provides a RAID system with a plurality of hard disk drives. The disk device 100 includes a plurality of controller modules (CM) 110 and 120. The controller modules 110 and 120 control the RAID system in the disk device 100 in accordance with requests received from the business server 20 and backup server 30 via the SAN 10.

The controller module 110 has a channel adaptor (CA) 111 and CPU 112. The channel adaptor 111 is a communication interface for performing communications with the business server 20 and backup server 30. The CPU 112 manages RAID groups 130-1 and 130-2 connected thereto. The CPU 112 also analyzes a request from the business server 20 or backup server 30, and accesses the RAID group 130-1 or 130-2.

The controller module 120 has a channel adaptor 121 and CPU 122. The channel adaptor 121 is a communication interface for performing communications with the business server 20 and backup server 30. The CPU 122 manages the RAID groups 140-1 and 140-2 connected thereto. The CPU 122 also analyzes a request from the business server 20 or backup server 30, and accesses the RAID group 140-1 or 140-2.

The disk device 100 has a plurality of RAID groups 130-1, 130-2, 140-1, and 140-2. Each RAID group 130-1, 130-2, 140-1, 140-2 is divided into a plurality of logical volumes each given an identifier called Logical Unit Number (LUN). In the example of FIG. 3, logical volumes that store data to be accessed from the business server 20 are called business volumes 131 and 141. In addition, logical volumes that store a copy of data stored in the business volumes 131 and 141 are called copy volumes 132 and 142.

In the disk device 100, data in the business volume 131 is copied to the copy volume 132 in accordance with a predetermined schedule, for example, at a specified time with snapshot technology. Similarly, data in the business volume 141 is copied to the copy volume 142 in accordance with the predetermined schedule.

The tape device 200 selects one of a plurality of media, and reads and writes data to the selected medium. The tape device 200 includes a robot 210 and a plurality of tape drives 221, 231, 241, and 251.

The robot 210 takes a media cartridge out of a rack (instrumentation rack) accommodating media, and inserts the cartridge into a tape drive 221, 231, 241, or 251. The robot 210 also stores a medium ejected from a tape drive 221, 231, 241, or 251 at a specified position of the rack.

The tape drives 221, 231, 241, and 251 read and write data to media. In the example of FIG. 3, the tape drives 221 and 231 are based on the fourth-generation Linear Tape-Open (LTO) technology (LTO Ultrium 4). The tape drives 241 and 251 are based on the third-generation LTO technology (LTO Ultrium 3). In this connection, the fourth-generation technology realizes faster data input and output than the third-generation technology.

[Summary of Improvement in Efficiency of Backups]

The system illustrated in FIG. 3 improves efficiency of backups. To this end, for example, a process for providing improvement information for a backup schedule and a delay control process of delaying an operation of a tape drive at the time of backup are performed.

Figure 4:
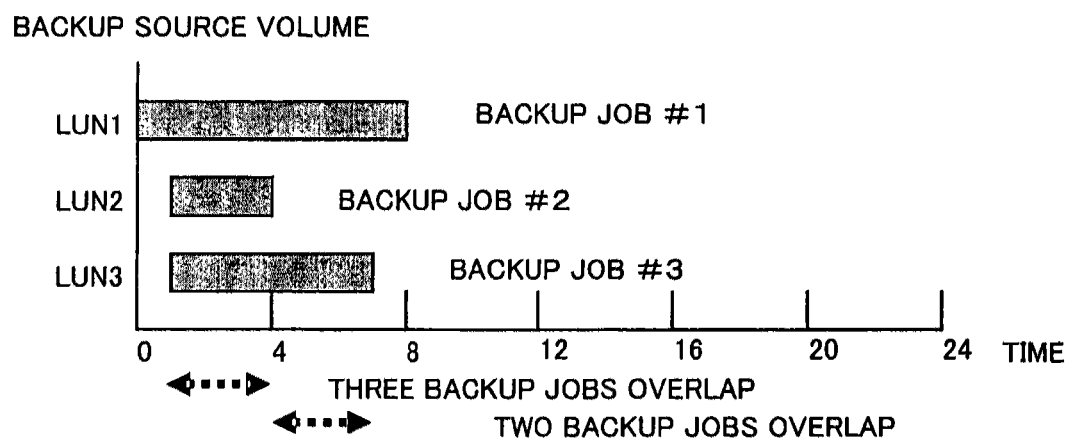
FIG. 4 illustrates an example backup schedule to be improved.

FIG. 4 illustrates an example backup schedule to be improved. FIG. 4 illustrates the execution time frames of backup jobs that are performed in a day. Referring to the example of FIG. 4, "backup job #1" for "LUN1" is executed in a time frame from 00:00 to 08:00. "Backup job #2" for "LUN2" is executed in a time frame from 01:00 to 04:00. "Backup job #3" for "LUN3" is executed in a time frame from 01:00 to 07:00.

According to this schedule, three backup jobs are executed in the time frame from 01:00 to 04:00. In addition, two backup jobs are executed in the time frame from 04:00 to 07:00.

Backup data of the disk device 100 is transferred to the tape device 200 via the backup server 30. Therefore, if some jobs are executed simultaneously as illustrated in FIG. 4, a heavy load is placed on the backup server 30. This fails to make the best use of the performance of tape drives.

In the second embodiment, a tape state monitoring unit 271 of the tape device 200 detects a time frame in which some backup jobs are executed, and proposes an improved backup schedule. For example, the tape state monitoring unit 271 proposes that at least one of a plurality of backup jobs executed simultaneously be executed in another available time frame. This proposal is given from the tape state monitoring unit 271 to an administrator via an email, for example.

Figure 5:
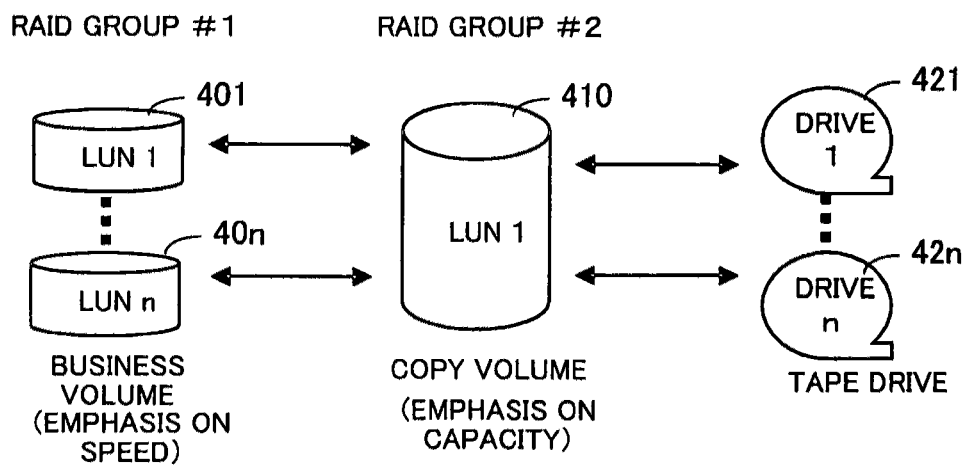
FIG. 5 illustrates an example backup in which delay control for delaying an operation of a tape drive is effective.

FIG. 5 illustrates an example backup in which delay control for delaying an operation of a tape drive is effective. Referring to the example of FIG. 5, as the business volumes 401, ..., 40n, logical volumes in the RAID group #1 which realizes fast access are used, placing an emphasis on speed. As the copy volume 410, on the other hand, a large capacity logical volume provided in one RAID group #2 is used, placing an emphasis on capacity. For example, the RAID group #2 provided with the copy volume 410 is called a nearline disk drive. A nearline disk drive refers to a disk device which is not often accessed but is able to be accessed immediately when needed. Then, data in the plurality of business volumes 401, ..., 40n is backed up to the single copy volume 410. The backup data stored in the copy volume 410 is then backed up to a plurality of tape drives 421 ..., 42n corresponding to the respective backup source business volumes.

In the "Disk to Disk (D2D)", a large capacity nearline disk device is often used as an area for backup as illustrated in FIG. 5. Therefore, an n-to-one backup (n is an integer of 1 or greater) is performed, which results that an access confliction easily occurs within the RAID group #2 used as a nearline disk device. In addition, if the D2D backup and a backup from a copy volume to a medium overlap, a load of a copy from a business volume becomes higher in accordance with a load of reading from the copy volume. This is because there occurs an access to data which has not been transferred, in the business volume.

In addition, an effective capacity is secured in the RAID 5, as compared with the RAID 1. Therefore, in general, a RAID 5 configuration is employed for the area of a copy volume. However, in the RAID 5, a write response is slower than a read response. As a result, if a backup from a business volume to a copy volume and a backup from a copy volume to a tape device overlap, a decrease in efficiency of the data transfer to the tape device is considerable.

Therefore, in the second embodiment, individual operations involved in a backup to the tape device are appropriately delayed while a D2D backup is performed in the disk device 100. This makes it possible to suppress a decrease in processing efficiency due to an access conflict in the copy volume 410. In this connection, the D2D backup is performed with snapshot technology. A snapshot is a process of copying all data of a business volume to a copy volume at the time of starting the backup without interrupting accesses to the business volume.

[Functions Used for Improving Efficiency of Backups]

The following describes the functions of the disk device 100 and tape device 200 used for improving efficiency of backups.

The disk device 100 and tape device 200 collect information on data accesses to recognize backup operations, organize the collected information, and determine an improved backup schedule and also determine whether to delay an operation of the tape device 200. To do so, the following parameters relating to information accumulation and organization are previously set in the disk device 100 and tape device 200.

[Data Collection Interval]

A data collection interval is an interval at which to monitor business volumes, a copy volume, and a tape device (i.e. to collect data). For example, a value indicating ten seconds is set.

[Knowledge Period]

A knowledge period is the length of time during which collected data is retained. For example, a value indicating one week is set.

[Knowledge Unit]

A knowledge unit is the length of a time frame for determining a "state (idle/busy)" from collected data. For example, a value indicating one hour is set.

[Threshold]

A threshold is a value for use in determining whether to keep, as a record, an I/O count indicating the number of I/Os, which is acquired at data collection intervals. If the I/O count is equal to or greater than the threshold, the access count is recorded.

Figure 6:
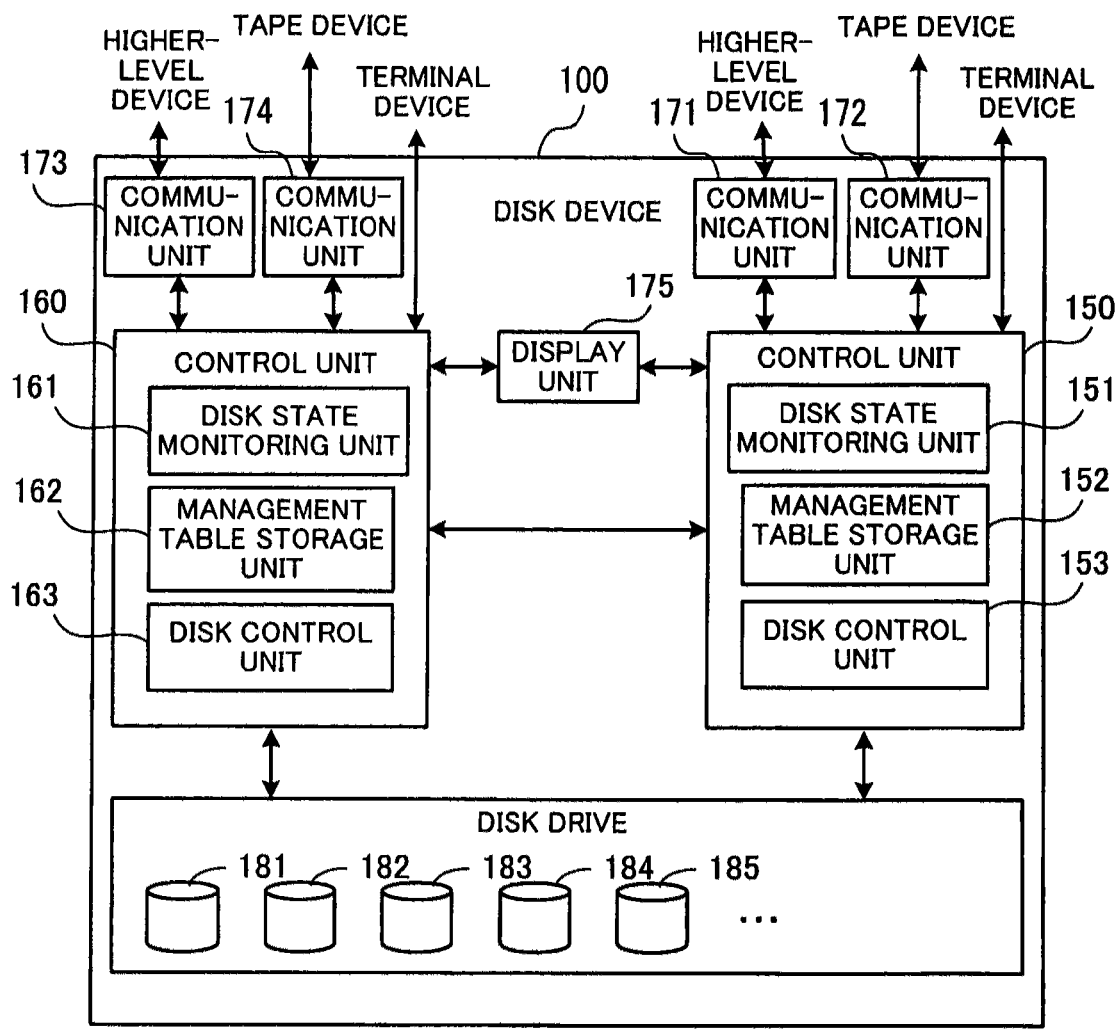
FIG. 6 is a functional block diagram of a disk device.

FIG. 6 is a functional block diagram of a disk device. The disk device 100 has a plurality of control units 150 and 160, a plurality of communication units 171 to 174, a display unit 175, and a plurality of disk drives 181, 182, 183, 184, 185, ....

The control unit 150 and communication units 171 and 172 are functions realized by the controller module 110. The communication unit 171 performs communications with a higher-level device such as the business server 20 or backup server 30. The communication unit 172 performs communications with the tape device 200.

The control unit 150 performs data communications with the business server 20 and backup server 30 via the communication unit 171. The control unit 150 also performs data communications with the tape device 200 via the communication unit 172. The control unit 150 also performs data communications with a terminal device directly connected thereto.

The control unit 150 includes a disk state monitoring unit 151, a management table storage unit 152, and a disk control unit 153. The disk state monitoring unit 151 supports a tape backup in cooperation with the tape device 200. For example, the control unit 150 collects useful information for realizing an efficient tape backup, from the business volume 131 and copy volume 132, and sends the information to the tape device 200. The management storage unit 152 stores information collected by the disk state monitoring unit 151. For example, a partial storage area of the RAM in the controller module 110 is used as the management table storage unit 152.

The disk control unit 153 accesses the business volume or copy volume in accordance with a request from the business server 20 or backup server 30. In addition, the disk control unit 153 stores a copy of data stored in the business volume 131, in the copy volume 132 with the "Disk to Disk" technique.

The control unit 160 and communication units 173 and 174 are functions realized by the controller module 120. The communication unit 173 performs communications with a higher-level device such as the business server 20 or backup server 30. The communication unit 174 performs communications with the tape device 200.

The control unit 160 performs data communications with the business server 20 or backup server 30 via the communication unit 173. The control unit 160 also performs data communications with the tape device 200 via the communication unit 174. The control unit 160 also performs data communications with a terminal device directly connected thereto.

The control unit 160 includes a disk state monitoring unit 161, management table storage unit 162, and disk control unit 163. The disk state monitoring unit 161 supports a tape backup in cooperation with the tape device 200. For example, the control unit 160 collects useful information for realizing an effective tape backup, from the business volume 141 and copy volume 142, and sends the information to the tape device 200. The management table storage unit 162 stores information collected by the disk state monitoring unit 161. For example, a partial storage area of a RAM in the controller module 120 is used as the management table storage unit 162. The disk control unit 163 stores a copy of data stored in the business volume 141, in the copy volume 142 with the "Disk to "Disk" technique.

The display unit 175 displays the state of the disk device 100, and the like. For example, the display unit 175 displays an error code of an error detected by the control unit 150, 160.

The disk drives 181, 182, 183, 184, 185, . . . , read and write data to magnetic disks. The disk device 100 is capable of accommodating disk drives of different performances. In this case, disk drives that provide a faster access speed constitute one RAID group, and the storage area of the RAID group may be divided to realize business volumes. In addition, disk drives that provide a larger capacity constitute one RAID group, and the storage area of the RAID group is divided to realize copy volumes. In the case where the business volume and copy volume are realized by different RAID groups, a RAID 0+1 system is adopted for the RAID group to which the business volume belongs, whereas a RAID 5 system is adopted for the RAID group to which the copy volume belongs.

Figure 7:
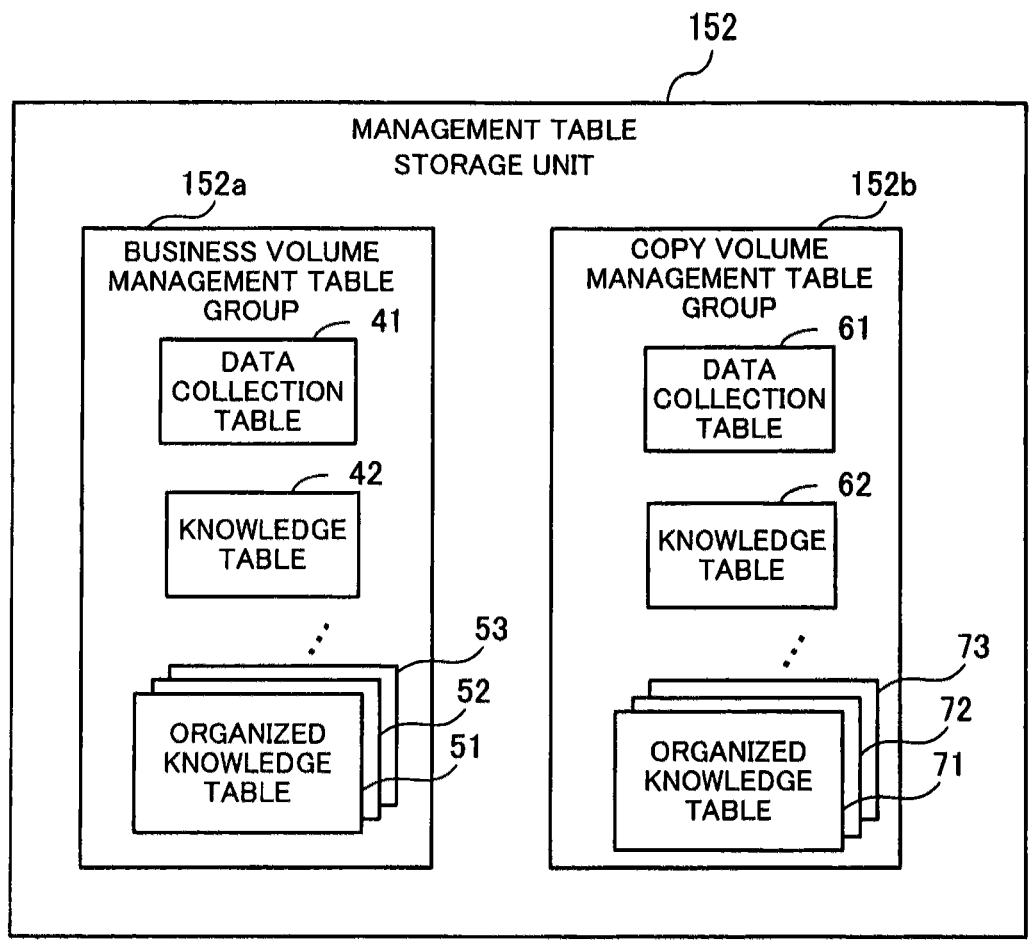
FIG. 7 illustrates example tables stored in a management table storage unit of the disk device.

FIG. 7 illustrates example tables stored in a management table storage unit of a disk device. A plurality of management tables is stored in the management table storage unit 152. The management tables to be stored are classified into a business volume management table group 152a and a copy volume management table group 152b. The business volume management table group 152a is a collection of management tables for managing data collected from the business volume 131. The copy volume management table group 152b is a collection of management tables for managing data collected from the copy volume 132.

The business volume management table group 152a includes a data collection table 41, a knowledge table 42, and a plurality of organized knowledge tables 51, 52, 53, . . . . The data collection table 41 is a data table for storing data collected from the business volume 131. The knowledge table 42 is a data table in which an I/O state is set for each predetermined unit (knowledge unit)-based time frame (knowledge time frame) on the basis of data set in the data collection table 41. The organized knowledge tables 51, 52, 53, . . . are data tables in which a result of organizing data of the knowledge table 42 on a predetermined unit time basis is set. For example, a result of organizing data with a period of knowledge unit as a unit time is set in the organized knowledge table 51, and a result of organizing data with one day as a unit time is set in the organized knowledge table 52.

The copy volume management table group 152b includes a data collection table 61, a knowledge table 62, and a plurality of organized knowledge tables 71, 72, 73, . . . . The data collection table 61 is a data table in which data collected from the copy volume 132 is stored. The knowledge table 62 is a data table in which a result of organizing data stored in the data collection table 61 on a predetermined unit (knowledge unit) basis is set. The organized knowledge tables 71, 72, 73, . . . are data tables in which a result of organizing data of the knowledge table 62 on a predetermined unit time basis is set. For example, a result of organizing data with a period of knowledge unit as a unit time is set in the organized knowledge table 71, and a result of organizing data with one day as a unit time is set in the organized knowledge table 72.

The following describes the functions of the tape device 200.

Figure 8:
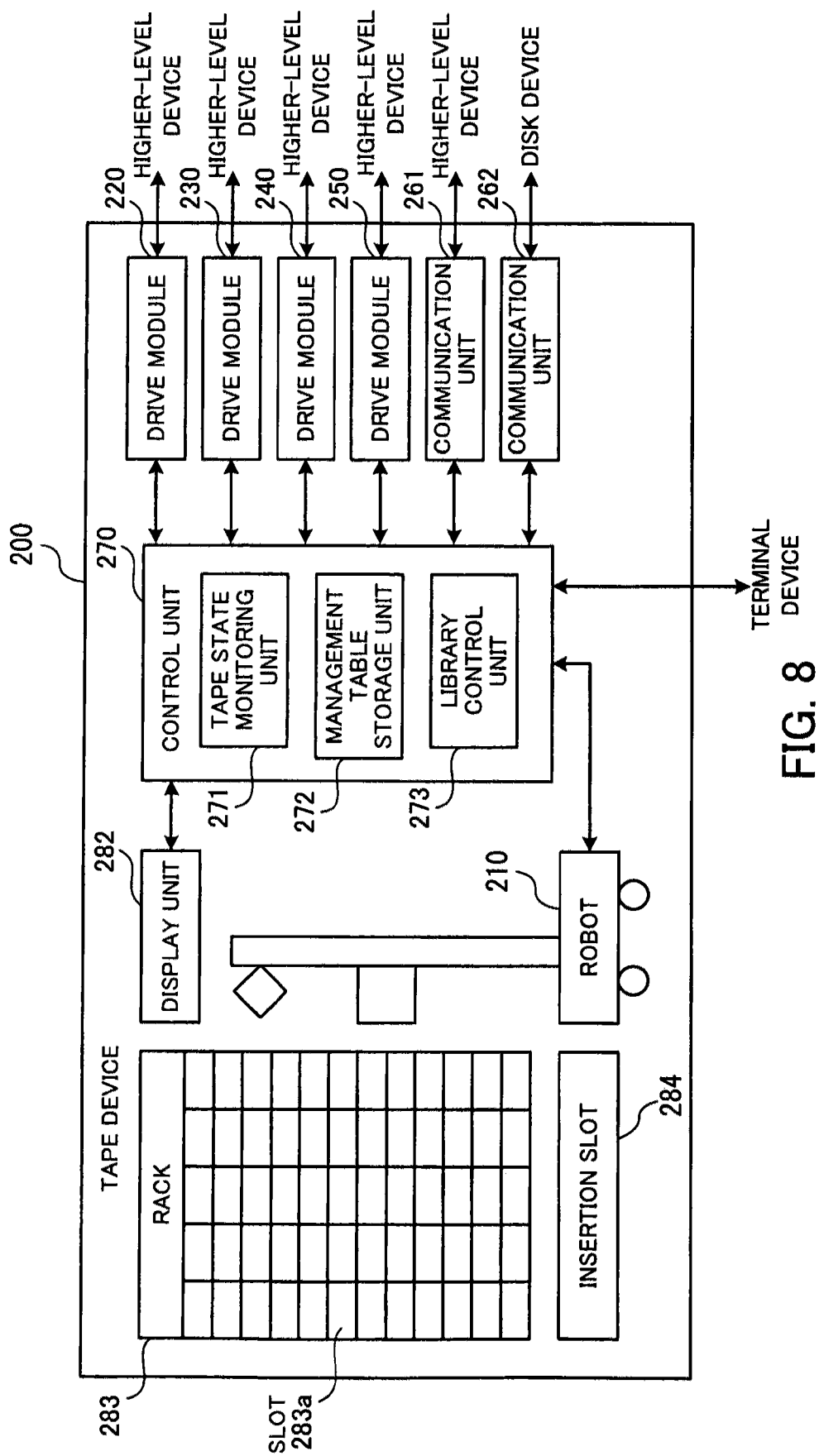
FIG. 8 is a functional block diagram of a tape device.

FIG. 8 is a functional block diagram of a tape device. The tape device 200 has a robot 210, a plurality of drive modules 220, 230, 240, 250, a plurality of communication units 261 and 262, a control unit 270, a display unit 282, a rack 283, and an insertion slot 284.

The drive modules 220, 230, 240, and 250 have built-in tape drives 221, 231, 241, and 251 illustrated in FIG. 3, and control the built-in tape drives 221, 231, 241, and 251 for write of data received via the SAN 10 to media, and the like.

The communication unit 261 performs communications with a higher-level device such as the business server 20 or backup server 30. The communication unit 262 performs communications with the disk device 100.

The control unit 270, display unit 282, rack 283, and insertion slot 284 use the robot 210 to load and unload media in/from the tape drives.

The control unit 270 is a function realized by the CPU and RAM. The control unit 270 includes a tape state monitoring unit 271, a management table storage unit 272, and a library control unit 273.

The tape state monitoring unit 271 controls a data backup from the disk device 100 to a medium. The tape state monitoring unit 271 also collects access information such as an operation state of a tape drive. The tape state monitoring unit 271 communicates with the disk state monitoring units 151 and 161 of the disk device 100 via the communication unit 262 to acquire access information collected by the disk device 100.

Further, the tape state monitoring unit 271 analyzes a "Disk to Tape" backup on the basis of access information acquired from the disk device 100 and access information collected by the own unit 271. For example, the tape state monitoring unit 271 detects a backup source copy volume for the backup on the basis of the data acquired from the disk device 100. In addition, for example, when receiving data to be backed up, from the backup server 30, the tape state monitoring unit 271 determines a copy volume in the disk device 100 in which a sequential read is performed, as a backup source volume for a "Disk to Tape" backup. The tape state monitoring unit 271 also detects a backup destination copy volume for a "Disk to Disk" backup performed in the disk device 100, on the basis of the data acquired from the disk device 100.

Then, the tape state monitoring unit 271 determines an efficient backup time on the basis of the access information acquired from the disk device 100 and the access information collected by the own unit 271. For example, if backup jobs are executed simultaneously, the tape state monitoring unit 271 searches for an available time for a backup, and creates an improved schedule plan by changing the backup execution time to the available time. The tape state monitoring unit 271 notifies a system administrator of the improved backup schedule plan via an email, for example. In addition, the tape state monitoring unit 271 delays a media mounting process, a ready response process, a write process, or the like on the basis of the access information acquired from the disk device 100. The mounting process is a process of causing a system to recognize a storage medium or the like. The ready response process is a process of making a notification that a storage medium or the like is ready to be accessed.

The management table storage unit 272 stores information collected by the tape state monitoring unit 271, and the like. For example, a partial storage area of a RAM in the tape device 200 is used as the management table storage unit 272.

The library control unit 273 controls the robot 210 to insert a tape cartridge accommodated in the rack 283 into a tape drive. The library control unit 273 also controls the robot 210 to accommodate a tape cartridge ejected from a tape drive into the rack 283.

Under the control of the library control unit 273, the robot 210 takes a tape cartridge out of the rack 283 with a mechanical arm, carries the tape cartridge to a tape drive, and inserts the tape cartridge into the media slot of the tape drive. In addition, under the control of the library control unit 273, the robot 210 takes a tape cartridge from the media slot of a tape drive with the arm, carries the tape cartridge to the rack 283, and inserts the tape cartridge at a specified position in the rack 283.

The display unit 282 displays information specified by the library control unit 273 on a screen. The rack 283 is provided with a plurality of slots 283*a* for accommodating tape cartridges. The insertion slot 284 is an opening where a tape cartridge is inserted from outside into the rack 283.

Figure 9:
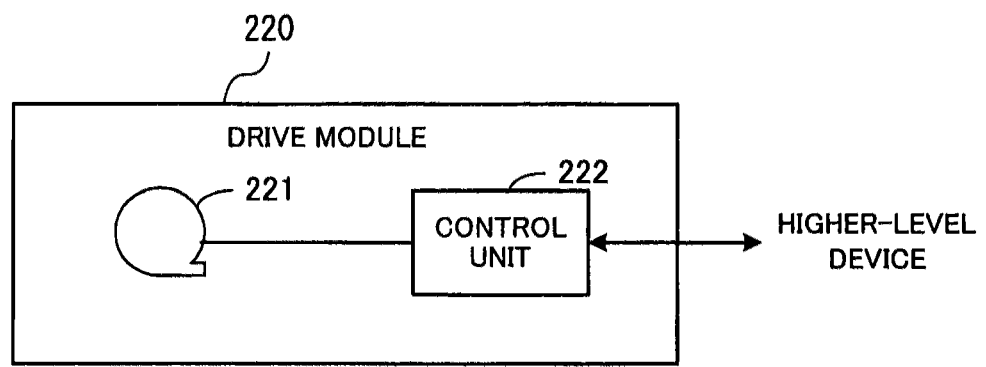
FIG. 9 illustrates an example internal configuration of a drive module.

FIG. 9 is an example internal configuration of a drive module. The drive module 220 includes a tape drive 221 and control unit 222. The tape drive 221 reads and writes data to a medium in a tape cartridge inserted therein. The control unit 222 controls the tape drive 221 in accordance with an access request from a higher-level device.

The other drive modules 230, 240, and 250 may have the same internal configuration as the drive module 220 illustrated in FIG. 9.

Figure 10:
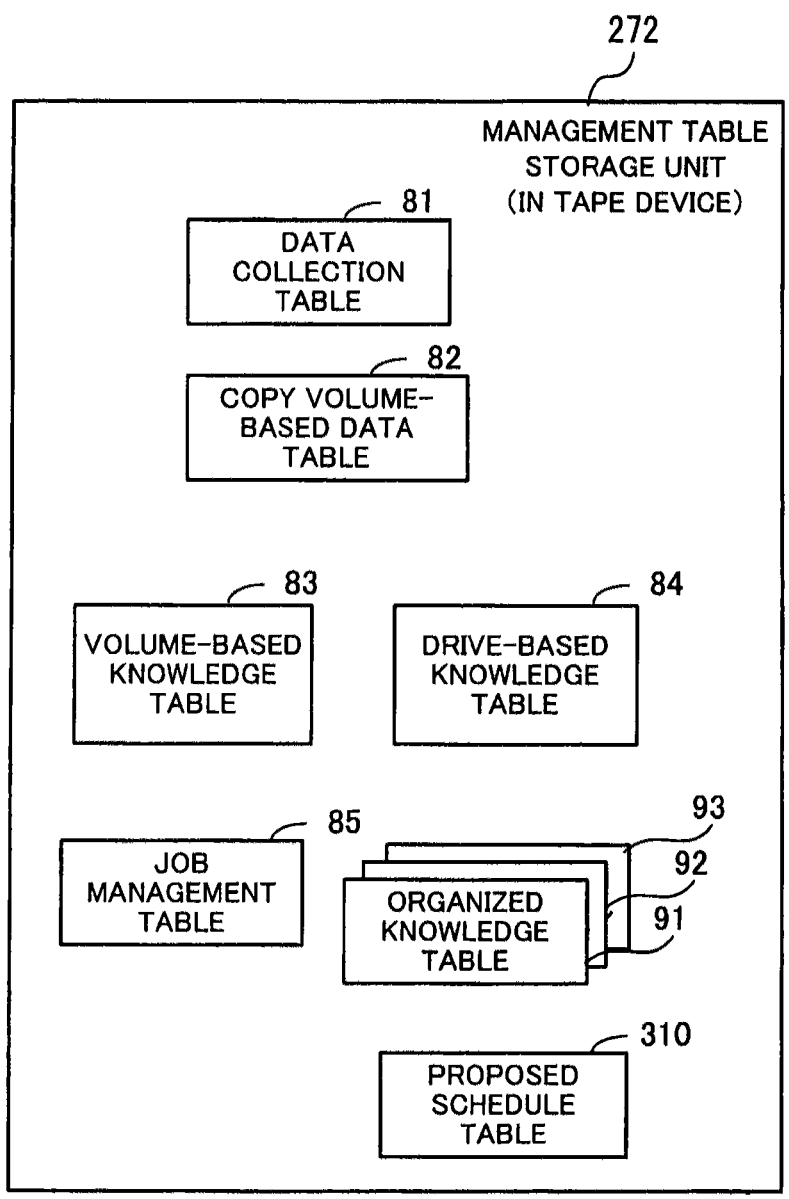
FIG. 10 illustrates example tables stored in a management table storage unit in the tape device.

FIG. 10 illustrates example tables stored in a management table storage unit of a tape device. The management table storage unit 272 includes a data collection table 81, a copy volume-based data table 82, a volume-based knowledge table 83, a drive-based knowledge table 84, a job management table 85, organized knowledge tables 91, 92, 93, . . . , and a proposed schedule table 310.

The data collection table 81 is a data table in which data collected from tape drives is set. The copy volume-based data tables 82 contain only data on each backup source copy volume extracted from the data collection table 81. The volume-based knowledge table 83 is a data table in which a result of extracting and aggregating data on each copy volume from the data collection table 81 on a predetermined unit (knowledge unit) basis is set. The drive-based knowledge table 84 is a data table in which a result of extracting and aggregating data on each tape drive from the data collection table 81 on a predetermined unit (knowledge unit) basis is set. The job management table 85 is a data table in which information on each backup job is set. Each organized knowledge table 91, 92, 93, . . . is a data table in which a result of organizing data stored in the volume-based knowledge table 83 or drive-based knowledge table 84 under predetermined conditions is set. For example, a result of organizing the data with a knowledge unit as a unit time for each copy volume is set in the organized knowledge table 91.

The proposed schedule table 310 is a data table in which an improved plan for backup jobs is set.

[Outline of Cooperative Process]

The following outlines a cooperative process relating to a backup between devices.

Figure 11:
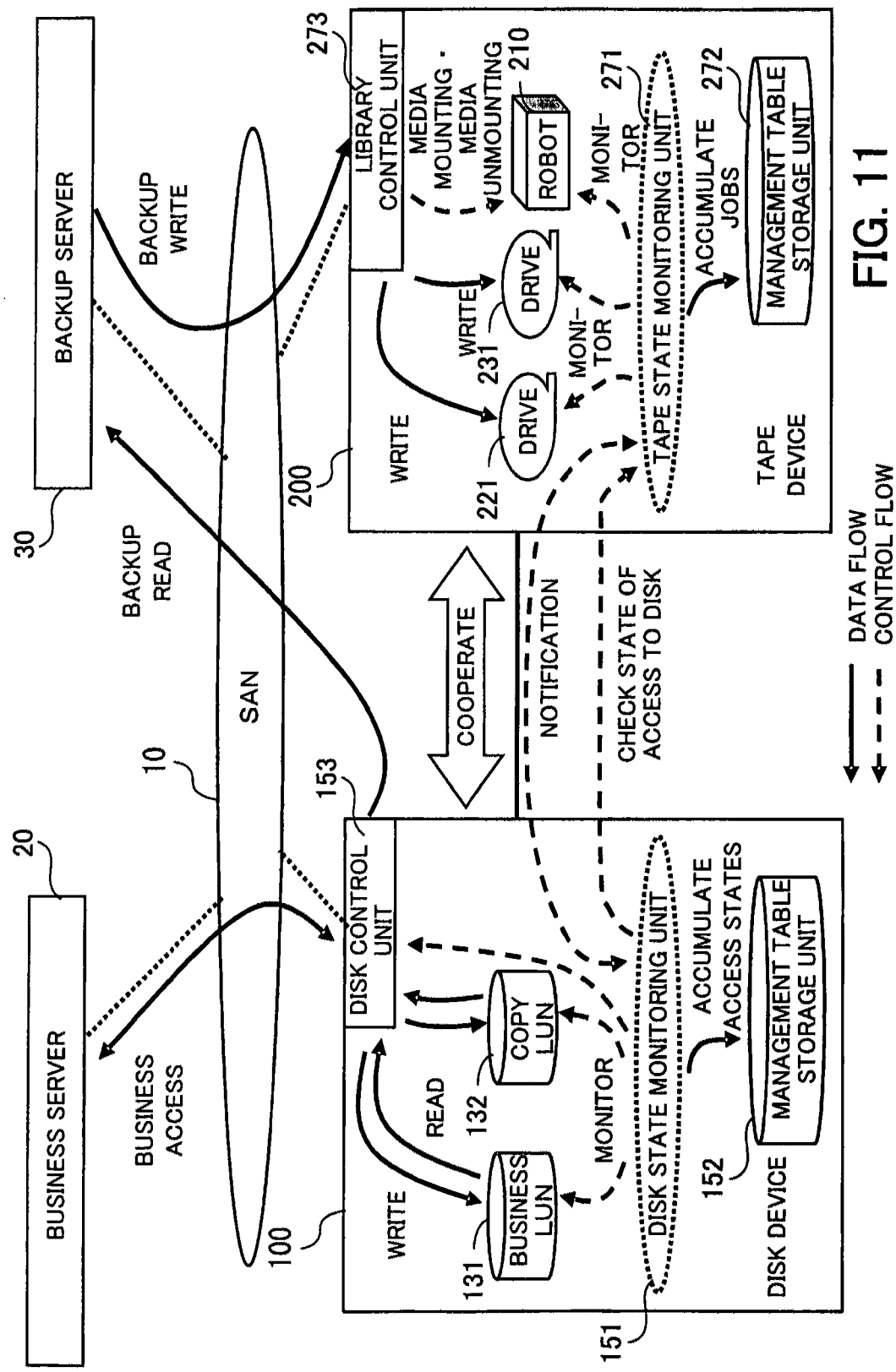
FIG. 11 illustrates a cooperative process between devices.

FIG. 11 illustrates a cooperative process between devices. The business server 20 makes a business-related access (business access) to a business volume 131 of the disk device 100. The disk control unit 153 of the disk device 100 reads and writes data to the business volume 131 in response to the business access. The disk control unit 153 of the disk device 100 also backs up data from the business volume 131 to a copy volume 132 in accordance with an instruction from the backup server 30. In this backup from the business volume 131 to the copy volume 132, a sequential read of data from the business volume 131 and a sequential write of the data to the copy volume 132 are performed under the control of the disk control unit 153.

Such reading and writing to the business volume 131 and copy volume 132 are monitored by the disk state monitoring unit 151 in the disk device 100. The disk state monitoring unit 151 stores information such as the number of accesses in the management table storage unit 152. In addition, when a backup from the business volume 131 to the copy volume 132 starts, the disk state monitoring unit 151 notifies the tape device 200 of the start of the D2D backup.

The backup server 30 sends the disk device 100 an instruction for a backup from the business volume to the copy volume, in accordance with a predetermined schedule. In addition, the backup server 30 performs a backup from the copy volume 132 of the disk device 100 to the tape device 200 in accordance with a predetermined schedule. In this case, the backup server 30 performs backup read from the copy volume 132 of the disk device 100. At this time, the disk control unit 153 of the disk device 100 performs a sequential read on the copy volume 132, and sends the read data to the backup server 30. The backup server 30 temporarily stores the data acquired from the disk device 100 through the backup read, in an internal memory.

After that, the backup server 30 performs backup write to the tape device 200. At this time, the library control unit 273 of the tape device 200 instructs the robot 210 to perform a media mounting operation. The robot 210 operates as instructed. When a medium accommodated in the tape drive 221 gets ready to write data thereon through a series of operations including the media mounting, the library control unit 273 of the tape device 200 notifies the backup server 30 of this state. Then, the backup server 30 sends data to be backed up, to the tape device 200. In the tape device 200, the tape drive 221 writes the data received from the backup server 30, on the medium mounted therein. When the writing of data to be backed up is completed, the library control unit 273 unmounts the medium. The unmounting is a process for excluding a medium from being monitored in this system.

Backup-related operations of the tape drives 221 and 231 and robot 210 are monitored by the tape state monitoring unit 271. The tape state monitoring unit 271 stores information obtained through the monitoring, in the management table storage unit 272. In addition, the tape state monitoring unit 271 consults the management table storage unit 152 of the disk device 100 to check the state of access to the disk device 100 at predetermined timing.

[Details of Process of Collecting and Organizing Data Regarding Business Volume]

The following describes a process of collecting and organizing information indicating the state of access to a business volume.

Figure 12:
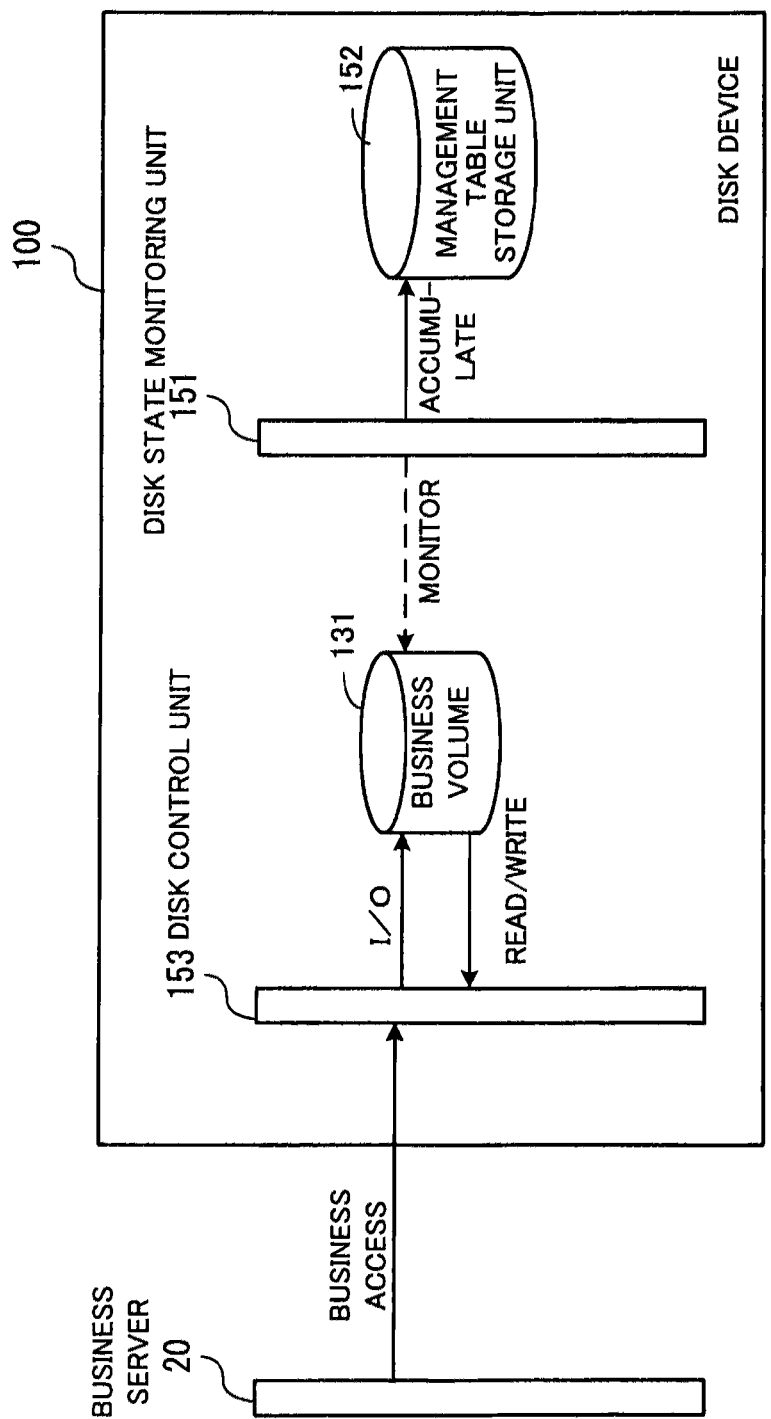
FIG. 12 illustrates how to collect data regarding a business volume.

FIG. 12 illustrates how to collect data regarding a business volume. A business access from the business server 20 is acknowledged by the disk control unit 153 of the disk device 100. The disk control unit 153 makes an I/O request for reading or writing to the business volume 131 in response to the business access, and receives its response. Then, the disk control unit 153 sends a result of accessing the business volume 131 to the business server 20.

At this time, I/O operations to the business volume 131 are monitored by the disk state monitoring unit 151. Then, the disk state monitoring unit 151 stores the state of the I/O operations to the business volume 131, in the management table storage unit 152.

Figure 13:
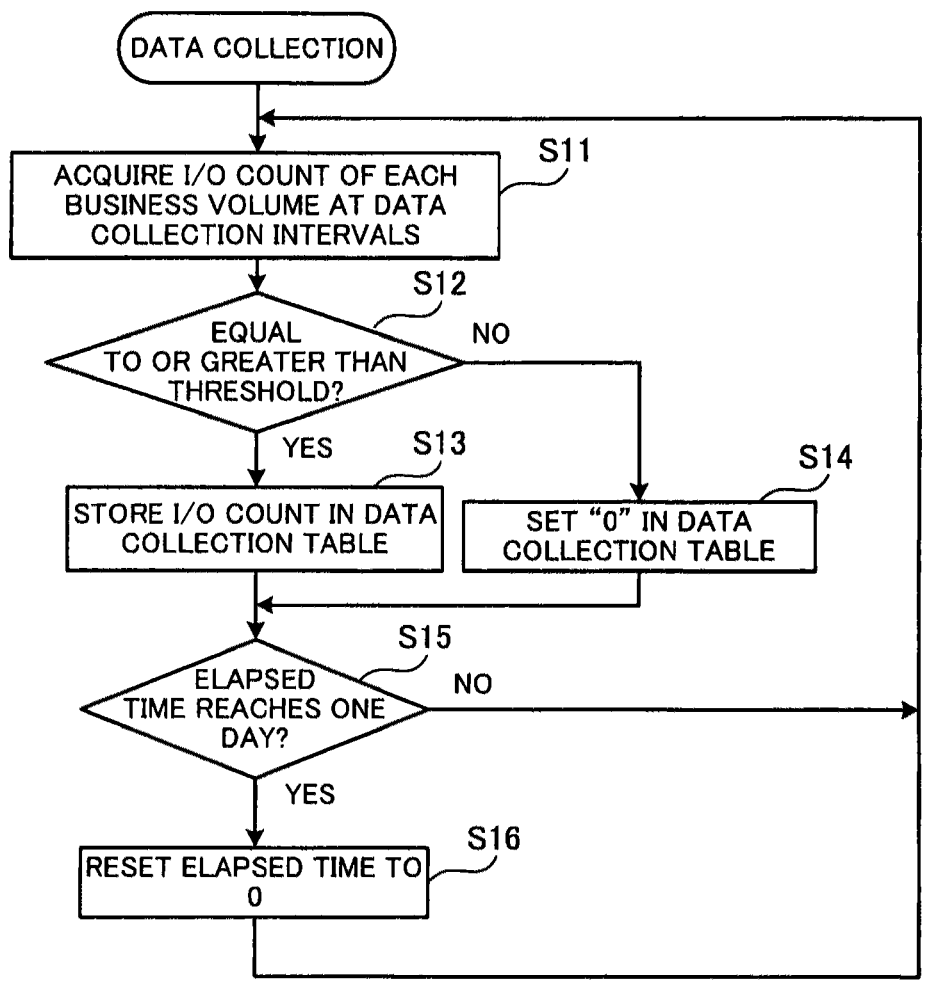
FIG. 13 is a flowchart of how to collect data regarding the business volume.

FIG. 13 is a flowchart of how to collect data regarding a business volume. This data collection process of FIG. 13 will be described step-by-step.

At operation S11, the disk state monitoring unit 151 acquires an I/O count indicating the number of I/Os to each business volume at data collection intervals.

At operation S12, the disk state monitoring unit 151 determines whether or not the acquired I/O count is equal to or greater than a predetermined threshold. If this determination is affirmative, the disk state monitoring unit 151 proceeds to operation S13; otherwise, the disk state monitoring unit 151 proceeds to operation S14.

At operation S13, the disk state monitoring unit 151 stores the acquired I/O count for a corresponding data collection time frame in the data collection table 41 of the business volume management table group 152a. Then, the disk state monitoring unit 151 proceeds to operation S15.

At operation S14, the disk state monitoring unit 151 sets "0" as the I/O count for a corresponding data collection time frame in the data collection table 41 of the business volume management table group 152a.

At operation S15, the disk state monitoring unit 151 determines whether an elapsed time counted from the start of registering data in the first record in the data collection table 41 reaches one day. If this determination is affirmative, the disk state monitoring unit 151 proceeds to operation S16; otherwise, the disk state monitoring unit 151 proceeds back to operation S11.

At operation S16, the disk state monitoring unit 151 moves from the current record to the first record of the data collection table 41 for the data collection, and proceeds back to operation S11. At this time, the elapsed time is reset to "0".

As described above, an I/O count is recorded at data collection intervals in the data collection table 41. The process of FIG. 13 is executed for each business volume.

FIG. 14 illustrates an example data structure of a data collection table for business volumes. The data collection table 41 has fields for Data Collection Time Frame, and I/O Count for each business volume.

The Data Collection Time Frame field indicates a time frame (data collection time frame) obtained by dividing one day by a data collection interval. Referring to the example of FIG. 14, a data collection interval is 10 seconds, and time frames of 10 seconds from 00:00 to 24:00 in a day are set as data collection time frames. A value indicating a data collection time frame is represented by a time elapsed from 00:00 in seconds.

The I/O Count field for each business volume indicates an I/O count indicating the number of I/Os to the business volume for a corresponding data collection time frame in association with the identification number (LUN) of the business volume of the disk device 100.

On the basis of such the data collection table 41, an I/O state for each knowledge time frame obtained by dividing a knowledge period by a knowledge unit is determined, and the determination result is registered in the knowledge table 42.

Figure 15:
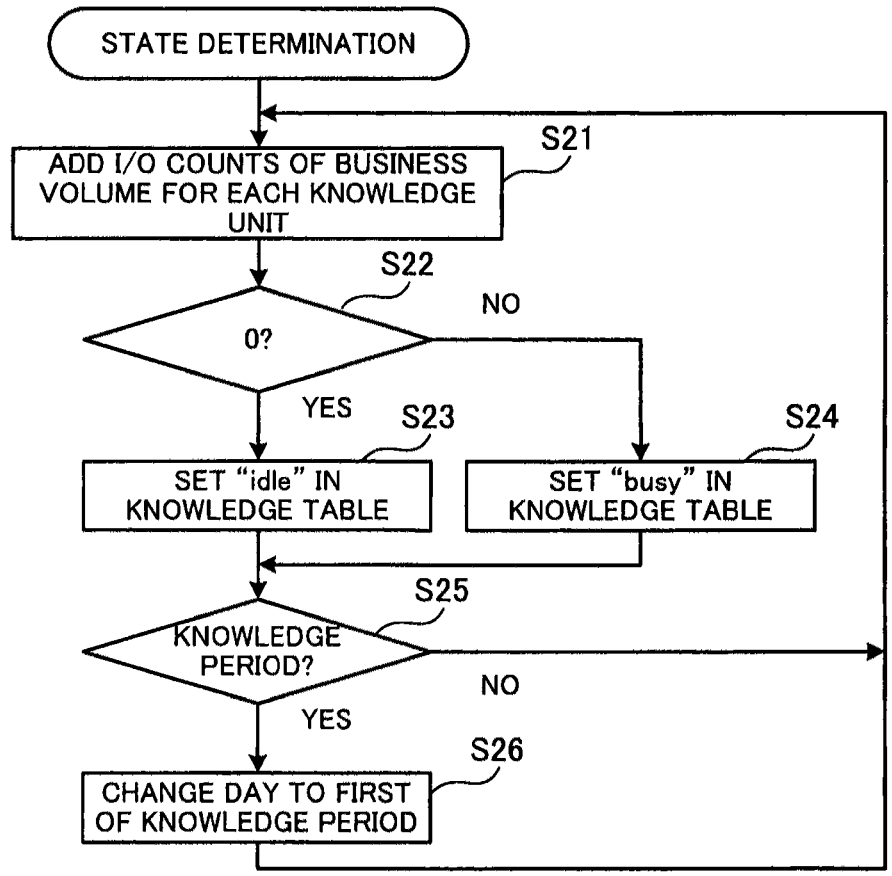
FIG. 15 is a flowchart of how to determine an I/O state of a business volume.

FIG. 15 is a flowchart of how to determine an I/O state of a business volume. This state determination process of FIG. 15 will be described step-by-step.

At operation S21, the disk state monitoring unit 151 sequentially adds the I/O counts of a business volume in order from the first one of records falling within a knowledge unit-based period (knowledge time frame) in the data collection table 41. More specifically, when data for a knowledge time frame (for example, for one hour) is registered in the data collection table 41, the disk state monitoring unit 151 adds the I/O counts corresponding to the data collection time frames falling within the knowledge time frame in question.

At operation S22, the disk state monitoring unit 151 determines whether the addition result is "0" or not. If this determination is affirmative, the disk state monitoring unit 151 proceeds to operation S23; otherwise, the disk state monitoring unit 151 proceeds to operation S24.

At operation S23, the disk state monitoring unit 151 sets "idle" for the knowledge time frame in question in the knowledge table 42. Then, the disk state monitoring unit 151 proceeds to operation S25.

At operation S24, the disk state monitoring unit 151 sets "busy" for the knowledge time frame in question in the knowledge table 42.

At operation S25, the disk state monitoring unit 151 determines whether the aggregation for a knowledge period (for example, for one week) has been completed or not. If this determination is affirmative, the disk state monitoring unit 151 proceeds to operation S26; otherwise, the disk state monitoring unit 151 proceeds back to operation S21.

At operation S26, the disk state monitoring unit 151 changes the data aggregation day to the first day of the knowledge period. For example, assume that the knowledge period is one week from Monday to Sunday. When the aggregation for Sunday is completed, the next aggregation day is set to Monday.

As described above, the data aggregated from the data collection table 41 is registered in the knowledge table 42.

FIG. 16 illustrates an example data structure of a knowledge table for business volumes. The knowledge table 42 has fields for Day of Knowledge Period, Knowledge Time Frame, and I/O State for each business volume.

The Day of Knowledge Period field indicates a day of a knowledge period. The Knowledge Time Frame field indicates a time frame (knowledge time frame) obtained by dividing a knowledge period by a knowledge unit. The I/O State field for each business volume indicates an I/O state of the business volume for a corresponding knowledge time frame in association with the identification number (LUN) of the business volume of the disk device 100. As an I/O state, "idle" or "busy" is set.

Data (knowledge data) set in the knowledge table is organized on a knowledge time frame basis or on a day basis. For example, the knowledge data is organized when a knowledge period elapses.

Figure 17:
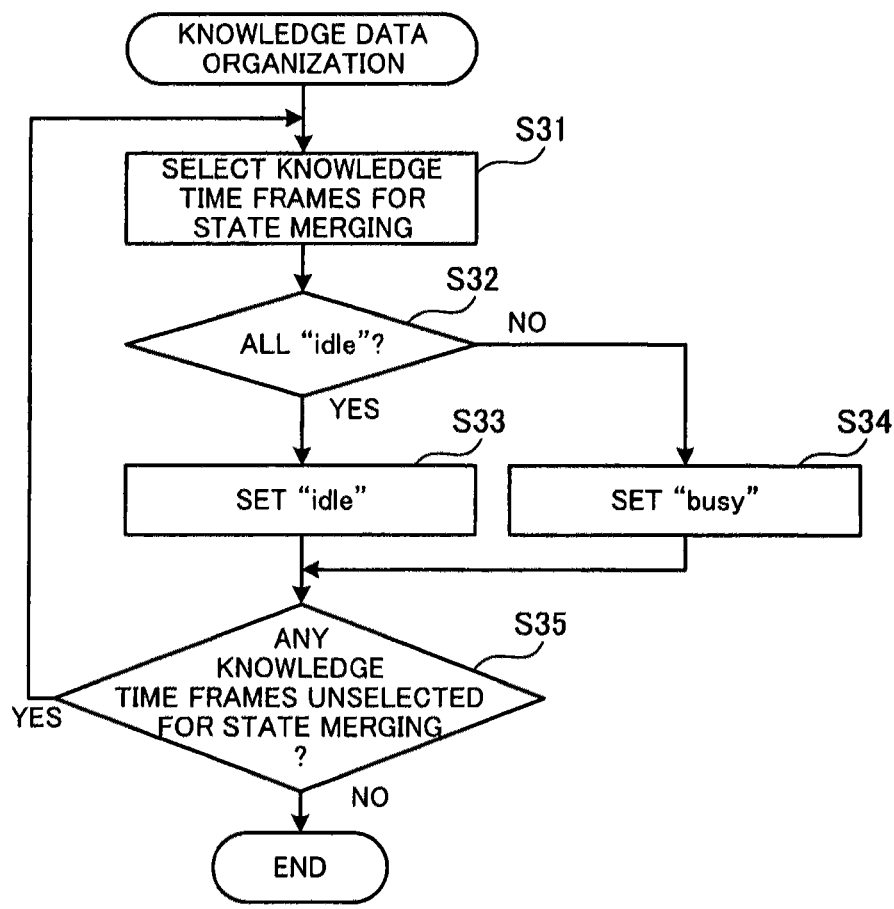
FIG. 17 is a flowchart of how to organize knowledge data.

FIG. 17 is a flowchart of how to organize knowledge data. This knowledge data organization process of FIG. 17 will be described step-by-step.

At operation S31, the disk state monitoring unit 151 consults the knowledge table 42 to select knowledge time frames for state merging. If knowledge data is organized on a knowledge time frame basis, the disk state monitoring unit 151 selects the same knowledge time frame of each day for the state merging. If knowledge data is organized on a day basis, the disk state monitoring unit 151 selects the knowledge time frames of the same day for the state merging.

At operation S32, the disk state monitoring unit 151 determines whether the states corresponding to the knowledge time frames selected for the merging are all "idle" or not. If all of the states are "idle", the disk state monitoring unit 151 proceeds to operation S33. If the state corresponding to at least one of the knowledge time frames is "busy", the disk state monitoring unit 151 proceeds to operation S34.

At operation S33, the disk state monitoring unit 151 sets "idle" as a merging result in an organized knowledge table. Then, the disk state monitoring unit 151 proceeds to operation S35.

At operation S34, the disk state monitoring unit 151 sets "busy" as a merging result in the organized knowledge table.

At operation S35, the disk state monitoring unit 151 determines whether there are any knowledge time frames unselected for the state merging. For example, if all of the knowledge time frames in the knowledge table 42 were selected at operation S31, the disk state monitoring unit 151 determines that the merging has been completed for the knowledge time frames, and completes this process. If there is any knowledge time frame unselected for the state merging, on the contrary, the disk state monitoring unit 151 proceeds back to operation S31.

FIG. 18 illustrates an example data structure of an organized knowledge table in which knowledge data is organized on a knowledge time frame basis. The organized knowledge table 51 has fields for Knowledge Period, Knowledge Time Frame, and I/O State for each business volume.

The Knowledge Period field indicates a knowledge period. Referring to the example of FIG. 18, one week from Monday to Sunday is set as a knowledge period. The Knowledge Time Frame field indicates a knowledge time frame. Referring to the example of FIG. 18, 24 time frames of one hour, which are obtained by dividing one day by one hour (knowledge unit), are set. The I/O State field for each business volume indicates a merging result of I/O states of the business volume for a corresponding knowledge time frame.

For example, the organized knowledge table 51 indicates that the business volume "LUN0" has an I/O state of "idle" for a knowledge time frame of "00-01" (00:00 to 01:00). This means that I/O operations exceeding the threshold were not performed between 00:00 to 01:00 in any day. In addition, the organized knowledge table 51 indicates that the business volume "LUN0" has an I/O state of "busy" for a knowledge time frame of "07-08" (07:00 to 08:00). This means that I/O operations exceeding the threshold were performed between 07:00 and 08:00 in at least one day of the knowledge period.

FIG. 19 illustrates an example data structure of an organized knowledge table in which knowledge data is organized on a day basis. The organized knowledge table 52 has fields for Day, and I/O State for each business volume. The Day field indicates a day of a knowledge period. The I/O State field for each business volume indicates a merging result of I/O states of the business volume for a corresponding day.

For example, the organized knowledge table 52 indicates that the business volume "LUN0" has an I/O state of "busy" for Monday. This means that I/O operations to the business volume of "LUN0" which exceed the threshold were performed for at least one hour on Monday. In addition, the organized knowledge table 52 indicates that the business volume "LUN2" has an I/O state of "idle" for Monday. This means that, on Monday, there is no knowledge time frame in which I/O operations exceed the threshold.

[Process of Collecting and Organizing Data Regarding Copy Volume]

The following describes how to collect and organize information indicating the state of access to a copy volume.

Figure 20:
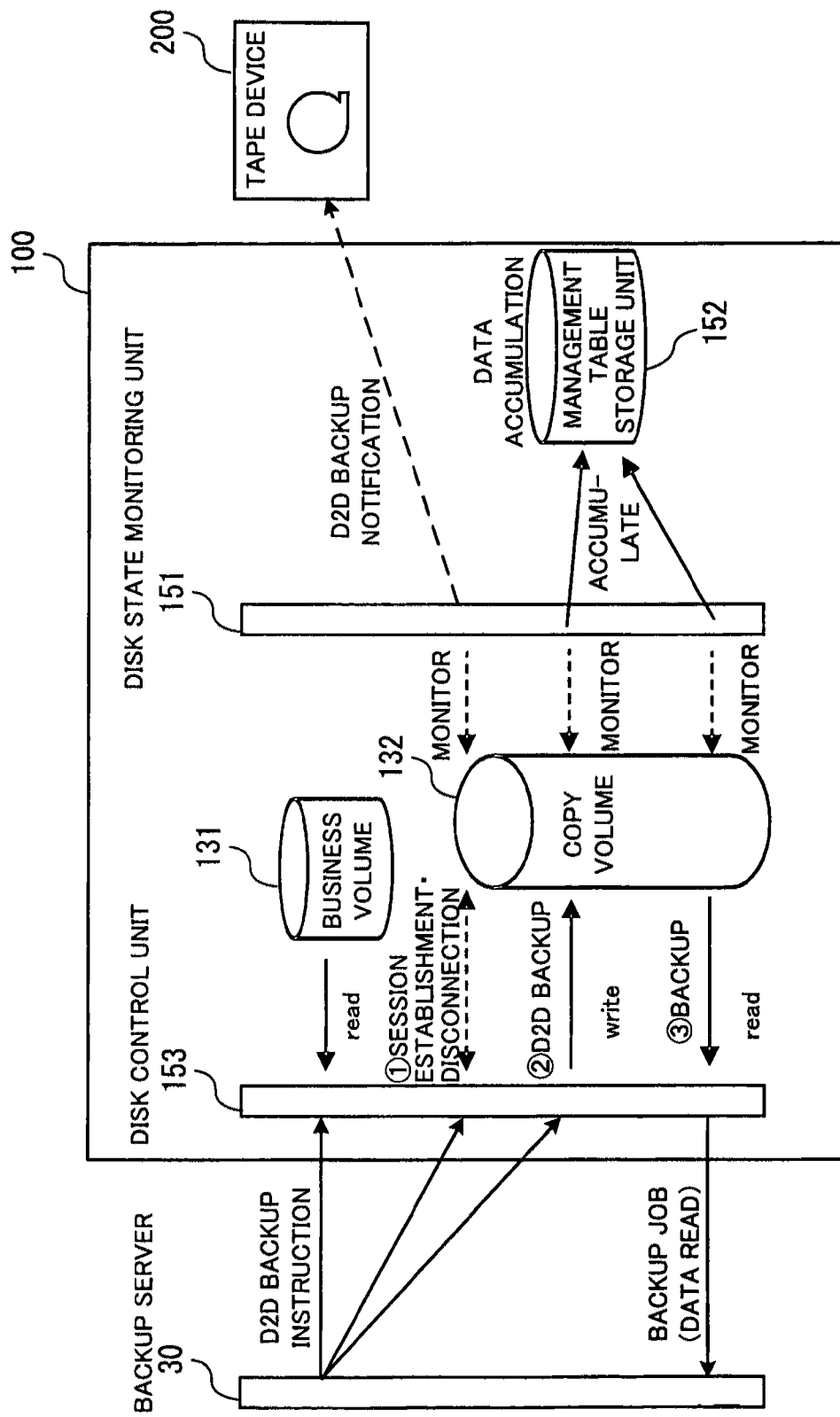
FIG. 20 illustrates how to collect data regarding a copy volume.

FIG. 20 illustrates how to collect data regarding a copy volume. An instruction for a D2D backup is issued from the backup server 30 to the disk device 100. Then, the disk control unit 153 of the disk device 100 establishes a session with the copy volume 132 in response to the D2D backup instruction. Then, the disk control unit 153 reads data from the business volume 131 and backs up the data to the copy volume 132 with the "Disk to Disk" technique. When this backup is completed, the disk control unit 153 disconnects the session.

In addition, to start a backup job, the backup server 30 makes a request for reading data from the copy volume 132 (data read request), to the disk device 100. Then, the disk control unit 153 of the disk device 100 reads data from the copy volume 132, and sends the data to the backup server 30.

The state of I/O accesses from the disk control unit 153 to the copy volume 132 is monitored by the disk state monitoring unit 151. For example, the disk state monitoring unit 151 monitors I/O operations to the copy volume 132 to accumulate the I/O counts in the management table storage unit 152. In addition, the disk state monitoring unit 151 detects a session establishment/disconnection for a D2D backup, and notifies the tape device 200 of this matter. The session establishment and disconnection indicate start and end of a D2D backup, respectively. For example, a notification of session establishment or disconnection includes the identification number of a copy volume which is a backup destination of a D2D backup which is started or ended.

Figure 21:
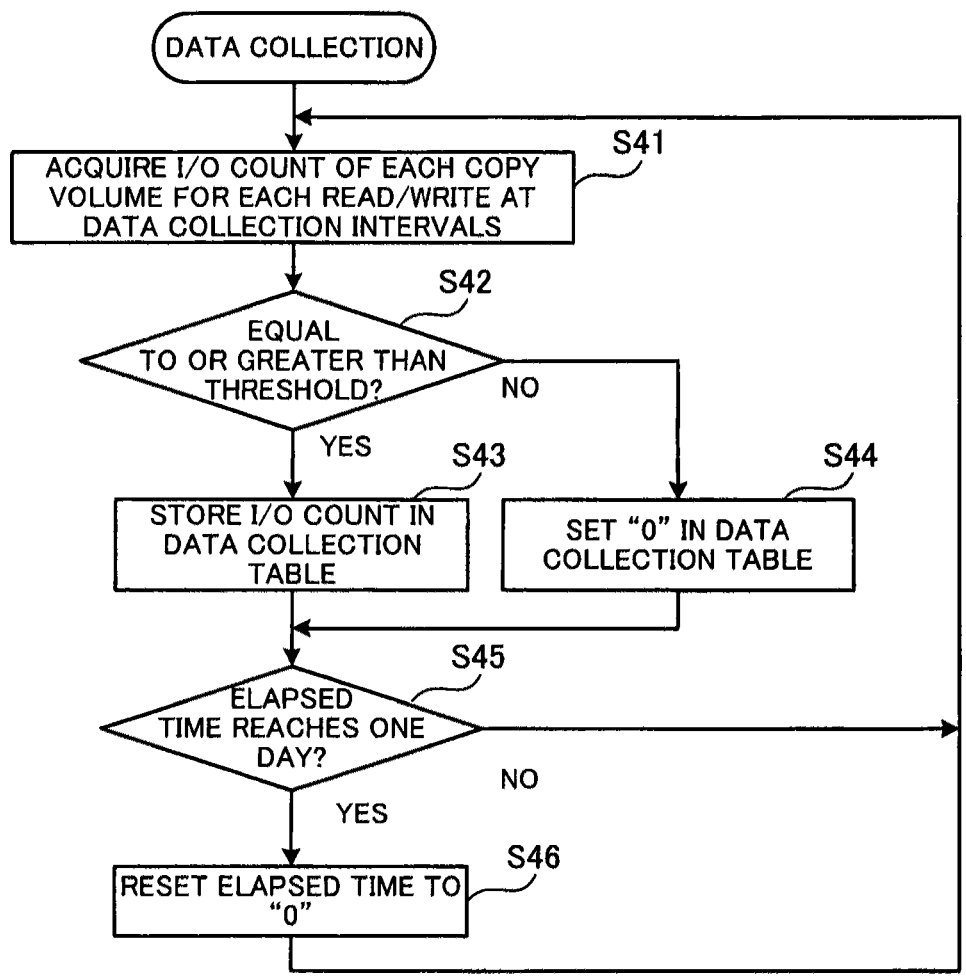
FIG. 21 is a flowchart of how to collect data regarding the copy volume.

FIG. 21 is a flowchart of how to collect data regarding a copy volume. This data collection process of FIG. 21 will be described step-by-step.

At operation S41, the disk state monitoring unit 151 acquires the number of accesses in sequential access to each copy volume for each of reading and writing, at data collection intervals. The sequential access is a set of successive accesses to successive storage areas of a disk device. Sequential access for writing data in successive areas is specifically called a sequential write. Sequential access for reading data from successive areas is specifically called a sequential read.

An I/O count in sequential access is counted in such a manner that the I/O count is 10 if 10 inputs and/or outputs are made in the sequential access.

At operation S42, the disk state monitoring unit 151 determines whether the I/O count acquired at data collection intervals is equal to or greater than a predetermined threshold. If this determination is affirmative, the disk state monitoring unit 151 proceeds to operation S43; otherwise, the disk state monitoring unit 151 proceeds to operation S44.

At operation S43, the disk state monitoring unit 151 stores the acquired I/O count for a corresponding data collection time frame in the data collection table 61 of the copy volume management table group 152b. Then, the disk state monitoring unit 151 proceeds to operation S45.

At operation S44, the disk state monitoring unit 151 sets "0" as the I/O count for a corresponding data collection time frame in the data collection table 61 of the copy volume management table group 152b.

At operation S45, the disk state monitoring unit 151 determines whether an elapsed time counted from the start of registering data in the first record of the data collection table 61 reaches one day. If this determination is affirmative, the disk state monitoring unit 151 proceeds to operation S46; otherwise, the disk state monitoring unit 151 proceeds back to operation S41.

At operation S46, the disk state monitoring unit 151 moves from the current record to the first record of the data collection table 61 for the data collection, and proceeds back to operation S41. At this time, an elapsed time is reset to "0".

As described above, an I/O count is registered at data collection intervals in the data collection table 61. The process of FIG. 21 is performed for each copy volume.

FIG. 22 illustrates an example data structure of a data collection table for copy volumes. The data collection table 61 has fields for Data Collection Time Frame, and I/O Count for each copy volume.

The Data Collection Time Frame field indicates a time frame (data collection time frame) obtained by dividing one day by a data collection interval. Referring to the example of FIG. 22, a data collection interval is 10 seconds, and time frames of 10 seconds in a day from 00:00 to 24:00 are set as data collection time frames. A value indicating a data collection time frame is represented by an elapsed time counted from 00:00 in seconds.

The I/O Count field for each copy volume indicates a I/O count per second for each of data read and write to the copy volume, for a corresponding data collection time frame in association with the identification number (LUN) of the copy volume of the disk device 100.

On the basis of such the data collection table 61, start and end of a "Disk to Disk (D2D)" backup and start and end of a "Disk to Tape (D2T)" backup are recognized.

Assume now that there are data collection time frames in which one or more I/O operations for writing were executed after a data collection time frame having an I/O count of "0" for writing. This means that a D2D backup started in the first one of the data collection time frames in which the one or more I/O operations for writing were performed. On the other hand, assume that there is a data collection time frame with an I/O count of "0" for writing after data collection time frames with an I/O count of one or more for writing. This means that a D2D backup is completed in the last one of the data collection time frames in which the one or more I/O operations for writing were performed.

In addition, assume that there are data collection time frames in which one or more I/O operations were performed for reading after a data collection time frame with an I/O count of "0" for reading. This means that a D2T backup is started in the first one of the data collection time frames in which the one or more I/O operations for reading were performed. Assume that there is a data collection time frame with an I/O count of "0" for reading after data collection time frames with an I/O count of one or more for reading. This means that a D2T backup is completed in the last one of the data collection time frames in which the one or more I/O operations for reading were performed.

On the basis of such the data collection table 61, an I/O state for each knowledge time frame obtained by dividing a knowledge period by a knowledge unit is determined, and the determination result is registered in the knowledge table 62.

Figure 23:
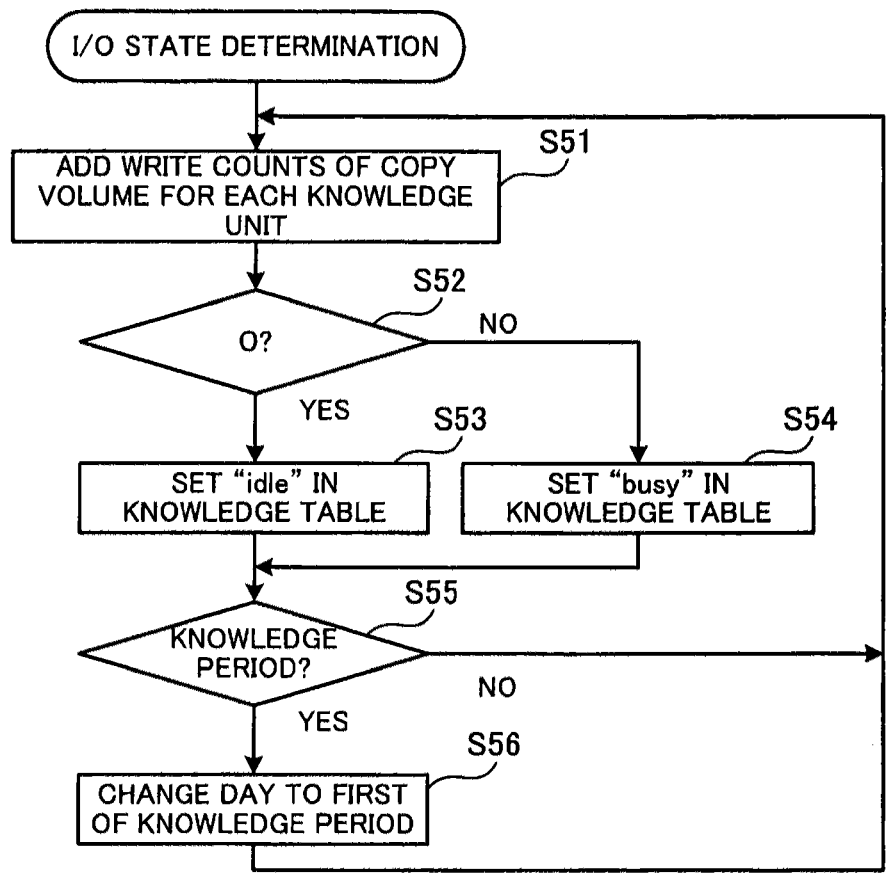
FIG. 23 is a flowchart of how to determine an I/O state of a copy volume.

FIG. 23 is a flowchart of how to determine an I/O state of a copy volume. This I/O state determination process of FIG. 23 will be described step-by-step.

At operation S51, the disk state monitoring unit 151 sequentially adds the numbers of writes of a copy volume in order from the first one of records falling within a knowledge unit-based time frame (knowledge time frame) in the data collection table 61. More specifically, when data for a knowledge time frame (for example, for one hour) is registered in the data collection table 61, the disk state monitoring unit 151 adds the numbers of writes corresponding to the data collection time frames falling within the knowledge time frame in question.

At operation S52, the disk state monitoring unit 151 determines whether the addition result is "0" or not. If this determination is affirmative, the disk state monitoring unit 151 proceeds to operation S53; otherwise, the disk state monitoring unit 151 proceeds to operation S54.

At operation S53, the disk state monitoring unit 151 sets "idle" for the knowledge time frame in question in the knowledge table 62. Then, the disk state monitoring unit 151 proceeds to operation S55.

At operation S54, the disk state monitoring unit 151 sets "busy" for the knowledge time frames in question in the knowledge table 62.

At operation S55, the disk state monitoring unit 151 determines whether the aggregation for a knowledge period (for example, for one week) has been completed or not. If this determination is affirmative, the disk state monitoring unit 151 proceeds to operation S56; otherwise, the disk state monitoring unit 151 proceeds back to operation S51.

At operation S56, the disk state monitoring unit 151 changes the data aggregation day to the first day of the knowledge period. For example, assume that a knowledge period is one week from Monday to Sunday. In this case, the data aggregation for Sunday is completed, the next aggregation day is set to Monday.

As described above, the data aggregated from the data collection table 61 is registered in the knowledge table 62.

FIG. 24 illustrates an example data structure of a knowledge table for copy volumes. The knowledge table 62 has fields for Day of Knowledge Period, Knowledge Time Frame, and I/O State for each copy volume.

The Day of Knowledge Period field indicates a day of a knowledge period. The Knowledge Time Frame field indicates a time frame (knowledge time frame) obtained by dividing a knowledge period by a knowledge unit. The I/O State field for each copy volume indicates the I/O state of the copy volume for a corresponding knowledge time frame in association with the identification number (LUN) of the copy volume of the disk device 100. As an I/O state, "idle" or "busy" is set.

On the basis of the I/O state of each copy volume for each knowledge time frame, an execution time of a D2D backup is recognized. For example, the example of FIG. 24 indicates that a D2D backup to a copy volume of "LUN0" is executed between 07:00 and 08:00 and between 08:00 and 09:00 on Monday.

Data (knowledge data) set in the knowledge table is organized on a knowledge time frame basis or on a day basis. The knowledge data is organized when a knowledge period elapses, for example. A process of organizing knowledge data of a copy volume is performed in the same way as the process illustrated in FIG. 17 for the knowledge data of a business volume.

FIG. 25 illustrates an example data structure of an organized knowledge table in which knowledge data is organized on a knowledge time frame basis. The organized knowledge table 71 has fields for Knowledge Period, Knowledge Time Frame, and I/O State for each copy volume.

The knowledge Period field indicates a knowledge period. The Knowledge Time Frame field indicates a knowledge time frame. The I/O State field for each copy volume indicates a result of merging I/O states of the copy volume for a corresponding knowledge time frame.

For example, the organized knowledge table 71 indicates a copy volume of "LUN0" has an I/O state of "idle" in the knowledge time frame of "00-01" (00:00 to 01:00). This means that a D2D backup was not performed between 00:00 and 01:00 on any day of the knowledge period. In addition, the organized knowledge table 71 indicates that the copy volume of "LUN0" has an I/O state of "busy" in a knowledge time frame of "07-08" (07:00 to 08:00). This means that a D2D backup was performed between 07:00 and 08:00 on at least one day in the knowledge period.

FIG. 26 illustrates an example data structure of an organized knowledge table in which knowledge data is organized on a day basis. The organized knowledge table 72 has fields for Day, and I/O State for each copy volume. The Day field indicates a day of a knowledge period. The I/O State field for each copy volume indicates a merged I/O state for a corresponding day, for the copy volume.

For example, the organized knowledge table 72 indicates that a copy volume of "LUN0" has an I/O state of "busy" for Monday. This means that a D2D backup to the copy volume of "LUN0" was performed on Monday. In addition, the organized knowledge table 72 indicates that a copy volume of "LUN1" has an I/O state of "idle" for Monday. This means that a D2D backup to the copy volume of "LUN1" was not performed on Monday.

[Collection and Organization of Data Regarding Tape Device]

The following describes how to collect and organize information indicating the state of access to the tape device 200.

Figure 27:
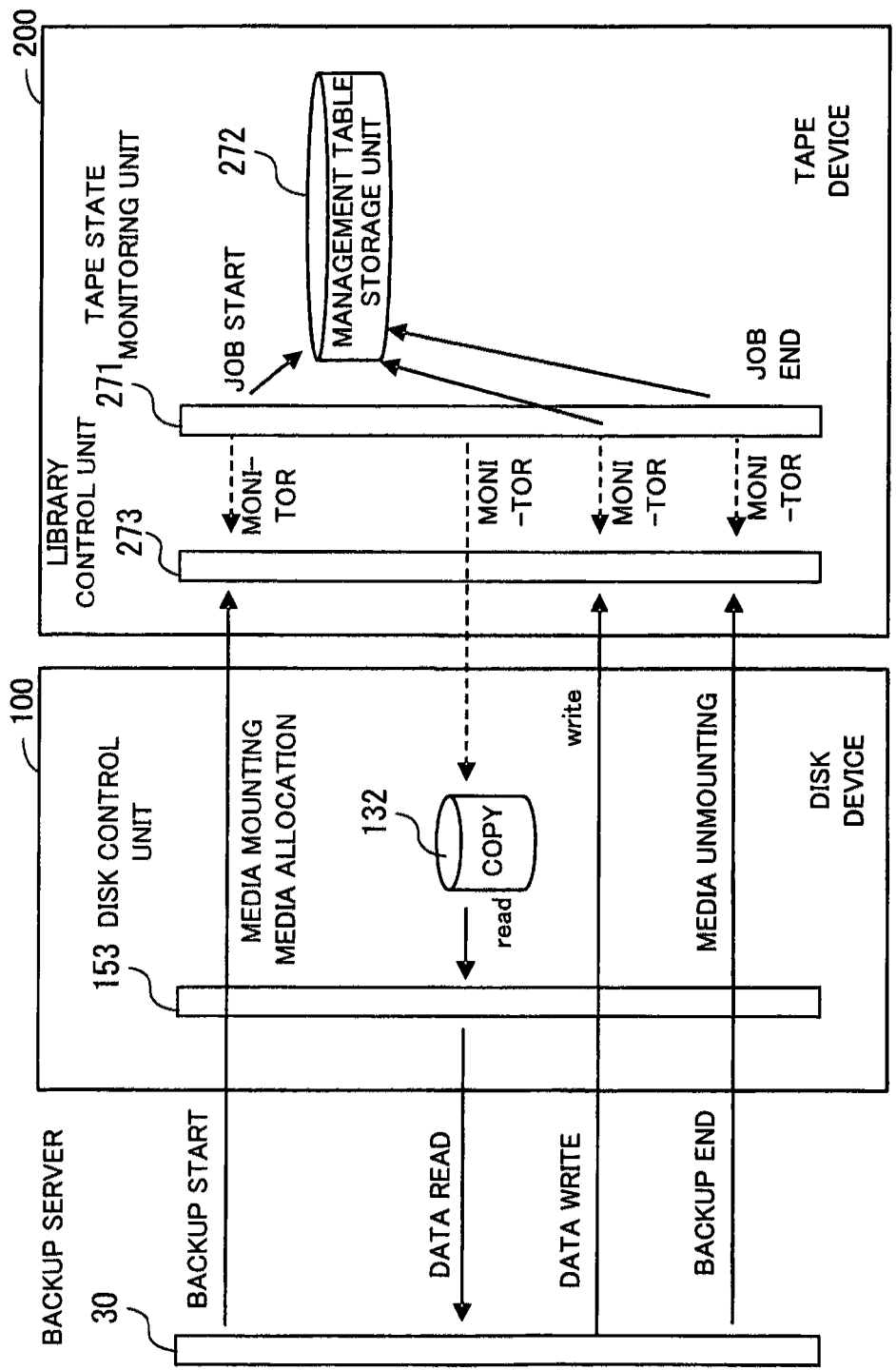
FIG. 27 illustrates how to collect data regarding a tape device.

FIG. 27 illustrates a process of collecting data regarding a tape device. To back up data from the copy volume 132 to a medium accommodated in the tape device 200, the backup server 30 notifies the tape device 200 of media mounting and media allocation as an instruction for starting the backup. Upon receipt of the media mounting notification, the library control unit 273 of the tape device 200 inserts a medium in a tape drive specified by this notification to mount the medium, so that the mounted medium becomes ready to be accessed from the system. Upon receipt of the media allocation notification, the library control unit 273 allocates the tape drive for the backup job. Allocation is a process for making a tape drive having a medium inserted therein operable only in a specified job. After the allocation, the tape drive enters the "ready" state, and the tape device 200 makes a response of "ready" to the backup server 30. After that, in the backup job of the backup server 30, a write notification is sent to the allocated tape drive of the tape device 200.

In addition, the tape state monitoring unit 271 monitors the library control unit 273, recognizes the media mounting operation as "job start" relating to the backup job, and stores data indicating the job start in the management table storage unit 272. The tape state monitoring unit 271 also acquires data collected by the disk device 100, and detects the copy volume 132 in which a sequential read has started in the backup job, on the basis of the acquired data.

When the backup starts, the backup server 30 reads data from the copy volume 132 of the disk device 100. Then, the backup server 30 instructs the tape device 20 to write the read data. The tape device 200 writes the data on the medium under the control of the library control unit 273. The tape state monitoring unit 271 monitors a set of write commands issued from the backup server 30, and stores the backup job information in the management table storage unit 272.

When the data write is completed, the backup server 30 notifies the tape device 200 of a media unmounting operation as a backup end instruction. The library control unit 273 of the tape device 200 unmounts the medium used in the backup in response to the media unmounting notification. At this time, the tape state monitoring unit 271 monitors the library control unit 273, recognizes the media unmounting operation as "job end" relating to the backup job, and stores data indicating the job end in the management table storage unit 272.

Figure 28:
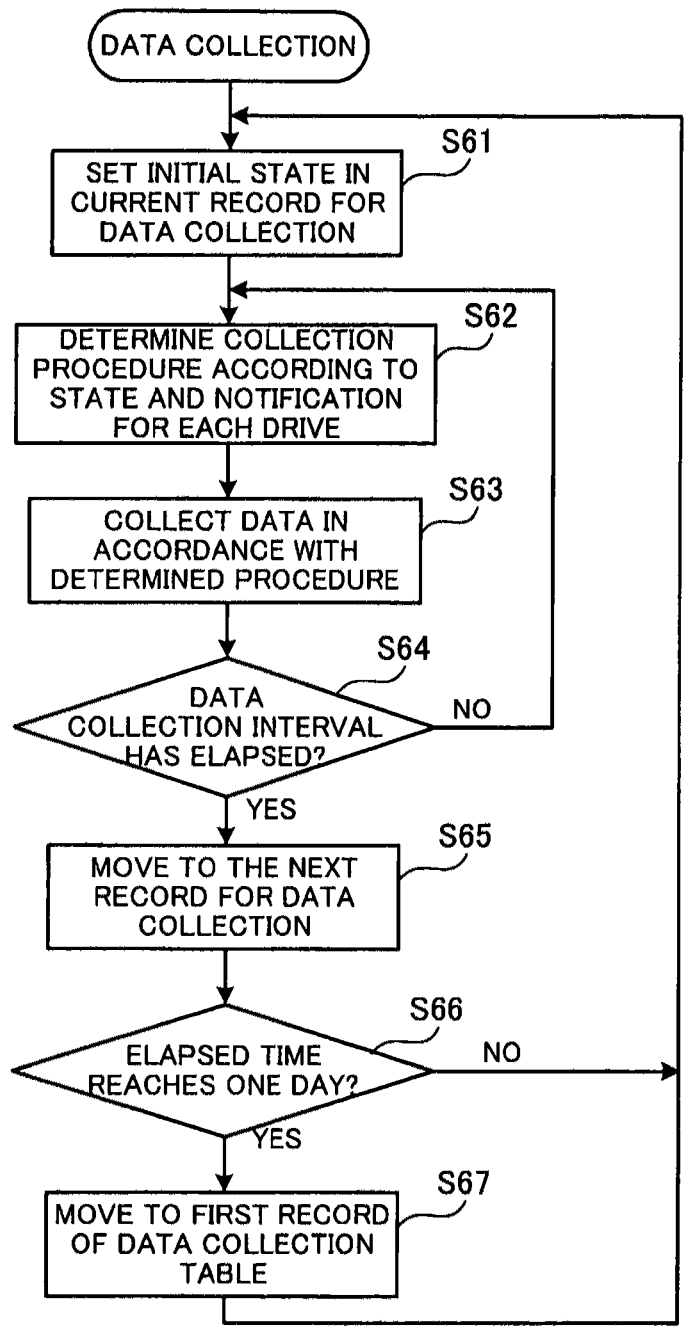
FIG. 28 is a flowchart of how to collect data regarding the tape device.

FIG. 28 is a flowchart of how to collect data regarding a tape drive. This data collection process of FIG. 28 will be described step-by-step.

At operation S61, the tape state monitoring unit 271 sets an initial state as the state of a tape drive in a current record in question for data collection in the data collection table 81. For example, assume that the current record for the data collection is the first record of the data collection table 81, the tape state monitoring unit 271 sets "idle" as the state of the tape drive. If the current record for the data collection is a second or subsequent record of the data collection table 81, the tape state monitoring unit 271 sets the state of the tape drive stored in the previous record, which is a record one before the current record, as the state of the tape drive in the current record. For example, assume that the tape drive has a "backup" state when the data collection interval for the previous record elapses, this "backup" state is set as the initial state of the tape drive for the current record.

At operation S62, the tape state monitoring unit 271 determines a collection procedure from a matrix according to the details of a notification received from the disk device 100 or backup server 30 and the state of the tape drive of the time when the tape drive receives the notification. The matrix defines collection procedures based on states and notifications. The matrix and collection procedures defined in the matrix will be described later (with reference to FIGS. 43 and 44).

At operation S63, the tape state monitoring unit 271 collects data in accordance with the collection procedure determined at operation S62. This data collection process will be described in detail later (with reference to FIGS. 45 to 47).

At operation S64, the tape state monitoring unit 271 determines whether the data collection interval has elapsed after the current record was taken as a record in question for the data collection. If the data collection interval has elapsed, the tape state monitoring unit 271 proceeds to operation S65; otherwise, the tape state monitoring unit 271 proceeds back to operation S62.

At operation S65, the tape state monitoring unit 271 moves from the current record to the next record of the data collection table 81 for the data collection.

At operation S66, the tape state monitoring unit 271 determines whether an elapsed time counted from the start of registering data in the first record of the data collection table 81 has reached one day. The tape state monitoring unit 271 proceeds to operation S67 if the elapsed time has reached one day; otherwise, the tape state monitoring unit 271 proceeds back to operation S61.

At operation S67, the tape state monitoring unit 271 moves from the current record to the first record of the data collection table 81 for the data collection, and proceeds back to operation S61. At this time, the elapsed time is reset to "0".

FIG. 29 illustrates an example data structure of a data collection table for tape devices. The data collection table 81 has fields for Data Collection Time Frame, and for each tape drive, State, Write Count, Candidate Copy Volume, Slot (Medium), and D2D Backup Destination Copy Volume.

The Data Collection Time Frame field indicates a time frame (data collection interval) obtained by dividing one day by a data collection interval.

The State field for each tape drive indicates the state of the tape drive for a corresponding data collection time frame. As a state, "idle", "mount", "ready", "backup", "mount delay", "ready delay", "write delay", or "backup delay" is set. An "idle" state indicates an unused state. A "mount" state indicates a state where a medium is mounted in the system. A "ready" state indicates a state where a read command or write command is acceptable. A "backup" state indicates a state where data is being written in a backup job. A "mount delay" state indicates a state where a tape drive is not used and a tape mounting operation may be delayed at the time of transition to the "mount" state. A "ready delay" state is a state where a medium is mounted in the system and an operation of transitioning to a state ("ready" state) in which a read or write command is acceptable may be delayed. A "write delay" state indicates a state where a read or write command is acceptable ("ready" state) and a process of writing data in accordance with a write request may be delayed. A "backup delay" state indicates a state where data is being written in a backup job ("backup" state) but an operation of writing data in accordance with a write request may be delayed.

The Write Count field for each tape drive indicates a write count indicating the number of writes executed in a corresponding data collection time frame.

The Candidate Copy Volume field for each tape drive indicates the identification number (LUN) of a copy volume (candidate copy volume) which may be a backup source in a backup job executed in a corresponding data collection time frame.

The Slot field for each tape drive indicates the identification number (slot number) of a slot having inserted therein a medium on which data was written in a corresponding data collection time frame.

The D2D Backup Destination Copy Volume field for each tape drive indicates the identification number of a copy volume that was a backup destination for a D2D backup performed in a corresponding data collection time frame.

Referring to the example of FIG. 29, in a tape drive with a drive ID of "G4_02", a medium was mounted in ten seconds from "04:00:00" to "04:00:10" in response to a media mounting notification. The medium was allocated in ten seconds from "04:00:10" to "04:00:20" in response to an allocation notification. A backup was started to write data in response to a write notification in ten seconds from "04:00:20" to "04:00:30". A backup was executed but data was not written in response to the write notification in ten seconds from "04:00:30" to "04:00:40". Data was occasionally written thereafter, and the medium was unmounted in response to a media unmounting notification in ten seconds from "05:59:50" to "06:00:00".

In this connection, the reason why data was not written during the backup, for example, in ten seconds from "04:00:30" to "04:00:40", is because data read from a copy volume is slower than data write to the tape device 200.

Referring to the data collection table 81, candidate copy volumes for a backup are narrowed down as the backup progresses. Referring to the example of FIG. 29, only a copy volume of "LUN0" is registered as a candidate copy volume in all of the data collection time frames during a period from the media mounting notification to the media unmounting notification. Therefore, the copy volume of "LUN0" is recognized as a backup source volume.

In addition, a session establishment notification indicating the start of a D2D backup using the copy volume of "LUN0" as a backup destination is received in 10 seconds from "04:01:00" to "04:01:10". As a result, "LUN0" is set as a D2D backup destination LUN for data collection time frames after "04:01:00". Then, in ten seconds from "05:59:40" to "05:59:50", a session disconnection notification indicating the end of the D2D backup using the copy volume of "LUN0" as a backup destination is received. As a result, the D2D backup destination LUN is not set for data collection time frames after "05:59:50". Therefore, the tape state monitoring unit 271 is able to recognize a backup destination copy volume for a D2D backup executed in each data collection time frame by checking the D2D Backup Destination Copy Volume field.

When data for one day is registered in the data collection table 81, the tape state monitoring unit 271 detects a backup source copy volume from the data collection table 81. Then, the tape state monitoring unit 271 creates a data table for each backup source copy volume (copy volume-based data table).

FIG. 30 illustrates an example data structure of a copy volume-based data table. The copy volume-based data table 82 has fields for Data Collection Time Frame, and for each backup source copy volume, State, Write Count, and Slot (Medium).

The Data Collection Time Frame field indicates a time frame (data collection time frame) obtained by dividing one day by a data collection interval.

The State field for each backup source copy volume indicates the state of the backup source copy volume. A "busy" state is set during a period from start to end of a backup, and an "idle" state is set during a period other than the backup time.

The Write Count field for each backup source copy volume indicates the number of writes of data of the copy volume by a tape drive in a backup.

The Slot field for each backup source copy volume indicates the slot number of a slot having inserted therein a backup destination medium for the backup of data of the copy volume.

On the basis of such the copy volume-based data table 82, a knowledge table for copy volumes (volume-based knowledge table 83) is created.

Figure 31:
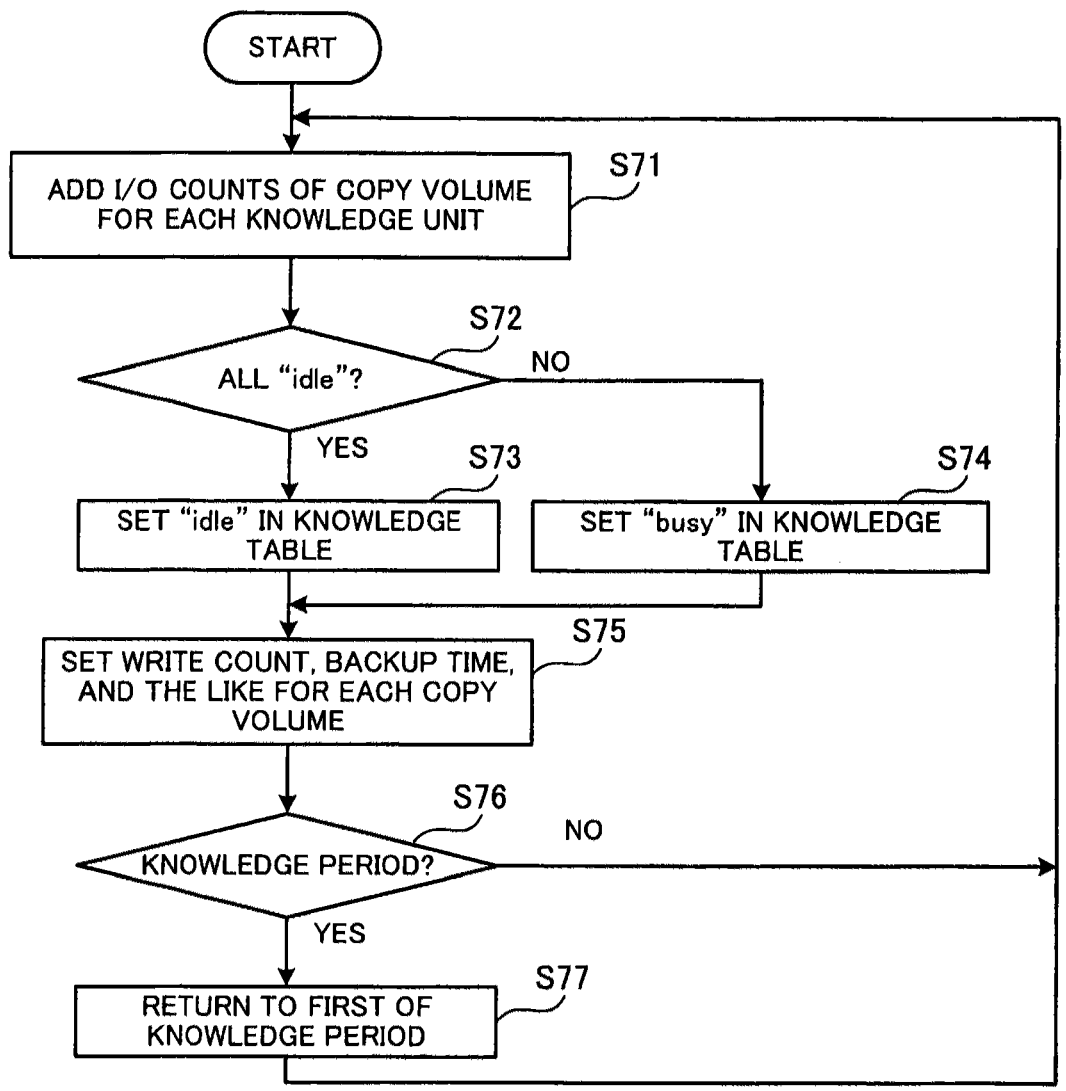
FIG. 31 is a flowchart of how to create a knowledge table in the tape device.

FIG. 31 is a flowchart of how to create a knowledge table in a tape drive. This knowledge table creation process of FIG. 31 will be described step-by-step.

At operation S71, the tape state monitoring unit 271 sequentially adds the I/O counts of a copy volume in order from the first one of records falling within a knowledge unit-based period (knowledge time frame) in the copy volume-based data table 82. More specifically, when data for a knowledge time frame (for example, for one hour) is registered in the copy volume-based data table 82, the tape state monitoring unit 271 adds the write counts corresponding to the data collection time frames falling within the knowledge time frame in question.

At operation S72, the tape state monitoring unit 271 determines whether the states corresponding to the data collection time frames falling within the knowledge time frame in question are all "idle" or not. If this determination is affirmative, the tape state monitoring unit 271 proceeds to operation S73. If there is any data collection time frame with a "busy" state, the tape state monitoring unit 271 proceeds to operation S74.

At operation S73, the tape state monitoring unit 271 sets a job state of "idle" for the knowledge time frame in question in the volume-based knowledge table 83. Then, the tape state monitoring unit 271 proceeds to operation S75.

At operation S74, the tape state monitoring unit 271 sets a job state of "busy" for the knowledge time frame in question in the volume-based knowledge table 83.

At operation S75, the tape state monitoring unit 271 sets a write count, backup time, and slot of the copy volume for the knowledge time frame in question in the volume-based knowledge table 83.

At operation S76, the tape state monitoring unit 271 determines whether the aggregation for the knowledge period (for example, for one week) has been completed or not. If this determination is affirmative, the tape state monitoring unit 271 proceeds to operation S77; otherwise, the tape state monitoring unit 271 proceeds back to operation S71.

At operation S77, the tape state monitoring unit 271 changes the data aggregation day to the first day of the knowledge period. Assume that the knowledge period is one week from Monday to Sunday. In this case, when the data aggregation for Sunday is completed, the next aggregation day is set to "Monday".

As described above, data aggregated from the copy volume-based data table 82 is registered in the volume-based knowledge table 83.

FIG. 32 illustrates an example data structure of a volume-based knowledge table. The volume-based knowledge table 83 has fields for Day of Knowledge Period, Knowledge Time Frame, and for each copy volume, Job State, Write Count, Backup Time, and Slot (Medium).

The Day of Knowledge Period field indicates a day of a knowledge period. The Knowledge Time Frame field indicates a time frame (knowledge time frame) obtained by dividing a knowledge period by a knowledge unit.

The Job State field for each copy volume indicates the state of the copy volume for a corresponding knowledge time frame. A job state of "busy" is set for a copy volume which has a state of "busy" at least once in a knowledge time frame.

The Write Count field for each copy volume indicates the number of writes of data read from the copy volume to a tape device in the knowledge time frame.

The Backup Time field for each copy volume indicates the length of time a backup of data of the copy volume was performed, in the knowledge time frame.

The Slot field for each copy volume indicates a slot having inserted therein a backup destination medium for a backup of the data of the copy volume.

In addition, the tape state monitoring unit 271 creates a tape drive-based knowledge table (drive-based knowledge table 84) almost in the same way as the process of FIG. 31. However, in creating the drive-based knowledge table 84, operations S71 and S75 of the flowchart of FIG. 31 are skipped.

FIG. 33 illustrates an example data structure of a drive-based knowledge table. The drive-based knowledge table 84 has fields for Day of Knowledge Period, Knowledge Time Frame, and JOB state for each tape drive.

The Day of Knowledge Period field indicates a day of a knowledge period. The Knowledge Time Frame field indicates a time frame (knowledge time frame) obtained by dividing a knowledge period by a knowledge unit. The Job State field for each tape drive indicates the state of a backup job in which data is backed up to the tape drive in a corresponding knowledge time frame. A job state of "busy" is set if a backup job has a "busy" state at least once in the knowledge time frame.

In the example of FIG. 33, information on tape drives is arranged from left to right in order of priority in the drive-based knowledge table 84. Referring to the example of FIG. 33, a smaller value represents a higher priority. A priority is higher as the generation of LTO technology is newer. In the case where there are tape drives with the same generation, a higher priority is given as a slot number used as a backup destination is smaller.

In addition, the tape state monitoring unit 271 retrieves information on a backup job from the volume-based knowledge table 83, and stores the information in the job management table 85. For example, when a backup job is completed and a media unmounting notification for a tape drive on which data has been written in the backup job arrives, the tape state monitoring unit 271 retrieves information on the backup job.

Figure 34:
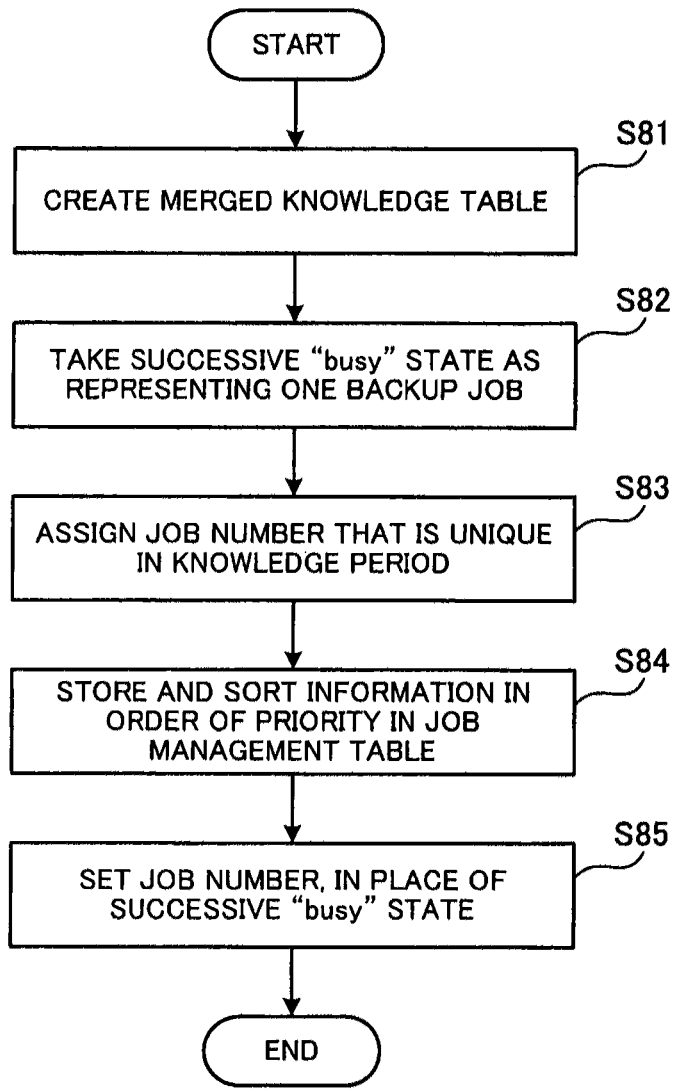
FIG. 34 is a flowchart of how to retrieve a backup job.

FIG. 34 is a flowchart of how to retrieve information on a backup job. This backup job retrieval process of FIG. 34 will be described step-by-step.

At operation S81, the tape state monitoring unit 271 selects knowledge time frames for state merging from the volume-based knowledge table 83. For example, to merge states on a knowledge time frame basis, the tape state monitoring unit 271 selects the same knowledge time frame of each day for the state merging. Then, the tape state monitoring unit 271 creates a merged knowledge table by merging information for the selected knowledge time frames.

At operation S82, the tape state monitoring unit 271 takes successive knowledge time frames with a "busy" state in the merged knowledge table created at operation S81 as time frames for one backup job.

At operation S83, the tape state monitoring unit 271 assigns the backup job determined at operation S82 a job number that is unique in the knowledge period.

At operation S84, the tape state monitoring unit 271 stores the information on the backup job determined at operation S82, in the job management table 85. Then, the tape state monitoring unit 271 sorts the backup jobs in the job management table 85 in order of priority.

At operation S85, the tape state monitoring unit 271 sets a job number in the Job State field of the merged knowledge table, in place of the successive "busy" state.

The following describes an example of how to retrieve a backup job from the volume-based knowledge table 83 illustrated in FIG. 32.

FIG. 35 illustrates an example merged knowledge table in which data is merged on a knowledge time frame basis. The merged knowledge table 83a has almost the same data structure as the volume-based knowledge table 83, excepting that the merged knowledge table 83a has fields for Average Write Count and Average Backup Time, instead of the Write Count field and Backup Time field of the volume-based knowledge table 83, respectively.

The Job State field of the merged knowledge table 83a indicates a "busy" state if at least one of merged records (records corresponding to the same knowledge time frame of each day) has a job state of "busy". The Average Write Count field indicates an average number of writes calculated from the merged records. The Average Backup Time field indicates an average backup time calculated from the merged records. The Slot field indicates a slot number set in the merged records.

From such the merged knowledge table 83a, successive records with a "busy" state are retrieved.

FIG. 36 illustrates an example of retrieving records with "busy" state. Referring to the example of FIG. 36, the merged knowledge table 83a has knowledge time frames of "04-05", "05-06", and "06-07" with a job state of "busy". The other knowledge time frames have a job state of "idle". Therefore, the records of the knowledge time frames of "04-05", "05-06", and "06-07" are retrieved from the merged knowledge table 83a.

The tape state monitoring unit 271 recognizes records of successive knowledge time frames out of the retrieved records, as records for one backup job. Then, the tape state monitoring unit 271 creates and registers backup job information based on the retrieved records in the job management table 85.

FIG. 37 illustrates an example of creating a job management table. Backup job information 83b has fields for Job No., Average Write Count, Average Backup Time, Average Throughput (write count per second), Source Copy Volume, and Slot (medium).

The Job No. field indicates a job number uniquely identifying a backup job in a knowledge period. The Average Write Count field indicates a total value of the average write counts of the records belonging to a corresponding backup job of the merged knowledge table 83a. The Average Backup Time field indicates a total value of the average backup times of the records belonging to a corresponding backup job of the merged knowledge table 83a. The Average Throughput field indicates a value obtained by dividing an average write count by an average backup time, as an average throughput. The Source Copy Volume field indicates the LUN of a backup source copy volume for a corresponding backup job. The Slot field indicates the slot number of a slot having inserted therein a backup destination medium for a corresponding backup job. That is, a slot number set in the records belonging to the backup job of the merged knowledge table 83a is set in this Slot field.

The created backup job information 83b is registered in the job management table 85. The job management table 85 has fields for Priority, Job No., Average Write Count, Average Backup Time, Average Throughput, Source Copy Volume, and Slot. The fields other than the Priority field have the same data as the corresponding fields of the backup job information 83b.

The Priority field indicates a priority of a backup job. The Priority field has no entry immediately after the backup job information 83b is registered.

When the backup job information relating to all backup jobs detected in a knowledge period is registered in the job management table 85, the tape state monitoring unit 271 determines the priority of each backup job. Then, the tape state monitoring unit 271 sorts the backup job information in order of priority. At this time, the tape state monitoring unit 271 gives a higher priority to a job with a lower throughput. In the case where there are jobs with the same throughput, the tape state monitoring unit 271 gives a higher priority to a job with a smaller data size (average write count). Then, the tape state monitoring unit 271 gives sequentially increasing numbers to the backup job information sorted in order of priority in the job management table 85, i.e., gives the smallest number to backup job information with the highest priority.

After that, job numbers are set in the Job State field in the merged knowledge table 83a.

FIG. 38 illustrates an example merged knowledge table in which job numbers are set. Referring to the example of FIG. 38, a job number of "1" is set in the Job State field corresponding to the knowledge time frames of "04-05", "05-06", and "06-07" of the merged knowledge table 83a, instead of "busy".

Then, the tape state monitoring unit 271 organizes data (knowledge data) set in the merged knowledge table 83a in which job numbers are set, on a knowledge time frame basis or on a day basis. The knowledge data is organized when a knowledge period elapses, for example. The process of organizing knowledge data is performed in the same way as the process of organizing the knowledge data of a business volume illustrated in FIG. 17.

For example, the tape state monitoring unit 271 organizes knowledge data on a knowledge time frame basis or on a day basis. At this time, the tape state monitoring unit 271 is able to organize knowledge data for each backup source copy volume or tape drive.

FIG. 39 illustrates an example data structure of an organized knowledge table in which knowledge data is organized on a knowledge time frame basis for each copy volume. The organized knowledge table 91 has fields for Knowledge Period, Knowledge Time Frame, and State for each copy volume.

The Knowledge Period field indicates a knowledge period. The Knowledge Time Frame field indicates a knowledge time frame. The State field for each copy volume indicates the state of the copy volume or the job number of a backup job, for a corresponding knowledge time frame.

FIG. 40 illustrates an example data structure of an organized knowledge table in which knowledge data is organized on a knowledge time frame basis for each tape drive. The organized knowledge table 92 is created for each tape drive by organizing data of the drive-based knowledge table 84. The organized knowledge table 92 has fields for Knowledge Period, Knowledge Time Frame, and State for each Tape Drive.

The Knowledge Period field indicates a knowledge period. The Knowledge Time Frame field indicates a knowledge time frame. The State field for each tape drive indicates the state of the tape drive for a corresponding knowledge time frame. In this connection, priority is set to each tape drive.

FIG. 41 illustrates an example data structure of an organized knowledge table in which knowledge data is organized on a day basis for each copy volume. The organized knowledge table 93 has fields for Day, and State for each copy volume.

The Day field indicates a day of a knowledge period. The State field for each copy volume indicates the state of the copy volume or the job number of a backup job, for a corresponding day.

FIG. 42 illustrates an example data structure of organized knowledge table in which knowledge data is organized on a day basis for each tape drive. The organized knowledge table 94 is created for each tape drive by organizing data of the drive-based knowledge table 84. The organized knowledge table 94 has fields for Day, and State for each tape drive.

The Day field indicates a day of a knowledge period. The State field for each tape drive indicates the state of the tape drive for a corresponding day. In this connection, priority is set to each tape drive.

Figure 44:
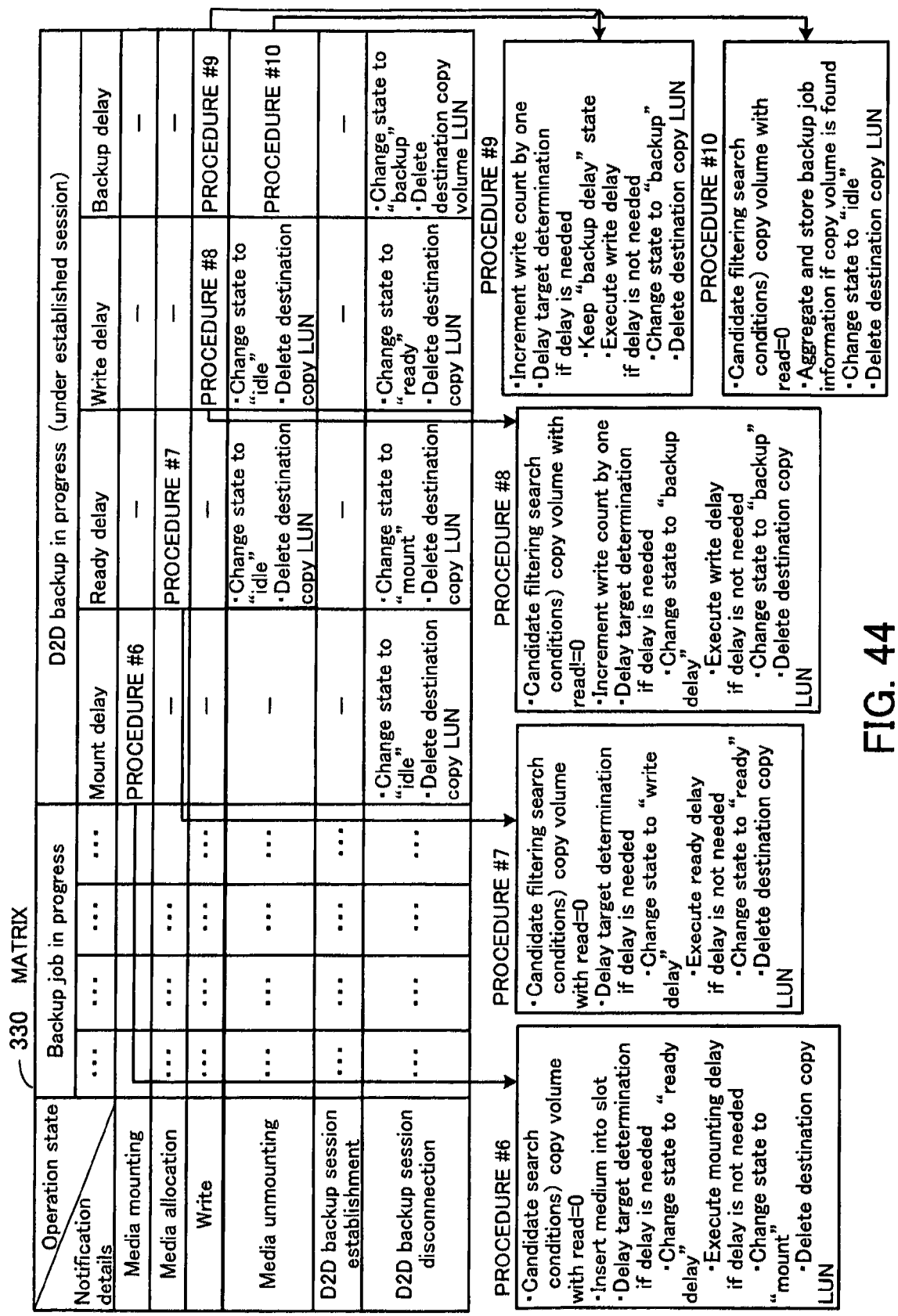
FIG. 44 is a second diagram illustrating the example matrix.

The following describes a matrix for determining a collection procedure at operation S62 of FIG. 28, with reference to FIGS. 43 and 44. Together with determining a collection procedure by using a matrix, data in the data collection table 81 illustrated in FIG. 29 is appropriately updated, and a response to a notification input to the tape device 200 is intentionally delayed. The data in a record corresponding to the current data collection time frame is updated in the data collection table 81. In addition, a collection procedure is determined for each tape drive.

FIG. 43 is a first diagram illustrating an example matrix. The matrix 330 has Operation State for backup destination tape drives as the label of lines, and also has Notification Details as the label of rows. Out of a variety of notification details, media mounting, media allocation, write, and media unmounting are notifications for the tape device 200.

The operation states for tape drives are roughly divided into a backup job in progress and a D2D backup in progress. A period from media mounting until media unmounting in a backup by the backup server 30 is taken as a period for a backup job in progress. A period during which a D2D backup is performed in the disk device 100 is taken as a period for a D2D backup in progress. More specifically, this period is a period after the tape device 200 receives a D2D session establishment notification from the disk device 100 until the tape device 200 receives a session disconnection notification. FIG. 43 illustrates procedures according to states of a backup job in progress and notification details.

During a backup job in progress, there are states "idle", "mount", "ready", and "backup". The "idle" state is a state where a tape drive is not used. The "mount" state is a state where a tape drive is mounted. The "ready" state is a state where the tape drive is ready to receive a request for read or write on a medium. The "backup" state is a state where writing of backup data is being performed by the tape drive.

The notification details include media mounting, media allocation, write, media unmounting, D2D backup session establishment, and D2D backup session disconnection.

The matrix 330 defines data collection procedures according to the state of a tape drive of the time when the tape drive receives a notification from the disk device 100 or backup server 300 and the details of the notification. In this connection, each notification includes the drive ID of a specified tape drive, and a collection procedure is determined on the basis of the state of the tape drive identified by the drive ID and the details of the notification.

The following collection procedures are adopted when a backup is in progress.

[The Case of Tape Drive in "Idle" State]

When a media mounting notification arrives while a tape drive has the "idle" state, the tape state monitoring unit 271 executes "procedure #1". In the "procedure #1", the tape state monitoring unit 271 performs a candidate search process for searching for candidate backup source copy volumes. As conditions for the candidate search, a copy volume with "read=0" (read count is 0) is set. Then, the tape state monitoring unit 271 executes a process of inserting a medium into the slot of the tape drive, and changes the state to "mount" in the data collection table 81.

When a D2D backup session establishment notification arrives while the tape drive has the "idle" state, the tape state monitoring unit 271 changes the state to "mount delay" in the data collection table 81. Then, the tape state monitoring unit 271 stores the LUN of a copy volume indicated in the session establishment notification, in the data collection table 81.

[The Case of Tape Drive in "Mount" State]

When a media allocation notification arrives while the tape drive has the "mount" state, the tape state monitoring unit 271 executes "procedure #2". In the "procedure #2", the tape state monitoring unit 271 performs a candidate filtering search process to narrow down candidate backup source copy volumes. At this time, as conditions for the candidate search, a copy volume with "read=0" (read count is 0) is set. Then, the tape state monitoring unit 271 changes the state to "ready" in the data collection table 81.

When a media unmounting notification arrives while the tape drive has the "mount" state, the tape state monitoring unit 271 changes the state to "idle" in the data collection table 81.

When a D2D backup session establishment notification arrives while the tape drive has the "mount" state, the tape state monitoring unit 271 changes the state to "ready delay" in the data collection table 81. Then, the tape state monitoring unit 271 stores the LUN of a copy volume indicated in the session establishment notification, in the data collection table 81.

[The Case of Tape Drive in "Ready" State]

When a write notification arrives while the tape drive has the "ready" state, the tape state monitoring unit 271 executes "procedure #3". In the "procedure #3", the tape state monitoring unit 271 performs a candidate filtering search process. At this time, as conditions for the candidate search, a copy volume with "read!=0" (read count is not "0") is set. Then, the tape state monitoring unit 271 increments the write count of the current record for the data collection by one in the data collection table 81. In this case, the tape state monitoring unit 271 keeps the "ready" state in the data collection table 81.

When a media unmounting notification arrives while the tape drive has the "ready" state, the tape state monitoring unit 271 changes the state to "idle" in the data collection table 81.

When a D2D backup session establishment notification arrives while the tape drive has the "ready" state, the tape state monitoring unit 271 changes the state to "write delay" in the data collection table 81. Then, the tape state monitoring unit 271 stores the LUN of a copy volume indicated in the session establishment notification, in the data collection table 81.

[The Case of Tape Drive in "Backup" State]

When a write notification arrives while the tape drive has the "backup" state, the tape state monitoring unit 271 executes "procedure #4". In the "procedure #4", the tape state monitoring unit 271 increments the write count of the current record for the data collection by one in the data collection table 81. In this case, the tape state monitoring unit 271 keeps the "backup" state in the data collection table 81.

When a media unmounting notification arrives while the tape drive has the "backup" state, the tape state monitoring unit 271 executes "procedure #5". In the "procedure #5", the tape state monitoring unit 271 performs a candidate filtering search process. As conditions for the candidate search, a copy volume with "read=0" (read count is "0") is set. If the tape state monitoring unit 271 finds a copy volume for the backup through the candidate filtering search process, the tape state monitoring unit 271 aggregates the backup job information on this backup job, and stores the resultant in the job management table 85. Then, the tape state monitoring unit 271 changes the state to "idle" in the data collection table 81.

When a D2D backup session establishment notification arrives while the tape drive has the "backup" state, the tape state monitoring unit 271 changes the state to "backup delay" in the data collection table 81. Then, the tape state monitoring unit 271 stores the LUN of a copy volume indicated in the session establishment notification, in the data collection table 81.

FIG. 44 is a second view illustrating the example matrix. During a D2D backup in progress, there are states including "mount delay", "ready delay", "write delay", and "backup delay". The "mount delay" is a state where a D2D backup is being performed in the disk device 100 and a tape drive is not used. The "ready delay" is a state where a D2D backup has started in the disk drive 100 after a tape drive was mounted, and a media allocation notification has not arrived. The "write delay" is a state where a D2D backup has started in the disk device 100 after the state was changed to "ready", and a write notification has not arrived in a backup job. The "backup delay" is a state where a D2D backup has started in the disk device 100 after a write notification arrived in a backup job, and a next write notification has not arrived.

[The Case of Tape Drive in "Mount Delay" State]

When a media mounting notification arrives while the tape drive has the "mount delay" state, the tape state monitoring unit 271 executes "procedure #6". In the "procedure #6", the tape state monitoring unit 271 performs a candidate search process. As conditions for the candidate search, a copy volume with "read=0" (read count is "0") is set. Then, the tape state monitoring unit 271 performs a process of inserting a medium into the slot of the tape drive. Then, the tape state monitoring unit 271 performs a delay target determination process to determine whether or not a backup source copy volume of the backup job sending the notification needs a delay in the tape drive. If the copy volume needs the delay, the tape state monitoring unit 271 changes the state to "ready delay" and performs a mounting delay process. The mounting delay process is a process in which a response indicating completion of mounting is sent a predetermined delay time after the mounting of the tape drive is completed. If the tape drive does not need the delay, on the contrary, the tape state monitoring unit 271 changes the state to "mount". Then, the tape state monitoring unit 271 deletes the LUN of the copy volume from the data collection table 81.

When a D2D backup session disconnection notification arrives while the tape drive has the "mount delay" state, the tape state monitoring unit 271 changes the state to "idle", and then deletes the LUN of the copy volume from the data collection table 81.

[The Case of Tape Drive in "Ready Delay" State]

When a media allocation notification arrives while the tape drive has the "ready delay" state, the tape state monitoring unit 271 executes "procedure #7". In the "procedure #7", the tape state monitoring unit 271 performs a candidate filtering search process. As conditions for the candidate search, a copy volume with "read=0" (read count is "0") is set. Then, the tape state monitoring unit 271 performs a delay target determination process. If a backup source copy volume needs a delay, the tape state monitoring unit 271 changes the state to "write delay", and performs a ready delay process. The ready delay process is a process in which a ready response is sent a predetermined delay time after allocation of the tape drive is completed. If the backup source copy volume does not need the delay, the tape state monitoring unit 271 changes the state to "ready". Then, the tape state monitoring unit 271 deletes the LUN of the copy volume from the data collection table 81.

When a media unmounting notification arrives while the tape drive has the "ready delay" state, the tape state monitoring unit 271 changes the state to "idle", and then deletes the LUN of the copy volume from the data collection table 81.

When a D2D backup session disconnection notification arrives while the tape drive has the "ready delay" state, the tape state monitoring unit 271 changes the state to "mount", and then deletes the LUN of the copy volume from the data collection table 81.

[The Case of Tape Drive in "Write Delay" State]

When a write notification arrives while the tape drive has the "write delay" state, the tape state monitoring unit 271 executes "procedure #8". In the "procedure #8", the tape state monitoring unit 271 performs a candidate filtering search process. As conditions for the candidate search, a copy volume with "read!=0" (read count is not "0") is set. Then, the tape state monitoring unit 271 increments the write count of the current record for the data collection by one. Then, the tape state monitoring unit 271 performs a delay target determination process. If the backup source copy volume needs a delay, the tape state monitoring unit 271 changes the state to "backup delay" and performs a write delay process. This write delay process is a process in which a write completion response is sent a predetermined delay time after data is written on a medium by the tape drive. If the backup source copy volume does not need the delay, the tape state monitoring unit 271 changes the state to "backup". Then, the tape state monitoring unit 271 deletes the LUN of the copy volume from the data collection table 81.

When a media unmounting notification arrives while the tape drive has the "write delay" state, the tape state monitoring unit 271 changes the state to "idle", and then deletes the LUN of the copy volume from the data collection table 81.

When a D2D backup session disconnection notification arrives while the tape drive has the "write delay" state, the tape state monitoring unit 271 changes the state to "ready", and then deletes the LUN of the copy volume from the data collection table 81.

[The Case of Tape Drive in "Backup Delay" State]

When a write notification arrives while the tape drive has the "backup delay" state, the tape state monitoring unit 271 executes "procedure #9". In the "procedure #9", the tape state monitoring unit 271 increments the write count of the current record for the data collection by one, and performs a delay target determination process. If a backup source copy volume needs a delay, the tape state monitoring unit 271 keeps the "backup delay" state and performs a write delay process. If the backup source copy volume does not need the delay, the tape state monitoring unit 271 changes the state to "backup", and deletes the LUN of the copy volume from the data collection table 81.

When a media unmounting notification arrives while the tape drive has the "backup delay" state, the tape state monitoring unit 271 executes "procedure #10". In the "procedure #10", the tape state monitoring unit 271 executes a candidate filtering search process. As conditions for the candidate search, a copy volume with "read=0" (read count is "0") is set. If the tape state monitoring unit 271 finds a backup source copy volume through the candidate filtering search, the tape state monitoring unit 271 aggregates and stores the backup job information on this backup in the job management table 85. Then, the tape state monitoring unit 271 changes the state to "idle" in the data collection table 81, and deletes the LUN of the copy volume from the data collection table 81.

When a D2D backup session disconnection notification arrives while the tape drive has the "backup delay" state, the tape state monitoring unit 271 changes the state to "backup", and then deletes the LUN of the copy volume from the data collection table 81.

As described above, when a notification is input from the disk device 100 or backup server 30, an appropriate procedure for the state of a tape drive is taken in the tape drive according to the definitions of the matrix 330. In this connection, each of the media mounting, media allocation, write, and media unmounting notifications specifies a tape drive, and a procedure is executed only on the specified tape drive according to the matrix 330. On the other hand, each of the D2D backup session establishment and D2D backup session disconnection notifications does not specify a tape drive, and a procedure is executed on all tape drives according to the matrix 330.

The following describes the candidate search process to be performed in the "procedure #1" and procedure #6" in detail.

Figure 45:
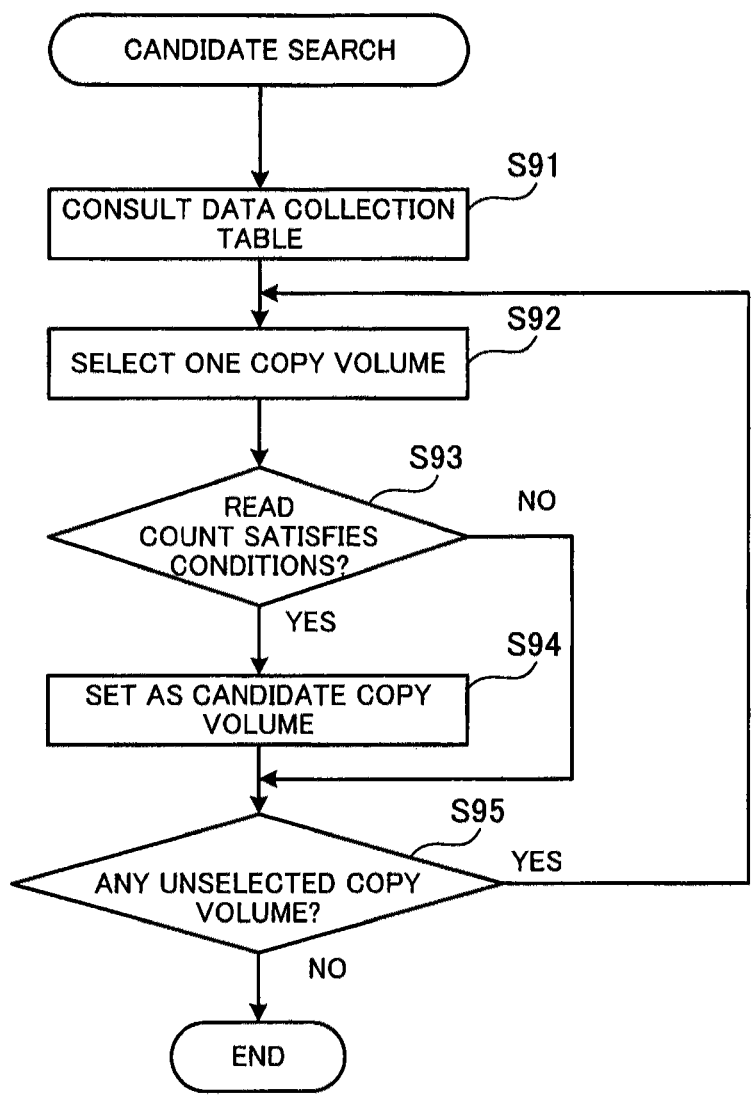
FIG. 45 is a flowchart of a candidate search process.

FIG. 45 is a flowchart of a candidate search process. This process of FIG. 45 will be described step-by-step.

At operation S91, the tape state monitoring unit 271 consults the data collection table 61 regarding copy volumes (refer to FIG. 22) to check information on the copy volumes for the same time frame as a current data collection time frame in question in the data collection table 81.

At operation S92, the tape state monitoring unit 271 selects one copy volume.

At operation S93, the tape state monitoring unit 271 determines whether the read count of the selected copy volume satisfies the conditions for the candidate search. For example, the conditions for the candidate search in the "procedure #1" and "procedure #6" illustrated in FIG. 43 are that a read count is "0". If the conditions are satisfied, the tape state monitoring unit 271 proceeds to operation S94; otherwise, the tape state monitoring unit 271 proceeds to operation S95.

At operation S94, the tape state monitoring unit 271 takes the selected copy volume as a candidate copy volume. More specifically, the tape state monitoring unit 271 registers the identification number of the selected copy volume in the Candidate Copy Volume field corresponding to the current data collection time frame in question in the data collection table 81 (refer to FIG. 29) of the tape device 200.

At operation S95, the tape state monitoring unit 271 determines whether there is any unselected copy volume or not. If this determination is affirmative, the tape state monitoring unit 271 proceeds back to operation S92; otherwise, the tape state monitoring unit 271 completes the candidate search process.

As described above, a candidate copy volume for a backup job is found from among a plurality of copy volumes on the basis of the read counts of the copy volumes. For example, the "procedure #1" and "procedure #6" of FIG. 43 are executed when a media mounting notification arrives. The media mounting is performed when a backup starts in a backup job. This means that a sequential read has not been performed in the backup source copy volume. Therefore, a copy volume in which a sequential read is not performed (read count is "0") when the media mounting notification arrives is detected as a candidate backup source copy volume.

The following describes the candidate filtering search process to be executed in the "procedure #2", "procedure #3", "procedure #5", "procedure #7", "procedure #8", and the "procedure #10" in detail.

Figure 46:
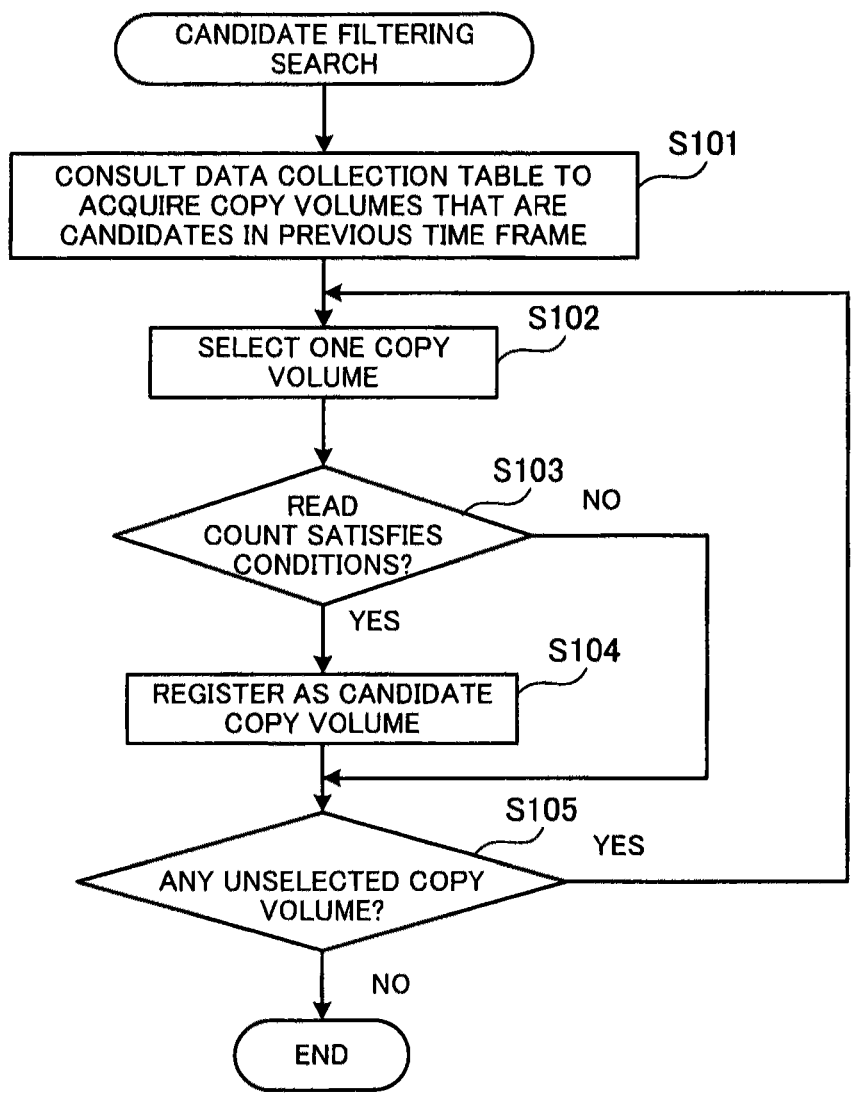
FIG. 46 is a flowchart of a candidate filtering search process.

FIG. 46 is a flowchart of a candidate filtering search process. This process of FIG. 46 will be described step-by-step.

At operation S101, the tape state monitoring unit 271 consults the data collection table 61 (refer to FIG. 22) to check information for the same time frame as a current data collection time frame in question in the data collection table 81. At this time, the tape state monitoring unit 271 checks the information only on copy volumes that are candidates in the previous data collection time frame, which is one before the current data collection time frame.

At operation S102, the tape state monitoring unit 271 selects one copy volume that is a candidate copy volume in the previous data collection time frame.

At operation S103, the tape state monitoring unit 271 determines whether the read count of the selected copy volume satisfies the conditions for the candidate search or not. For example, the conditions for the candidate search in the "procedure #2" and "procedure #5" of FIG. 43 and "procedure 7" of FIG. 44 are that the read count is "0". On the other hand, the conditions for the candidate search in the "procedure #3" and "procedure #8" are that the read count is not "0". If the conditions are satisfied, the tape state monitoring unit 271 proceeds to operation S104; otherwise, the tape state monitoring unit 271 proceeds to operation S105.

At operation S104, the tape state monitoring unit 271 takes the selected copy volume as a candidate copy volume. More specifically, the tape state monitoring unit 271 registers the identification number of the selected copy volume in the Candidate Copy Volume field for the data collection time frame in question in the data collection table 81 (refer to FIG. 29) of the tape device 200.

At operation S105, the tape state monitoring unit 271 determines whether there is any unselected copy volume out of the copy volumes which are candidates in the previous data collection time frame. If this determination is affirmative, the tape state monitoring unit 271 proceeds back to operation S102; otherwise, the tape state monitoring unit 271 completes the candidate search process.

As described above, the backup source copy volumes are narrowed down on the basis of the read counts of the copy volumes. For example, the "procedure #2" or "procedure #5" of FIG. 43 or the "procedure #7" of FIG. 44 is executed when a media allocation or media unmounting notification arrives. The media allocation is performed when a data copy process starts in a backup job. In addition, the media unmounting is performed when the data copy process is completed in the backup job. This means that a sequential read is not performed in the backup source copy volume during either the media allocation or media unmounting. Therefore, a copy volume in which a sequential read is not performed (read count is "0") when a media allocation or media unmounting notification arrives is taken as a backup candidate.

On the other hand, the "procedure #3" of FIG. 43 and "procedure #8" of FIG. 44 are executed when a write notification arrives. A write notification for write to the tape device 200 is output after a sequential read starts in the backup source copy volume in a backup. This means that a sequential read is performed in the backup source copy volume in the time frame in which the write notification is output. Therefore, a copy volume in which a sequential read is performed (read count is other than "0") when the write notification arrives is taken as a backup candidate.

The following describes a delay target determination process to be performed in the "procedure #6", "procedure #7", "procedure #8", and "procedure #9" of FIG. 44 in detail.

Figure 47:
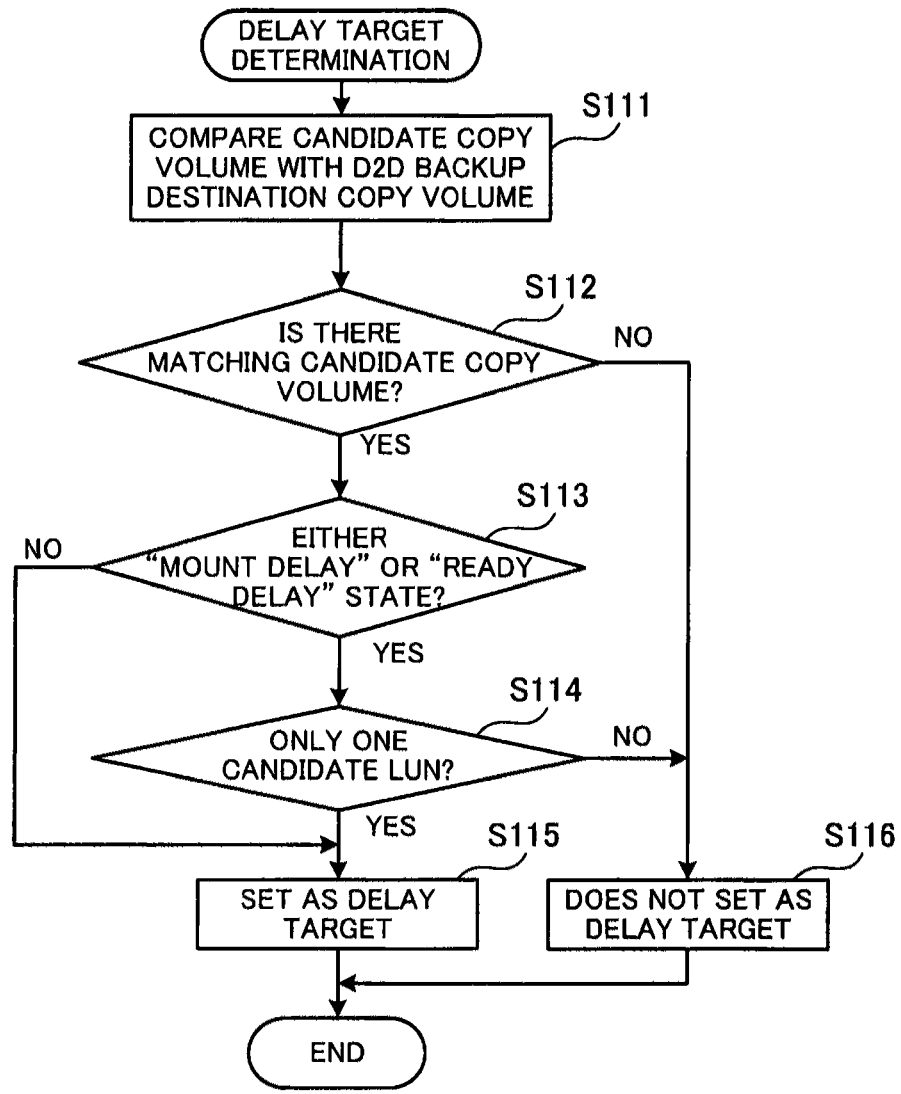
FIG. 47 is a flowchart of a delay target determination process.

FIG. 47 is a flowchart of a delay target determination process. This process of FIG. 47 will be described step-by-step.

At operation S111, the tape state monitoring unit 271 consults the data collection table 81 to check the record of a tape drive in question corresponding to the current data collection time frame, and compare candidate copy volumes with a D2D backup destination copy volume.

At operation S112, the tape state monitoring unit 271 determines whether the D2D backup destination copy volume is included in the candidate copy volumes. If this determination is affirmative, this means that a backup job may be being executed using the backup destination copy volume of the D2D backup. The tape state monitoring unit 271 proceeds to operation S113 if the D2D backup destination copy volume is included in the candidate copy volumes. The tape state monitoring unit 271 proceeds to operation S116 otherwise.

At operation S113, the tape state monitoring unit 271 determines whether or not the tape drive in question has one of the "mount delay" and "ready delay" states. The tape state monitoring unit 271 proceeds to operation S114 if the tape drive has the "mount delay" or "ready delay" state. The tape state monitoring unit 271 proceeds to operation S115 otherwise.

At operation S114, the tape state monitoring unit 271 determines whether there is only one candidate copy volume. If this determination is affirmative, the tape state monitoring unit 271 proceeds to operation S115; otherwise, the tape state monitoring unit 271 proceeds to operation S116.

At operation S115, the tape state monitoring unit 271 sets the tape drive in question as a delay target. Then, the delay target determination process is completed.

At operation S116, the tape state monitoring unit 271 completes this delay target determination process without setting the tape drive in question as a delay target.

As described above, if there is a possibility that a backup job using the backup destination copy volume of a D2D backup is executed, the tape drive in which data is to be stored in the backup job is taken as a delay target.

In this connection, when the tape drive has a "mount delay" or "ready delay" state, the tape drive is taken as a delay target if the candidate copy volume is the only candidate copy volume detected. This is because a data read is not performed in the copy volume when media mounting or media allocation is executed in the tape drive in the "mount delay" or "ready delay" state. If a data read is not executed in the copy volume, there is no interference in access to the business volume under the D2D backup.

However, issuance of the media mounting or media allocation notification implies that a write notification will be issued in the backup job. In the second embodiment, in the case where a tape drive has the "mount delay" or "ready delay" state, the tape drive is taken as a delay target only if candidate copy volumes are narrowed down to one, meaning that a backup source copy volume is found. Therefore, when a D2D backup in the disk device 100 and a backup job under the control of the backup server 30 are executed on the same copy volume, the start of the copy in the backup job is delayed. As a result, a period during which a data write on a copy volume in the D2D backup and a data read from the copy volume in the backup job are performed at the same time is prevented.

In addition, in the case where the tape drive has a "mount delay" or "ready delay" state, a delay process is not performed if candidate copy volumes are not narrowed down to one. This avoids performing a delay process that is not needed. That is, a delay process is skipped when there is a low possibility of an adverse effect to data inputs and outputs to a business volume. As a result, a decrease in the backup job efficiency may be suppressed.

In addition, when a drive has a state other than the "mount delay" and "ready delay" states (i.e., "write delay" or "backup delay"), the drive is taken as a delay target even if there is a plurality of candidate copy volumes. This is because, if a write notification is issued, a sequential data read from a copy volume is executed, and there may be interference in a business volume under the D2D backup using the copy volume as a backup destination. That is, to make sure to suppress the interference in the business volume, a write delay process is performed in the data write to the tape drive even if there is a plurality of candidate copy volumes. When the write delay process is performed, an interval for a sequential data read from the copy volume is prolonged. As a result, a processing efficiency of data write to the copy volume in a D2D backup is improved, and a decrease in processing efficiency of accesses from the business server 20 to the business volume is suppressed.

By the way, a delay process may always be performed when a media mounting, media allocation, or write notification is issued in a backup job while the D2D backup is performed, without performing the determination process of FIG. 47.

[Improvement Proposal for Backup Schedule]

The following describes a process for proposing an improved backup schedule that realizes an efficient and safety operation. This backup schedule improvement proposing process first classifies backups. The backup classification is a process of analyzing an access frequency on the basis of an organized knowledge table, and determines backup days.

Figure 48:
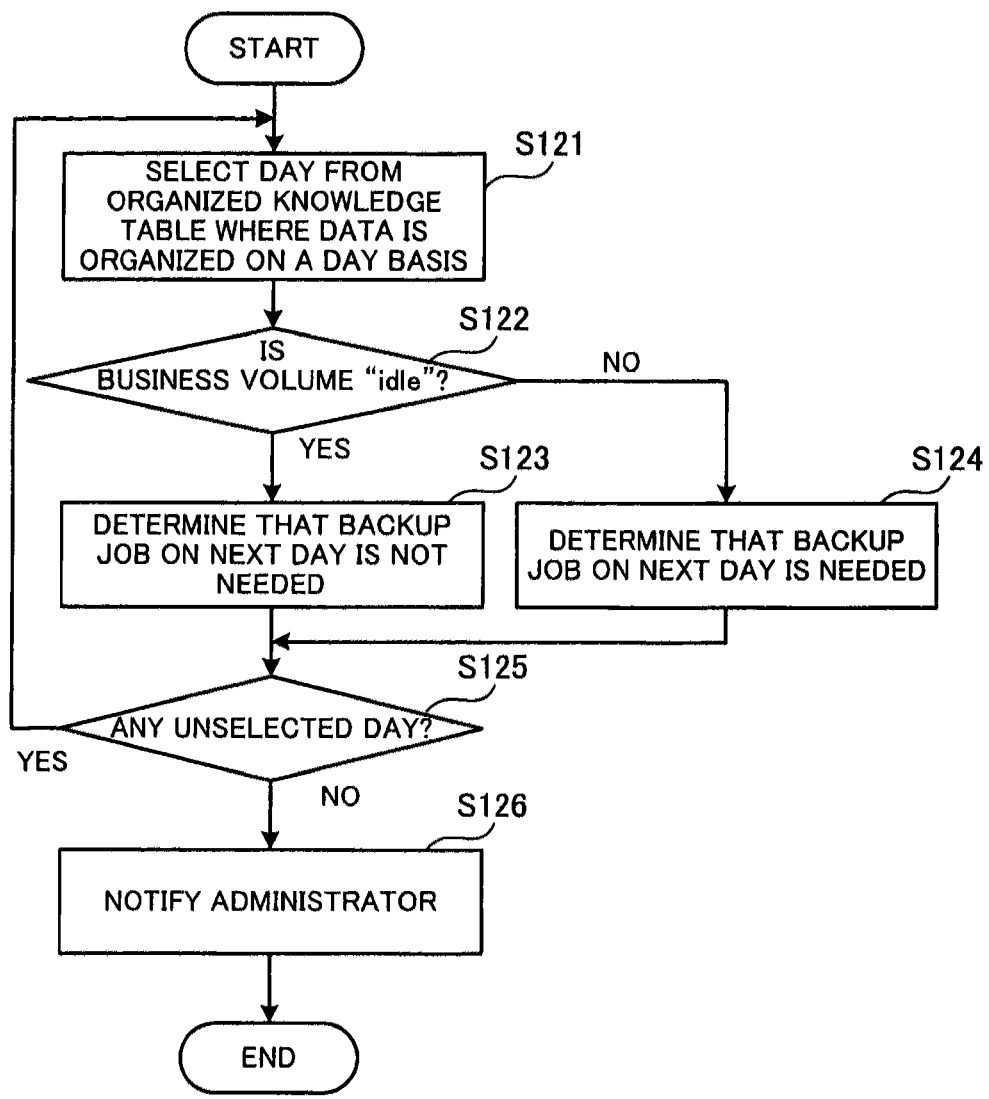
FIG. 48 illustrates a procedure of a backup classification process.

FIG. 48 illustrates a procedure of a backup classification process. This process of FIG. 48 will be described step-by-step.

At operation S121, the tape state monitoring unit 271 consults the organized knowledge table 72 for business volumes in which data is organized on a day basis, to select one day.

At operation S122, the tape state monitoring unit 271 determines whether a business volume of the selected day has an "idle" state or not. If this determination is affirmative, the tape state monitoring unit 271 proceeds to operation S123; otherwise, the tape state monitoring unit 271 proceeds to operation S124.

At operation S123, the tape state monitoring unit 271 determines that a backup job on the day following the selected day is not needed. Then, the process proceeds to operation S125.

At operation S124, the tape state monitoring unit 271 determines that a backup job on the day following the selected day is needed.

At operation S125, the tape state monitoring unit 271 determines whether there is any unselected day. If this determination is affirmative, the tape state monitoring unit 271 proceeds back to operation S121; otherwise, the tape state monitoring unit 271 proceeds to operation S126.

At operation S126, the tape state monitoring unit 271 notifies the administrator of the result of determining the necessity of backups for each day via an email or the like.

Figure 49:
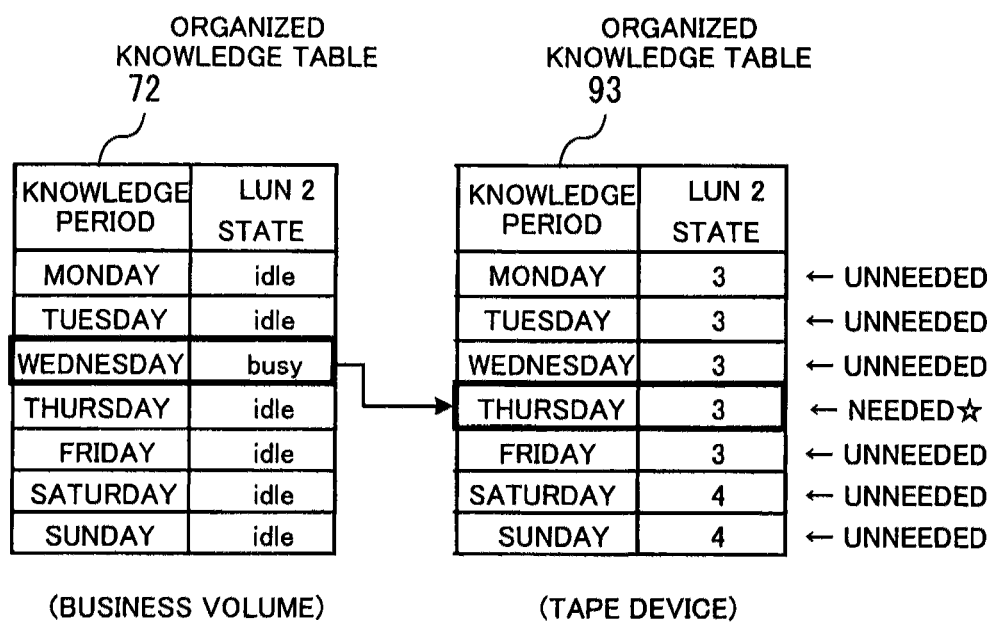
FIG. 49 illustrates an example classification of backups.

FIG. 49 illustrates an example classification of backups. Referring to FIG. 49, only information on "LUN2" is retrieved from the organized knowledge table 72 for business volumes. In addition, it is assumed that the data of the business volume of "LUN2" is backed up to the copy volume of "LUN2". In FIG. 49, information on the copy volume of "LUN2" is retrieved from the organized knowledge table 93 of the tape device 200.

The business volume of "LUN2" has a "busy" state only for Wednesday and an "idle" state for the other days. This means that the business volume of "LUN2" is used only on Wednesday. On the other hand, a backup job "3" is executed every day from Monday to Friday. If the business volume is used only on Wednesday, a backup job may be executed on a day following Wednesday, for example, on Thursday. A backup job is considered not to be needed on days other than Thursday.

In such a case, the tape state monitoring unit 271 notifies the administrator, via an email or the like, that only Thursday is sufficient for executing a backup job of the copy volume of "LUN2". As a result, the administrator is able to create an efficient backup job schedule.

In addition, the tape state monitoring unit 271 is capable of proposing a reschedule according to priority with taking an overlap of jobs into consideration.

Figure 50:
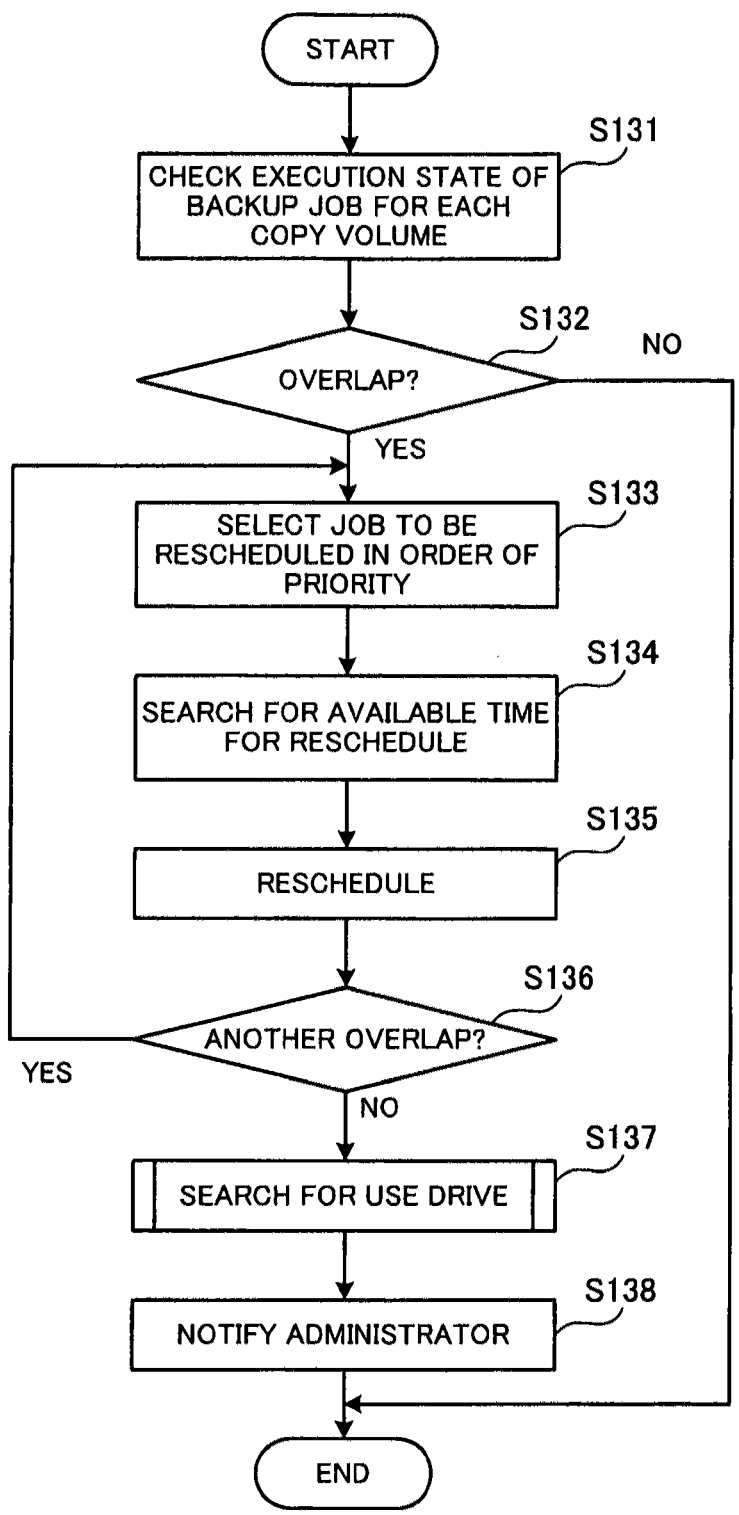
FIG. 50 is a flowchart of a reschedule proposing process.

FIG. 50 is a flowchart of a reschedule proposing process. This process of FIG. 50 will be described step-by-step.

At operation S131, the tape state monitoring unit 271 consults the organized knowledge table 91 where data is organized for each copy volume in the tape device 200 to check the execution state of a backup job for each copy volume.

At operation S132, the tape state monitoring unit 271 determines whether there are backup jobs which overlap in execution time. If there are such backup jobs, the tape state monitoring unit 271 proceeds to operation S133; otherwise, the tape state monitoring unit 271 completes this process.

At operation S133, the tape state monitoring unit 271 selects a backup job with the highest priority among the overlapping backup jobs, as a job to be rescheduled. The priority of each backup job is determined on the basis of the job management table 85 (refer to FIG. 37).

At operation S134, the tape state monitoring unit 271 checks a time available for rescheduling. For example, the tape state monitoring unit 271 checks the execution times of backup jobs (other backup jobs) other than the backup job to be rescheduled. The tape state monitoring unit 271 also checks an available time (time of "idle") from the state of the backup source copy volume of the backup job to be rescheduled. Then, the tape state monitoring unit 271 determines the available time of the backup source copy volume of the backup job to be rescheduled, other than the execution times of the other backup jobs, as a time to be used for the rescheduling.

At operation S135, the tape state monitoring unit 271 reschedules the backup job to be rescheduled for the available time detected at operation S134, to thereby create a proposed schedule table 310.

At operation S136, the tape state monitoring unit 271 determines whether there are other backup jobs which overlap in execution time. If there are such other backup jobs, the tape state monitoring unit 271 proceeds back to operation S133; otherwise, the tape state monitoring unit 271 proceeds to operation S137.

At operation S137, the tape state monitoring unit 271 executes a use drive search process, which will be described later (with reference to FIG. 55).

At operation S138, the tape state monitoring unit 271 notifies the administrator of the details of the proposed schedule table via an email or the like.

The above-described technique makes it possible to propose a schedule in which time frames for backup jobs do not overlap. The following describes a specific example of the reschedule proposing process.

FIG. 51 illustrates an example organized knowledge table in which knowledge data is organized on a knowledge time frame basis for each copy volume. It is assumed that, in the organized knowledge table 91 of FIG. 51, all time frames except for the knowledge time frames with the job number of a backup job are available ("idle" state).

The organized knowledge table 91 of FIG. 51 indicates that three backup jobs are executed in a time frame from 05:00 to 07:00, and that two backup jobs are executed in a time frame from 07:00 to 08:00.

Assume now that a backup job with a job number of "3" has the highest priority, a backup job with a job number of "2" has the second highest priority, and a backup job with a job number of "1" has the lowest priority. In this case, the backup job with the job number of "3" is selected as a backup job to be rescheduled.

Then, an available time for a backup is found.

FIG. 52 illustrates an example of searching for an available time. Referring to FIG. 52, the execution states of the other backup jobs are judged on the basis of the organized knowledge table 91 for each copy volume. In addition, the execution state of a D2D backup to a copy volume of "LUN2" which is a backup source of a backup to be rescheduled is judged based on the organized knowledge table 71.

The example of FIG. 52 indicates a result of searching for an available time in knowledge time frames on the right side. "Busy" is set in time frames in which the other backup jobs are executed. In addition, "busy" is set in time frames in which a D2D backup to the copy volume of "LUN2" is executed. The other time frames are considered available ("idle" state). Then, the backup job with the job number of "3" is rescheduled for an available time, thereby generating a proposed schedule table 310.

FIG. 53 illustrates an example proposed schedule table. The proposed schedule table 310 has fields for Knowledge Time Frame, and State for each copy volume. The Knowledge Time Frame field indicates a knowledge time frame obtained by dividing one day by a knowledge unit. The State field for each copy volume indicates the job number of a backup job executed in a corresponding time frame.

Referring to FIG. 53, the backup job with a job number of "3" does not overlap with the other backup jobs by rescheduling the backup job with the job number of "3" for a time frame from 16:00 to 20:00. However, the example of FIG. 53 indicates that the backup jobs with job numbers of "1" and "2" still overlap in execution time. Therefore, the backup job with job number of "2" with higher priority is rescheduled.

Figure 54:
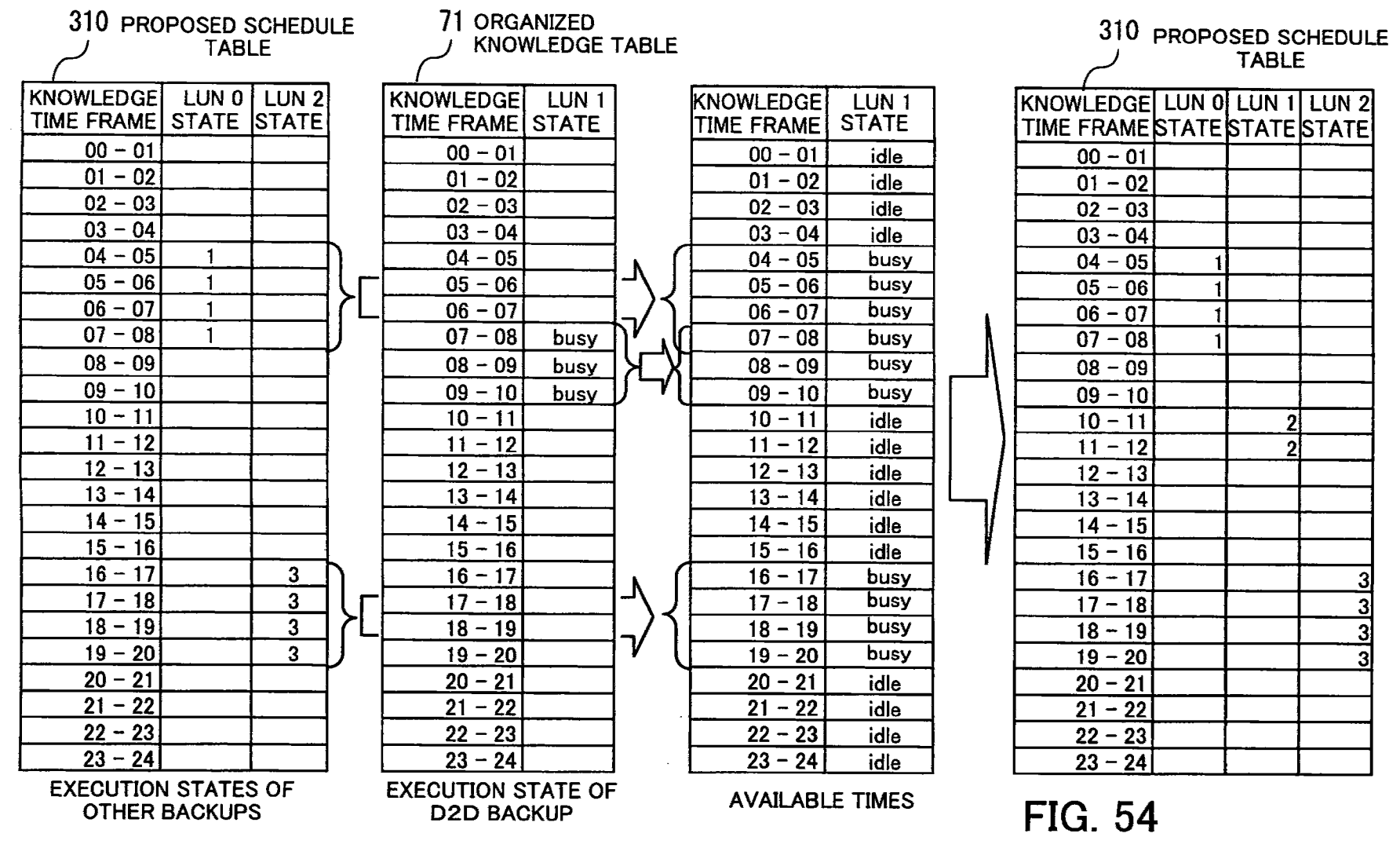

FIG. 54 illustrates an example rescheduling of a backup job with job number of "2". To reschedule the second backup job, the proposed schedule table 310 is used for checking the execution states of the other backup jobs. That is, the execution times of the other backup jobs are judged on the condition that the backup job previously rescheduled is fixed in the rescheduled time frames. That is, on the basis of the proposed schedule table 310 and organized knowledge table 71, the available time of the backup source copy volume of "LUN2" for the backup job to be rescheduled is determined. Then, the backup job to be rescheduled is rescheduled for an available time frame, thereby updating the proposed schedule table 310.

The following describes a use drive search process.

Figure 55:
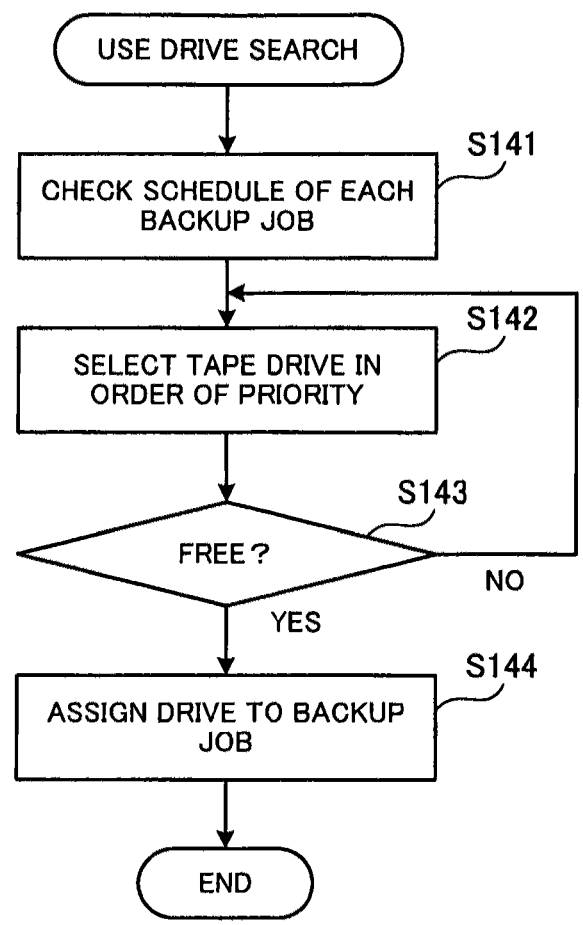
FIG. 55 is a flowchart of a use drive search process.

FIG. 55 is a flowchart of a use drive search process. This process of FIG. 55 will be described step-by-step.

At operation S141, the tape state monitoring unit 271 checks the schedule of each backup job on the basis of the proposed schedule table 310.

At operation S142, the tape state monitoring unit 271 selects a tape drive in order of priority, highest first, for searching for an available time. A higher priority is given to a tape drive which is based on a newer generation of LTO technology.

At operation S143, the tape state monitoring unit 271 determines whether the selected tape drive is free (the "idle" state) in the time frame for which a backup job is scheduled. The available time frame of a tape drive is determined on the basis of the organized knowledge table 92 in which data is organized on a knowledge time frame basis for each tape drive. The tape state monitoring unit 271 proceeds to operation S144 if this determination is affirmative. The tape state monitoring unit 271 proceeds back to operation S142 otherwise.

At operation S144, the tape state monitoring unit 271 assigns the selected tape drive as a backup destination for the backup job. Then, the use drive selection process is completed.

Figure 56:
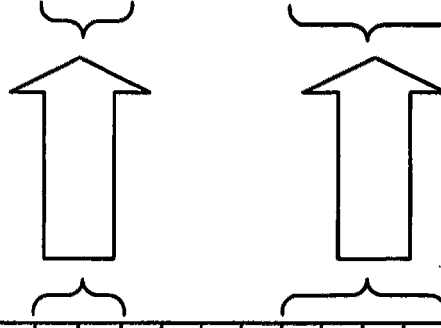
FIG. 56 illustrates an example allocation of a use drive.

FIG. 56 illustrates an example allocation of a use drive. Referring to the example of FIG. 56, the backup jobs with job numbers of "2" and "3" are rescheduled. In addition, the tape drive of "G4_02" has the highest priority. Therefore, it is determined whether a time frame from 10:00 to 12:00 during which a backup job with job number of "2" is executed is available, based on the use state of the tape drive of "G4_02". Referring to the example of FIG. 56, this time frame is available. Therefore, the tape drive of "G4_02" is assigned as a backup destination for the backup job with job number of "2". Similarly, it is determined based on the use state of the tape drive of "G4_02" whether a time frame from 16:00 to 20:00 during which a backup job with job number of "3" is executed is available. Referring to the example of FIG. 56, this time frame is available. Therefore, the tape drive of "G4_02" is assigned as a backup destination for the backup job with job number "3".

As described above, backup jobs are rescheduled, and a proposed schedule is provided to the administrator. The administrator then displays the proposed schedule on a screen of his/her terminal device to confirm the details of the schedule.

FIG. 57 illustrates an example report screen for a proposed schedule. The report screen 320 provides improved plans, frequency, and use drive for each backup job. If there is no improved plan, then "NO" is displayed.

An improved plan is represented by start time and frequency. The start time indicates a start time of a backup job. The frequency indicates everyday process or once-a-week process. In the case of once-a-week process, an appropriate day for a backup job is indicated. In addition, an appropriate tape drive as a backup destination for a backup job is indicated as a use drive.

The administrator checks such the report screen 320 to create an appropriate backup schedule.

In addition, the second embodiment intentionally delays a response to each kind of notification in the tape device 200 when a D2D backup starts in the disk device 100 while a backup job is executed.

Figure 58:
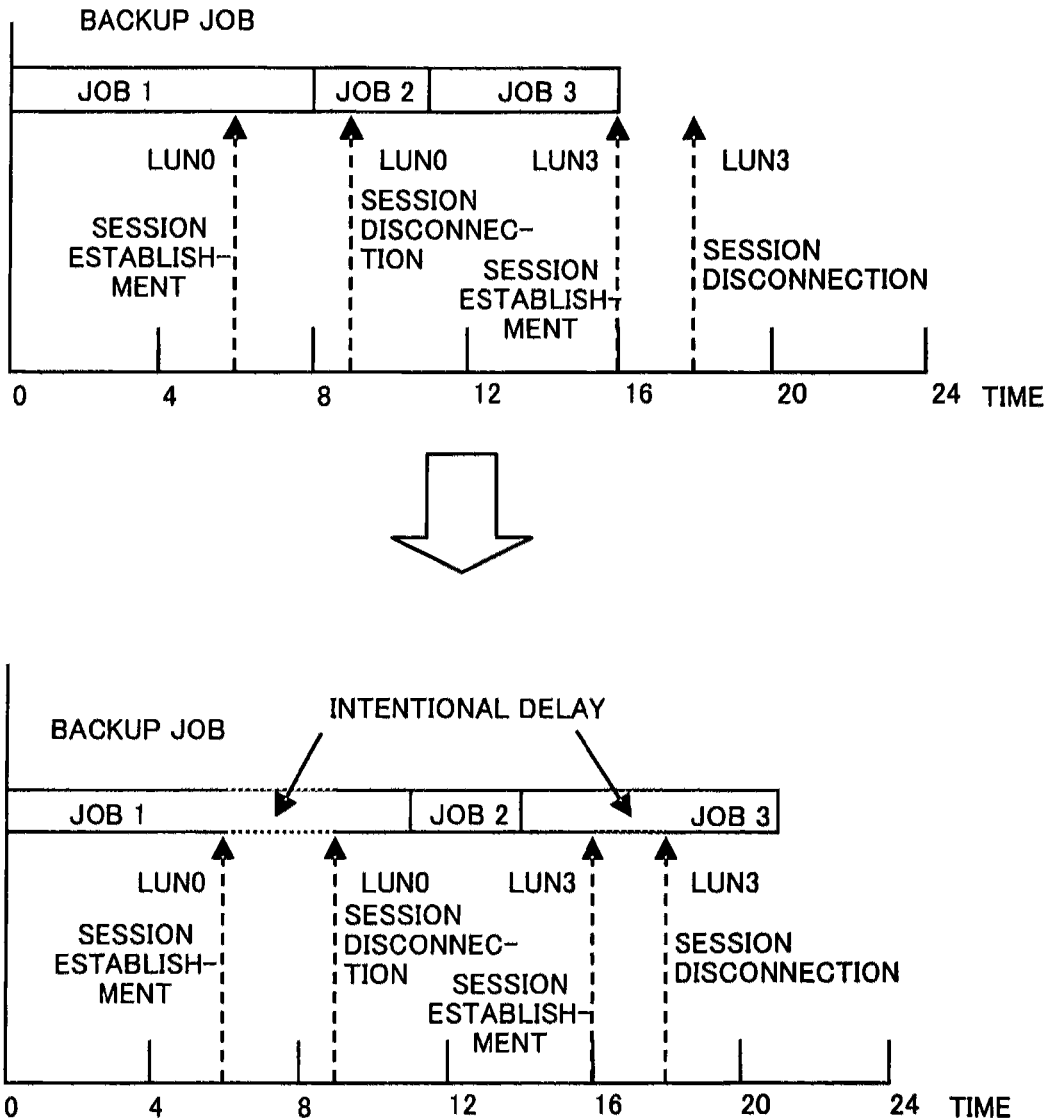
FIG. 58 illustrates an execution state of response delay.

FIG. 58 illustrates an execution state of a response delay. As illustrated in FIG. 58, when a D2D backup starts while a backup job of backing up data from a copy volume to the tape device 200 is executed, the backup job is delayed intentionally. This intentional delay reduces the processes of the tape device 200 and eliminates interference in business.

That is to say, a D2D backup involves writing to a copy volume. Many copy volumes provide a slow access speed. If such a copy volume has a RAID 5 structure, a write penalty occurs, and data is written at a slower speed. The write penalty is a process of reading data and parity before update and updating the parity at the time of a data update. That is, in the RAID 5, data is updated only after the data and parity are read, which needs a longer time for writing.

When a D2D backup is executed while a D2T backup job is executed, data write to the copy volume in the D2D backup is further delayed. Therefore, the D2D backup takes a longer time. This produces an influence of prolonging a period during which data is not written in a backup source business volume of the D2D backup.

Therefore, the second embodiment intentionally delays a response to each notification in the tape device 200. Because of a delay period of a backup job, data write to a copy volume in a D2D backup is smoothly executable.

The following techniques are employed for delaying a response.

(i) A media mounting process is delayed before a backup starts. In this case, a response is delayed by a time period (for example, 5 minutes) which does not cause a timeout error.

(ii) A transition time to a "ready" state in response to a media allocation notification is delayed after a medium is mounted in a drive. In this case, a ready response is delayed by a time period (for example, 10 minutes) which does not cause a timeout error.

(iii) A completion response to a write command (write notification) is delayed. A backup job to be executed in the backup server 30 issues a next data write command after a response notification to the write command arrives. Delaying the completion response to the write command reduces the number of reads to a disk device.

Such an intentional delay of a response to a tape access in the tape device 200 may be executed without the backup server 30 noticing the delay. That is, efficient backups are realized by controlling the disk device 100 and tape device 200. It is very beneficial when the administrator of the disk device 100 or tape device 200 and the administrator of the backup server 300 are different.

In this connection, the second embodiment reduces loads on the disk device 100, which suppresses troubles due to overloads of the disk device 100.

In addition, the second embodiment proposes an appropriate tape drive together with an appropriate backup schedule. Using tape drives in accordance with the proposal optimizes the performance of backups.

(Other Embodiments)

In the second embodiment, the tape device 200 detects whether a backup is performed, on the basis of whether a sequential read is performed in a copy volume. Alternatively, the disk device 100 may be designed to detect whether a backup from a copy volume is performed or not. In this case, the disk device 100 notifies the tape device of the identification information (LUN) of the copy disk in which the backup is performed.

The above processing functions can be realized by using a computer. In this case, a program is prepared, which describes the processing contents of the functions of the information processing apparatus 4, the disk state monitoring units 151 and 161 of the disk device 100, and the tape state monitoring unit 271 of the tape device 200. The above processing functions are realized on the computer by executing the program. The program describing the needed processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), media, etc. The optical discs include DVDs, DVD-RAMs, CD-ROM/RWs, etc. The magneto-optical recording media include Magneto-Optical discs (MO), etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the above program stores in its local storage device the program recorded on a portable recording medium or transferred from the server computer, for example. Then, the computer reads the program from the local storage device, and runs the program. The computer may run the program directly from the portable recording medium. Also, while receiving the program being transferred from the server computer, the computer may sequentially run this program.

Further, at least part of the above processing functions may be realized by electronic circuits such as Digital Signal Processor (DSP), Application Specific Integrated Circuit (ASIC), and Programmable Logic Device (PLD).

The disclosed technique makes it possible to recognize the execution state of a backup on the basis of internal information of a storage device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An information processing apparatus comprising a processor configured to perform a procedure including:
acquiring access information indicating a state of access to a volume of a disk device at least for data read;
acquiring an operation instruction made to a tape device regarding a backup of data to a magnetic tape of the tape device;
detecting a volume in which a sequential read is being performed, on the basis of the acquired access information at a time of acquisition of the operation instruction, the detected volume being a storage area in the disk device;
determining the detected volume as a backup source volume in the disk device for the backup of the data to the magnetic tape specified in the operation instruction, the backup being currently performed; and
causing the tape device to delay responding to another operation instruction acquired during the backup being currently performed for a predetermined delay time after completion of an operation in accordance with said another operation instruction.

2. The information processing apparatus according to claim 1, wherein:
the procedure further includes acquiring start information and end information indicating start and end of a backup performed between volumes of the disk device; and
the causing causes the tape device to delay responding to the operation instruction in a case where the operation instruction made to the tape device is acquired after acquisition of the start information and before acquisition of the end information.

3. The information processing apparatus according to claim 1, wherein:
the procedure further includes detecting whether a backup destination volume for the backup performed between the volumes of the disk device is the backup source volume in the disk device for the backup of the data to the magnetic tape specified in the operation instruction made to the tape device; and
the causing causes the tape device to delay responding to the operation instruction in a case where the determining determines that the backup destination volume and the backup source volume are a same volume.

4. The information processing apparatus according to claim 1, wherein the procedure further includes:
determining a period from start to end of a sequential read as an execution time of a backup; and
creating a backup schedule by changing an execution time of at least one of a plurality of backups that overlap in execution time.

5. The information processing apparatus according to claim 4, wherein the creating creates the backup schedule by changing the execution time of said at least one backup to a period during which there is no access to a backup source volume for said at least one backup.

6. The information processing apparatus according to claim 4, wherein the creating preferentially selects a backup with a low throughput from among the plurality of backups that overlap in execution time, and creates the backup schedule by changing the execution time of the selected backup.

7. The information processing apparatus according to claim 4, wherein the creating preferentially selects a backup with a small data size from among the plurality of backups that overlap in execution time, and creates the backup schedule by changing the execution time of the selected backup.

8. The information processing apparatus according to claim 4, wherein:
the acquiring acquires operation instructions each made to a tape device regarding a backup of data to a magnetic tape of the tape device, the operation instructions each specifying a tape drive; and
the creating determines a use period of each tape drive of the tape device on the basis of the acquired operation instructions, and creates the backup schedule that includes information indicating a tape drive usable in a new execution time to which the execution time of said at least one backup is changed.

9. The information processing apparatus according to claim 4, wherein:
the acquiring acquires access information including a state of data write to each volume of the disk device;
the procedure further includes detecting a state of data update in said each volume of the disk device, which is a backup source volume, on a day basis; and
the creating creates the backup schedule in which a backup from said each volume of the disk device is scheduled for a day following a data update day of said each volume.

10. A tape device comprising:
a tape drive that is capable of reading and writing data to a magnetic tape of the tape drive; and
a controller configured to perform a procedure including:
acquiring access information from a disk device, the access information indicating a state of access to a volume of the disk device at least for data read;
monitoring inputs of operation instructions to the tape device regarding a backup of data to the magnetic tape of the tape drive;
detecting a volume in which a sequential read is being performed, on the basis of the acquired access information at a time of an input of an operation instruction to the tape device;
determining the detected volume as a backup source volume in the disk device for the backup of the data to the magnetic tape specified in the operation instruction, the detected volume being a storage area in the disk device, the backup being currently performed;
operating the tape device in accordance with an operation instruction acquired during the backup being currently performed; and
responding to the acquired operation instruction after a predetermined delay time elapses from completion of the operating.

11. A non-transitory computer-readable recording medium storing a program causing a computer to perform a procedure comprising:
acquiring access information indicating a state of access to a volume of a disk device at least for data read;
acquiring an operation instruction made to a tape device regarding a backup of data to a magnetic tape of the tape device;
detecting a volume in which a sequential read is being performed, on the basis of the acquired access information at a time of acquisition of the operation instruction, the detected volume being a storage area in the disk device;
determining the detected volume as a backup source volume in the disk device for the backup of the data to the magnetic tape specified in the operation instruction, the backup being currently performed; and
causing the tape device to delay responding to another operation instruction acquired during the backup being currently performed for a predetermined delay time after completion of an operation in accordance with said another operation instruction.

12. The non-transitory computer-readable recording medium according to claim 11, wherein:
the procedure further includes acquiring start information and end information indicating start and end of a backup performed between volumes of the disk device; and
the causing causes the tape device to delay responding to the operation instruction in a case where the operation instruction is input to the tape device after acquisition of the start information and before acquisition of the end information.

13. The non-transitory computer-readable recording medium according to claim 11, wherein the procedure further comprises:
determining a period from start to end of a sequential read as an execution time of a backup; and
creating a backup schedule by changing an execution time of at least one of a plurality of backups that overlap in execution time.

* * * * *